(12) United States Patent
Kaczmarz et al.

(10) Patent No.: US 11,301,741 B2
(45) Date of Patent: Apr. 12, 2022

(54) MEDICINAL DOSAGE STORAGE METHOD FOR COMBINED ELECTRONIC INVENTORY DATA AND ACCESS CONTROL

(71) Applicant: CompX International Inc., Greenville, SC (US)

(72) Inventors: Kenneth A. Kaczmarz, LaGrange Park, IL (US); Mitchell S. Mlynarczyk, Wauconda, IL (US); James R. Lutz, Grayslake, IL (US); Ronald T. Klein, Evanston, IL (US)

(73) Assignee: Compx International Inc., Greenville, SC (US)

( * ) Notice: Subject to any disclaimer, the term of this patent is extended or adjusted under 35 U.S.C. 154(b) by 0 days.

(21) Appl. No.: 17/186,381

(22) Filed: Feb. 26, 2021

(65) Prior Publication Data

US 2021/0182646 A1 Jun. 17, 2021

Related U.S. Application Data

(62) Division of application No. 16/788,672, filed on Feb. 12, 2020.

(Continued)

(51) Int. Cl.
*G06K 19/077* (2006.01)
*G07C 9/00* (2020.01)
*G06Q 10/08* (2012.01)

(52) U.S. Cl.
CPC ..... *G06K 19/07726* (2013.01); *G06Q 10/087* (2013.01); *G07C 9/00658* (2013.01); *G07C 9/00896* (2013.01)

(58) Field of Classification Search
CPC .......... G06K 19/07726; G06Q 10/087; G07C 9/00658; G07C 9/00896; G07C 9/0069; G07C 9/00912

See application file for complete search history.

(56) References Cited

U.S. PATENT DOCUMENTS

| | | |
|---|---|---|
| 3,504,511 A | 4/1970 | Allen |
| 3,666,342 A | 5/1972 | Biesecker |

(Continued)

OTHER PUBLICATIONS

M. Ritamäki and A. Ruhanen, "Embedded passive UHF RFID seal tag for metallic returnable transit items," 2010 IEEE International Conference on RFID (IEEE RFID 2010), 2010, pp. 152-157, doi: 10.1109/RFID.2010.5467263. (Year: 2010).*

(Continued)

*Primary Examiner* — Matthew Mikels
(74) *Attorney, Agent, or Firm* — Dority & Manning, P.A.

(57) ABSTRACT

Disclosed are apparatuses and methodologies for achieving current inventory data management with an electronic access control system. An access control system provides access control data while a sealed enclosure incorporates an RFID reading system for determining the identity of respective tagged contents therein. Particularly in conjunction with the storage of controlled substances, such as some drugs utilized on an EMS vehicle, a tamper evident RFID tag is fully or partially destroyed or damaged, or otherwise impacted or affected so as to generate a changed ID, whenever the contained medicinal dosage is acquired for administration. Specific container/cap combinations accommodate various drug dosages, and are combinable with tamper evident RFID tags. Usage of tagged drugs may be tracked by reading narcotics box contents before and after a work shift. Intra-shift access and usage reports at each point of consumption maintains a complete record of custody of control.

27 Claims, 29 Drawing Sheets

Related U.S. Application Data

(60) Provisional application No. 62/806,962, filed on Feb. 18, 2019.

(56) References Cited

U.S. PATENT DOCUMENTS

| | | |
|---|---|---|
| 3,792,391 A | 2/1974 | Ewing |
| 3,804,441 A | 4/1974 | Kobayashi et al. |
| 3,917,330 A | 11/1975 | Quantz |
| 4,017,107 A | 4/1977 | Hanchett |
| 4,026,589 A | 5/1977 | Hanchett, Jr. |
| 4,262,830 A | 4/1981 | Hayes |
| 4,268,076 A | 5/1981 | Itoi |
| 4,390,197 A | 6/1983 | Butts |
| 4,595,220 A | 6/1986 | Hanchett, Jr. et al. |
| 4,623,178 A | 11/1986 | Geringer et al. |
| 4,626,010 A | 12/1986 | Hanchett, Jr. et al. |
| 4,648,036 A | 3/1987 | Gallant |
| 4,667,990 A | 5/1987 | Quantz |
| 4,667,991 A | 5/1987 | Pèbre |
| 4,748,833 A | 6/1988 | Nagasawa |
| 4,901,545 A | 2/1990 | Bacon et al. |
| 4,956,984 A | 9/1990 | Chi-Cheng |
| 4,967,577 A | 11/1990 | Gartner et al. |
| 5,007,261 A | 4/1991 | Quantz |
| 5,020,345 A | 6/1991 | Gartner et al. |
| 5,033,282 A | 7/1991 | Gartner et al. |
| 5,134,870 A | 8/1992 | Uyeda et al. |
| 5,142,890 A | 9/1992 | Uyeda et al. |
| 5,217,088 A | 6/1993 | Dallman |
| 5,307,656 A | 5/1994 | Gartner et al. |
| 5,474,348 A | 12/1995 | Palmer et al. |
| 5,484,180 A | 1/1996 | Helmar |
| 5,520,450 A | 5/1996 | Colson, Jr. et al. |
| 5,540,068 A | 7/1996 | Gartner et al. |
| 5,617,082 A | 4/1997 | Denison et al. |
| 5,690,373 A | 11/1997 | Luker |
| 5,769,011 A | 6/1998 | Daniel |
| 5,806,355 A | 9/1998 | Lanigan et al. |
| 5,876,073 A | 3/1999 | Geringer et al. |
| 5,927,772 A | 7/1999 | Antonucci et al. |
| 5,934,720 A | 8/1999 | Karalius |
| 6,021,038 A | 2/2000 | Hanchett, Jr. |
| 6,089,058 A | 7/2000 | Elpern et al. |
| 6,089,626 A | 7/2000 | Shoemaker |
| 6,092,846 A | 7/2000 | Fuss et al. |
| 6,108,188 A | 8/2000 | Denison et al. |
| 6,112,502 A | 9/2000 | Frederick et al. |
| 6,116,067 A | 9/2000 | Myers et al. |
| 6,125,670 A | 10/2000 | Fuss et al. |
| 6,133,842 A | 10/2000 | Gariepy |
| 6,209,367 B1 | 4/2001 | Hyatt et al. |
| 6,359,547 B1 | 3/2002 | Denison et al. |
| 6,384,711 B1 | 5/2002 | Cregger et al. |
| 6,390,520 B1 | 5/2002 | Holzer |
| 6,655,180 B2 | 12/2003 | Gokcebay et al. |
| 6,708,538 B1 | 3/2004 | Walby |
| 6,730,867 B2 | 5/2004 | Hyp |
| 6,741,160 B1 | 5/2004 | Dawson et al. |
| 6,791,450 B2 | 9/2004 | Gokcebay et al. |
| 6,816,075 B2 | 11/2004 | Grunes et al. |
| 6,879,243 B1 | 4/2005 | Booth et al. |
| 6,886,869 B2 | 5/2005 | Martinez et al. |
| 6,950,944 B2 | 9/2005 | Yager et al. |
| 6,983,884 B2 | 1/2006 | Auchinleck |
| 7,004,517 B2 | 2/2006 | Vitry et al. |
| 7,021,684 B2 | 4/2006 | Orbeta et al. |
| D520,340 S | 5/2006 | Freck |
| 7,131,673 B2 | 11/2006 | Cherry et al. |
| 7,145,434 B2 | 12/2006 | Mlynarczyk et al. |
| 7,239,963 B2 | 7/2007 | Suzuki |
| 7,296,830 B2 | 11/2007 | Koveal et al. |
| 7,336,150 B2 | 2/2008 | Gokcebay et al. |
| 7,380,426 B2 | 6/2008 | Dalton, Jr. et al. |
| 7,455,335 B2 | 11/2008 | Garneau et al. |
| 7,456,725 B2 | 11/2008 | Denison et al. |
| 7,469,564 B1 | 12/2008 | Shaw |
| 7,472,934 B2 | 1/2009 | Burke et al. |
| 7,482,907 B2 | 1/2009 | Denison et al. |
| 7,516,632 B2 | 4/2009 | Poppell |
| 7,516,633 B1 | 4/2009 | Chang |
| 7,603,882 B2 | 10/2009 | Carbajal et al. |
| 7,683,758 B2 | 3/2010 | Denison et al. |
| 7,728,711 B2 | 6/2010 | Shoenfeld |
| 7,741,952 B2 | 6/2010 | Denison et al. |
| 7,768,378 B2 | 8/2010 | Hill et al. |
| 7,812,774 B2 | 10/2010 | Friman et al. |
| 7,830,320 B2 | 11/2010 | Shamblin et al. |
| 7,911,402 B2 | 3/2011 | Rowson et al. |
| 8,047,582 B1 | 11/2011 | Rodgers et al. |
| 8,104,803 B2 | 1/2012 | Horton et al. |
| 8,179,323 B2 | 5/2012 | Shamblin et al. |
| 8,199,019 B2 | 6/2012 | Kaczmarz et al. |
| 8,207,858 B2 | 6/2012 | Knopf et al. |
| 8,251,295 B2 | 8/2012 | Ritamaki et al. |
| 8,384,545 B2 | 2/2013 | Hussain et al. |
| 8,490,443 B2 | 7/2013 | Gokcebay |
| 8,495,898 B2 | 7/2013 | Gokcebay |
| 8,516,864 B2 | 8/2013 | Greiner et al. |
| 8,633,863 B2 | 1/2014 | Desclos et al. |
| 8,686,859 B2 | 4/2014 | Hussain et al. |
| 8,742,889 B2 | 6/2014 | Kaczmarz et al. |
| 8,794,531 B2 | 8/2014 | Ritamäki et al. |
| 8,928,140 B2 | 1/2015 | Nikitin |
| 8,970,344 B2 | 3/2015 | Payson et al. |
| 9,013,307 B2 | 4/2015 | Hussain et al. |
| 9,013,309 B2 | 4/2015 | Hussain et al. |
| 9,076,092 B2 | 7/2015 | Ritamaki et al. |
| 9,189,769 B2 | 11/2015 | Caputo et al. |
| 9,223,934 B2 | 12/2015 | Hussain et al. |
| 9,536,359 B1 | 1/2017 | Gokcebay |
| 9,858,521 B2 | 1/2018 | Ritamäki et al. |
| 2002/0014950 A1 | 2/2002 | Ayala et al. |
| 2002/0112174 A1 | 8/2002 | Yager et al. |
| 2003/0024288 A1 | 2/2003 | Gokcebay et al. |
| 2004/0032131 A1 | 2/2004 | Cherry |
| 2004/0066296 A1 | 4/2004 | Atherton |
| 2004/0084526 A1 | 5/2004 | Knowles et al. |
| 2005/0146419 A1 | 7/2005 | Porter |
| 2005/0166144 A1 | 7/2005 | Gross |
| 2005/0179517 A1 | 8/2005 | Harms et al. |
| 2005/0199026 A1 | 9/2005 | Geringer et al. |
| 2005/0225097 A1 | 10/2005 | Geringer et al. |
| 2006/0097522 A1 | 5/2006 | Denison et al. |
| 2006/0097525 A1 | 5/2006 | Toma et al. |
| 2006/0139148 A1 | 6/2006 | Faro et al. |
| 2006/0139149 A1 | 6/2006 | Faro et al. |
| 2006/0150694 A1 | 7/2006 | Frolov et al. |
| 2006/0186678 A1 | 8/2006 | Myers et al. |
| 2006/0214789 A1 | 9/2006 | Posamentier et al. |
| 2007/0018791 A1 | 1/2007 | Johnson et al. |
| 2007/0046040 A1 | 3/2007 | Chang |
| 2007/0125100 A1 | 6/2007 | Shoenfeld |
| 2007/0169525 A1 | 7/2007 | Chang |
| 2007/0188303 A1 | 8/2007 | Faro et al. |
| 2007/0245784 A1 | 10/2007 | Geringer et al. |
| 2007/0257773 A1 | 11/2007 | Hill et al. |
| 2007/0277571 A1 | 12/2007 | Gokcebay |
| 2008/0084836 A1 | 4/2008 | Baird et al. |
| 2008/0169657 A1 | 7/2008 | Horton et al. |
| 2008/0224481 A1 | 9/2008 | Geringer et al. |
| 2008/0246286 A1 | 10/2008 | Ostrowski |
| 2008/0252083 A1 | 10/2008 | Carabalona |
| 2008/0293019 A1 | 11/2008 | Dooley et al. |
| 2009/0102415 A1 | 4/2009 | Muchow et al. |
| 2009/0132090 A1 | 5/2009 | Kaczmarz et al. |
| 2009/0282879 A1 | 11/2009 | Marcelle et al. |
| 2010/0033329 A1 | 2/2010 | Davis et al. |
| 2010/0141381 A1 | 6/2010 | Bliding et al. |
| 2010/0213264 A1 | 8/2010 | Ahokas et al. |
| 2010/0253519 A1 | 10/2010 | Brackmann et al. |
| 2011/0012709 A1 | 1/2011 | Payson et al. |
| 2011/0074543 A1 | 3/2011 | Kaczmarz et al. |
| 2011/0148582 A1 | 6/2011 | Ritamaki |
| 2011/0169614 A1 | 7/2011 | Mingerink et al. |

(56) References Cited

U.S. PATENT DOCUMENTS

| | | |
|---|---|---|
| 2011/0172550 A1 | 7/2011 | Martin et al. |
| 2011/0216364 A1 | 9/2011 | Konno et al. |
| 2011/0248833 A1 | 10/2011 | Ritamäki |
| 2013/0067969 A1 | 3/2013 | Webb et al. |
| 2013/0255337 A1 | 10/2013 | Mullis et al. |
| 2015/0368930 A1 | 12/2015 | Mullis et al. |
| 2016/0025365 A1 | 1/2016 | Moudy |
| 2016/0355291 A1 | 12/2016 | Mahar et al. |
| 2017/0013071 A1 | 1/2017 | McCrea |
| 2017/0053071 A1 | 2/2017 | Caputo |
| 2018/0253632 A1 | 9/2018 | Uland et al. |
| 2019/0139638 A1 | 5/2019 | Keefe et al. |

OTHER PUBLICATIONS

Ari Juels, "RFID Security and Privacy: A Research Survey" (RSA Laboratories Sep. 28, 2005), IEEE Journal on Selected Areas of Communications, Mar. 2006, pp. 1-19 (https://www.researchgate.net/profile/Ari_Juels/publication/3236246_RFID_security_and_privacy_A_research_survey/links/00b4953bbe80a8c975000000/RFID-security-and-privacy-A-research-survey.pdf).

M. Ritamäki and A. Ruhanen, "Embedded passive UHF RFID seal tag for metallic returnable transit items," 2010 IEEE International Conference on RFID (IEEE RFID 2010), Orlando, FL, USA, 2010, pp. 152-157, doi: 10.1109/RFID.2010.5467263. (Year: 2010).

IMPINJ, INC.; Indy® RS500 Datasheet, IPJ-RS500-GX, IPJ-RS500-EU Electrical, Mechanical, & Thermal Specification; Revision 1.1; Copyright 2014 (25 pages).

NXP Semiconductors N.V.; SL3S1003_1013 UCODE GZiM and G2iM+ Product data sheet; Rev. 3.7; May 21, 2015 (43 pages).

Office Action dated Sep. 18, 2018 in U.S. Appl. No. 12/888,510.

PCT International Search Report, PCT International Application No. PCT/US2020/018494, Date of completion of International Search: Apr. 20, 2020, dated Jun. 5, 2020.

Written Opinion of the International Searching Authority, PCT International Application No. PCT/US2020/018494, Date of completion of Opinion: Apr. 20, 2020, dated Jun. 5, 2020.

Non-Final Office Action dated Feb. 26, 2021 in U.S. Appl. No. 16/788,672.

\* cited by examiner

FIG. 7

INVENTORY RUN MODE — 88

| # | EPC VALUE | TotCnt | RD1Cnt | RD2Cnt | RDRate | RS1mx | RS2mx | Time0 | Timetx | Time10 | NoChg | Antenna |
|---|---|---|---|---|---|---|---|---|---|---|---|---|
| 1 | E280-1160-6000-0207-1144-833C | 661 | 661 | 0 | 22.6 | -36 | --- | 0.000 | 29.194 | 29.195 | 1 | N/A |
| 2 | E280-1160-6000-0207-1144-838C | 102 | 102 | 0 | 3.5 | -62 | --- | 0.006 | 28.976 | 28.971 | 4 | N/A |
| 3 | E280-1160-6000-0207-1144-832C | 635 | 635 | 0 | 21.8 | -57 | --- | 0.010 | 29.193 | 29.183 | 1 | N/A |
| 4 | E280-1160-6000-0207-1144-830C | 616 | 616 | 0 | 21.1 | -59 | --- | 0.012 | 29.196 | 29.184 | 1 | N/A |
| 5 | E280-1160-6000-0207-1144-831C | 581 | 581 | 0 | 19.9 | -62 | --- | 0.015 | 29.232 | 29.217 | 0 | N/A |
| 6 | E280-1160-6000-0207-1144-839C | 548 | 548 | 0 | 18.8 | -60 | --- | 0.018 | 29.195 | 29.177 | 1 | N/A |
| 7 | E280-1160-6000-0207-1144-71FC | 241 | 241 | 0 | 8.3 | -65 | --- | 0.237 | 29.223 | 28.985 | 5 | N/A |
| 8 | E280-1160-6000-0207-1144-835C | 227 | 227 | 0 | 8.0 | -62 | --- | 0.453 | 28.972 | 28.520 | 4 | N/A |

FIG. 8

INVENTORY RUN MODE — 88

| # | EPC VALUE | TotCnt | RD1Cnt | RD2Cnt | RDRate | RS1mx | RS2mx | Time0 | Timetx | Time10 | NoChg | Antenna |
|---|---|---|---|---|---|---|---|---|---|---|---|---|
| 1 | E280-1160-6000-0207-1144-833C | 1258 | 1258 | 0 | 20.6 | -36 | --- | 0.000 | 61.204 | 61.204 | 279 | N/A |
| 2 | E280-1160-6000-0207-1144-838C | 153 | 153 | 0 | 3.9 | -59 | --- | 0.006 | 38.940 | 38.935 | 563 | N/A |
| 3 | E280-1160-6000-0207-1144-832C | 809 | 809 | 0 | 22.0 | -57 | --- | 0.010 | 36.802 | 36.792 | 591 | N/A |
| 4 | E280-1160-6000-0207-1144-830C | 755 | 755 | 0 | 20.9 | -59 | --- | 0.012 | 36.175 | 36.162 | 599 | N/A |
| 5 | E280-1160-6000-0207-1144-831C | 727 | 727 | 0 | 20.3 | -61 | --- | 0.015 | 35.901 | 35.886 | 602 | N/A |
| 6 | E280-1160-6000-0207-1144-839C | 682 | 682 | 0 | 19.2 | -59 | --- | 0.018 | 35.502 | 34.484 | 607 | N/A |
| 7 | E280-1160-6000-0207-1144-71FC | 292 | 292 | 0 | 8.4 | -65 | --- | 0.237 | 34.950 | 34.713 | 615 | N/A |
| 8 | E280-1160-6000-0207-1144-835C | 278 | 278 | 0 | 8.2 | -62 | --- | 0.453 | 34.519 | 34.066 | 620 | N/A |
| 9 | E280-1160-6000-0207-1144-836C | 1 | 1 | 0 | 0.0 | -67 | --- | 34.202 | 34.202 | 0.000 | 624 | N/A |

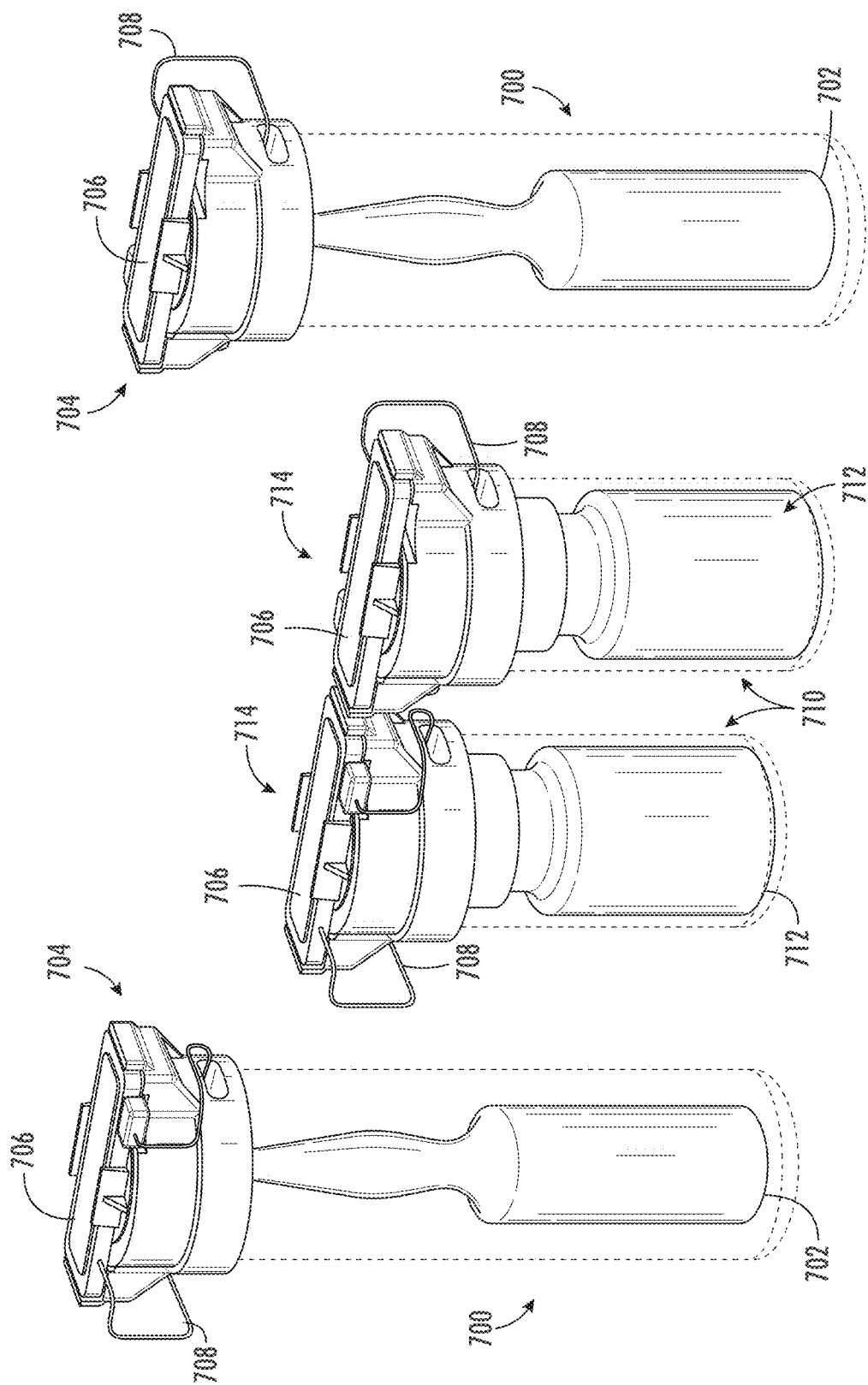

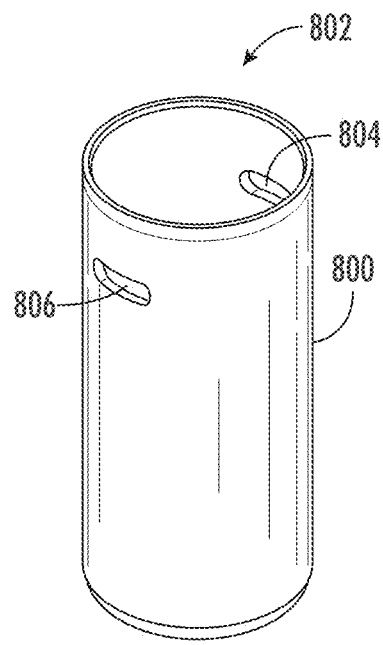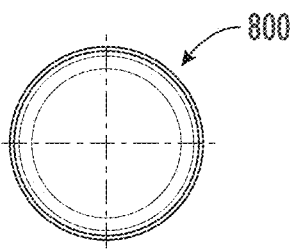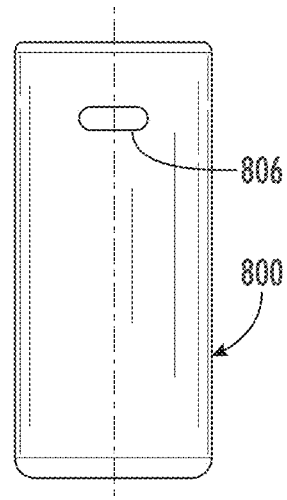
FIG. 20A    FIG. 20B    FIG. 20C
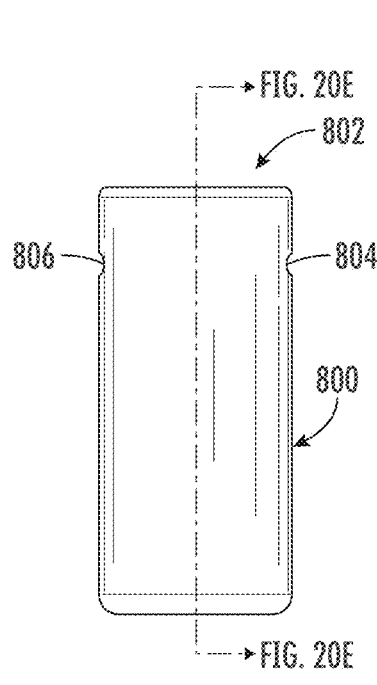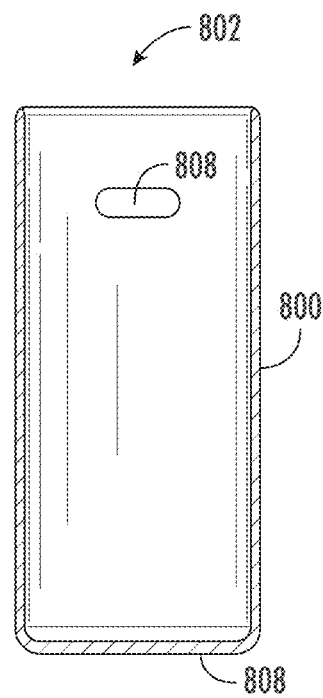
FIG. 20D    FIG. 20E

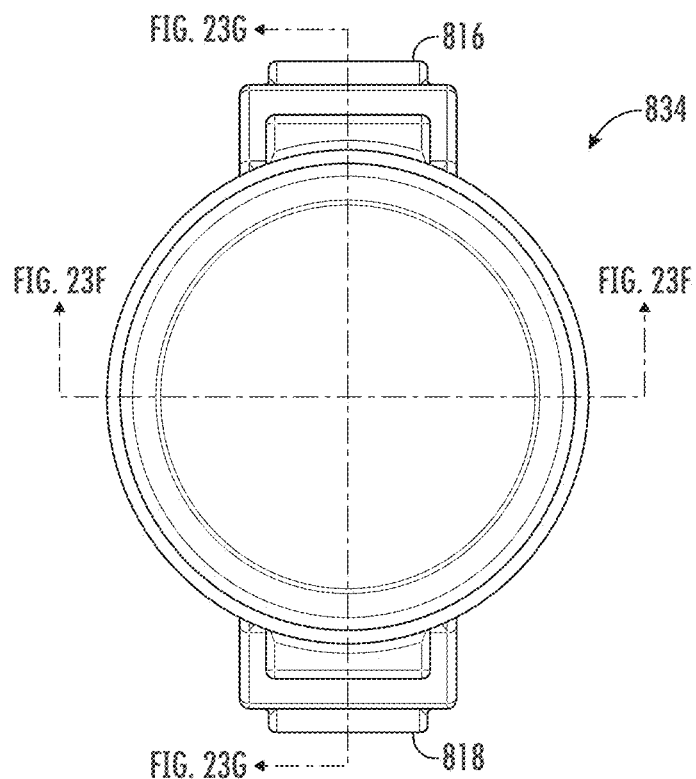
FIG. 23E
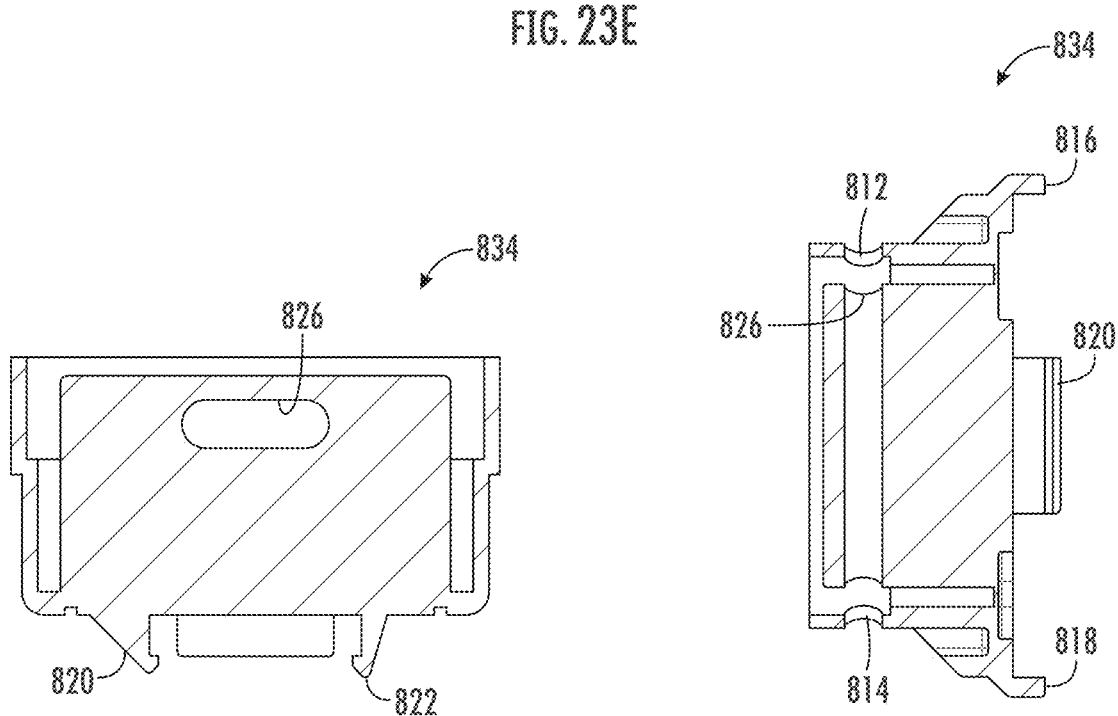
FIG. 23F
FIG. 23G

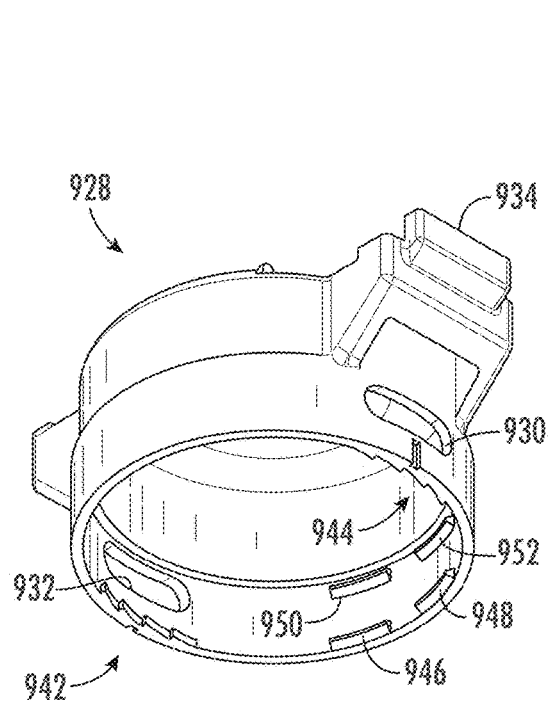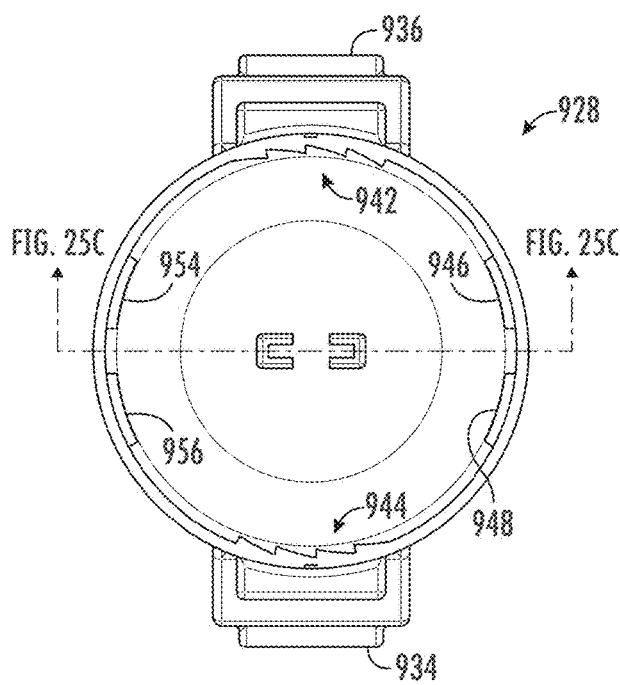
FIG. 25A  FIG. 25B
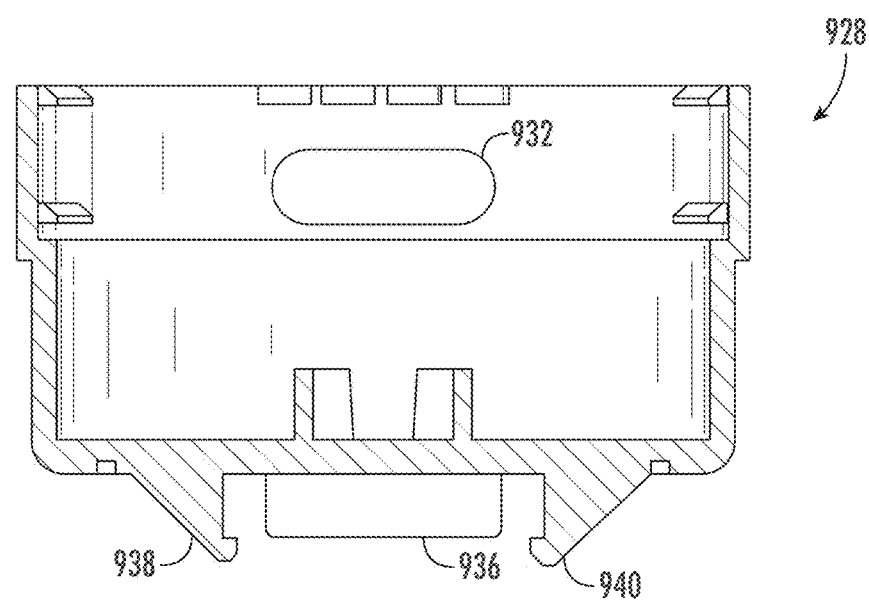
FIG. 25C

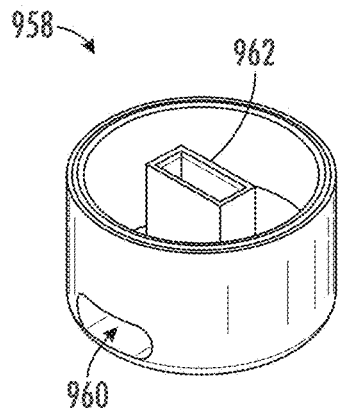
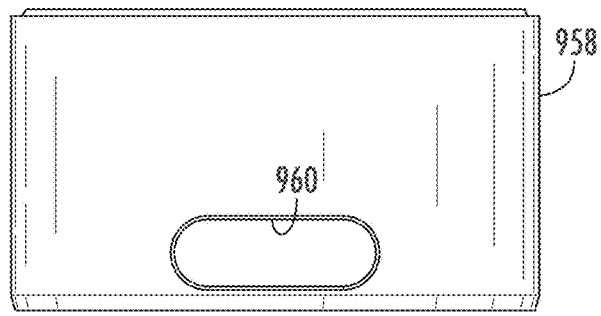
FIG. 26A
FIG. 26B
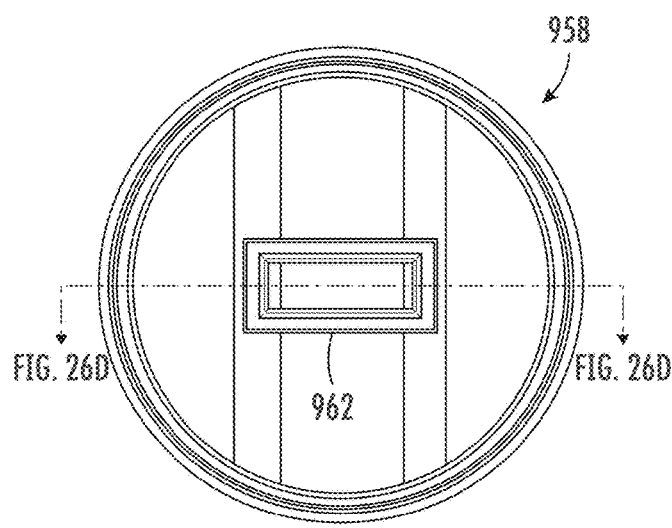
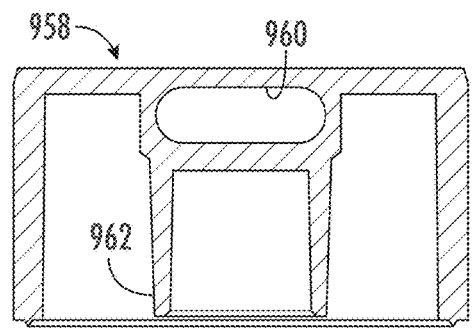
FIG. 26C
FIG. 26D

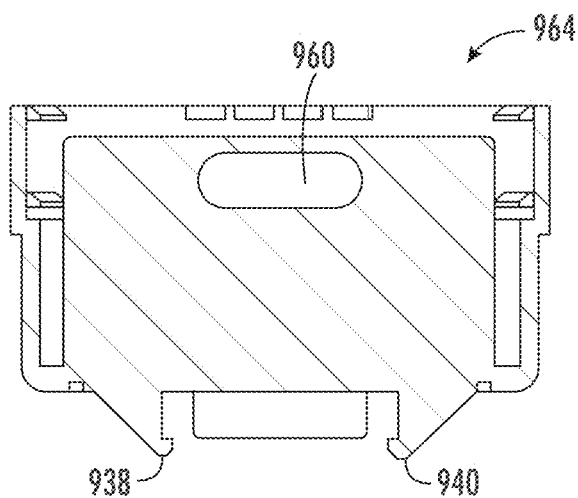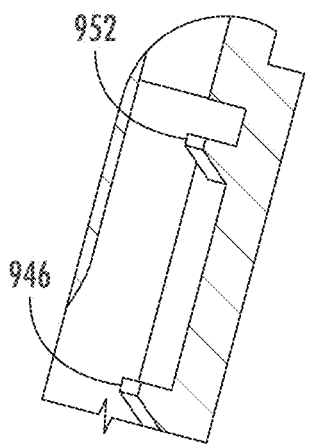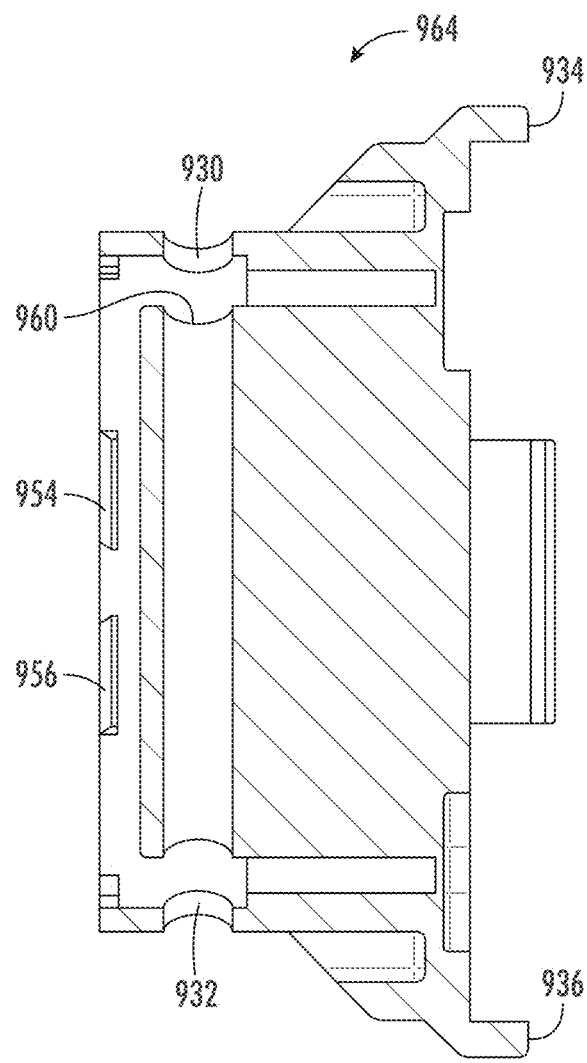

MEDICINAL DOSAGE STORAGE METHOD FOR COMBINED ELECTRONIC INVENTORY DATA AND ACCESS CONTROL

PRIORITY CLAIM

This application claims priority to, and is a divisional of, U.S. application Ser. No. 16/788,672 filed Feb. 12, 2020 entitled "MEDICINAL DOSAGE STORAGE AND METHOD FOR COMBINED ELECTRONIC INVENTORY DATA AND ACCESS CONTROL" which claimed benefit of U.S. Provisional Patent Application entitled "MEDICINAL DOSAGE STORAGE AND METHOD FOR COMBINED ELECTRONIC INVENTORY DATA AND ACCESS CONTROL," and assigned U.S. Ser. No. 62/806,962, filed Feb. 18, 2019, which are incorporated herein by reference for all purposes.

FIELD OF THE SUBJECT MATTER

The presently disclosed subject matter generally relates to lock or access control systems, and more particularly to data control for electronically controlled lock systems such as may be applied to various storage enclosures or cabinets to provide secure storage of various items, equipment, materials, and/or information within the enclosures or cabinets. More specifically, certain present aspects may relate to associated and/or integrated inventory control, billing, diversion control, and/or inventory future utilization planning, all in connection with the ability to access a central server over a network such as an 802.11 WiFi wireless network. Further, certain present aspects may relate to associated and/or integrated storage features for medicinal dosages for inventory control, billing, diversion control, and/or inventory future utilization planning. Particularly in conjunction with the storage of controlled substances, such as some drugs utilized on an EMS vehicle, in some presently disclosed instances, a tamper evident RFID tag may be fully or partially destroyed or damaged, or otherwise impacted or affected so as to generate a changed ID, whenever the contained medicinal dosage is acquired for administration. In some such instances, specific container/cap combinations may accommodate various drug dosages, and may be combinable with tamper evident RFID tags.

BACKGROUND OF THE SUBJECT MATTER

Many occasions arise that require or make desirable access control of different cabinets, entryway doors, carts, tool boxes, and/or other types of boxes, hereafter (regardless generally of their compositions, materials, or configurations) collectively referred to as an enclosure or cabinet. Such enclosures or cabinets may be provided with doors and/or may also include removable storage boxes or drawers.

The need and/or desire for access control usually arises from the lack of security often provided by typical lock and key mechanisms. For example, a mechanical key may be lost or stolen. Once such a lost or stolen key has been surreptitiously obtained by an unauthorized individual, such individual in possession of such key may easily access the secured enclosure to either steal its contents, for example, as in the case of secured medicines or other controlled substances. Further, when such enclosures or cabinets are portable, issues can become compounded for tracking when and by whom such access took place. For controlled substances, it may be desirable and/or required to track what is referenced as a "chain of custody" in terms of who is responsible for accounting. "Chain of custody" in the present context is meant to be able to know and show who was in control of an item (for example, a controlled substance) minute-by-minute, so that that level of control can be established at every moment of a day or given time period. "Chain of custody" level of information and data can be advantageous for many practical reasons, but in some instances may be an absolute need, such as in the case of evidence in a legal matter.

Such shortcomings of keyed mechanical locks have contributed to the creation of the specialized field of electronic access control.

Typically, electronic access control may correspond to a three part system, including, for example: (1) a credential reader, (2) a microprocessor based control circuit, and (3) an electronic lock to open or unlock the enclosure being secured by the access control system.

Credential readers may include, but are not limited to: keypads, magnetic stripe card readers, proximity card readers, "ibuttons," smart card readers, and/or bar code card readers. In the recent past, there has been significant progress in the field of biometrics that includes, but is not limited to, the ability to reliably read and discern an individual's fingerprints, handprints, and retina and/or facial features.

Generally speaking, credential and/or biometric readers typically convert their applicable credential or biometric features, respectively, into a binary number. A microprocessor based system then reads and analyzes such binary number. Such systems are typically either standalone (attached to the reader) or networked (attached to many readers). Typically, they may read the binary number that corresponds to the potential entrant's credential or biometric features and compare it to a list of approved binary numbers. In such fashion, the microprocessor based system determines if the potential entrant has the right to access the enclosure or cabinet being secured by the access control system.

If the microprocessor based system determines that the subject credential or biometric feature under consideration is valid, access is granted to the enclosure. Typically, such is accomplished by the microprocessor turning on an electronic control circuit corresponding to solid state devices or relays which in turn provide a useable electrical voltage to open an electronic lock mechanism.

The electronic access control system may be networked to control multiple electronic locks for providing secure storage for many cabinets or enclosures, or individual doors and drawers in such cabinets or enclosures. Such electronic access control systems often require the management and control of various types of data associated with the electronic access system and/or a particular electronic lock, enclosure, or cabinet. For example, such electronic access control systems may include a significant amount of stored data regarding both users of the electronic access system and the electronic locks themselves. Typical user data may include: user name, credential type and ID, supervisor level, and valid access times. Typical lock data may include: lock name, access hardware (e.g. keypad or hardware), and open time. Electronic access control systems also typically include a database of relational data detailing which users can access or open which electronic locks.

Other types of data or information used in electronic control systems may include inventory data and/or audit trail data. Many occasions arise where there is an identified need to store and track individual items or particular types of items stored in a cabinet or enclosure. One such circumstance relates to the field of controlled medications (i.e.

medicinal products) and, in particular, narcotics as may be administered to patients in a medical facility. Another application may be in the storage of tools or other parts in cabinets or enclosures. In such occasions, it may be desirable to maintain inventory data at the electronic lock as to the status of individual items or particular types of items stored in a cabinet or enclosure. Another aspect of inventory data gathering is a desire for a fully automated system to be implemented where possible, meaning that such specific data gathering is completely transparent to the user, such that the user is not required to make any specific effort. In other words, a fully automated system regarding inventory data would be one where the user is manipulating the inventory as needed for inventory usage purposes, while the system is otherwise keeping up with inventory data without requiring any special actions or attention of the inventory user.

It may also be desirable to store and track which users gained access to which cabinets or enclosures, as well as the time of such access by the user. Such information or data may be tracked and stored as audit trail data and conveyed in an audit trail report to a supervisor or other individual.

Certain access control systems also incorporate environmental monitoring systems that can record environmental data, such as temperature. For example, as is known in the medical profession, certain medications may be temperature sensitive and rendered unfit for use if not maintained within a given temperature range. Under such conditions, therefore, a need exists not only to secure such medications but to also continuously monitor the temperature at which they are stored. Such data may also be conveyed in an audit trail format to a supervisor or other individual.

The various data used or created by the access control system may need to be modified or updated, often on a regular basis, due to the continuously changing circumstances of the environment in which the access control system is used. For example, updates may need to be made as to which users can access which cabinets or enclosures. In the storage of medical products, updates may be desired which may include: settings of respective high and low temperature limits for the storage of the medical products, settings of the permitted time period outside such desired limits, settings of various alarms, and the setting of restricted access if certain limits are reached.

Access control systems may allow manipulation and control of the access control data at the actual electronic lock itself. In such circumstances, the updating and modification of access control data for each of the individual electronic locks may require a supervisor, serviceman, or someone of higher position than a "normal" user to go to the lock with a computer such as a laptop computer to perform the data updating and manipulation. In some systems, access control data may be updated on a central computer. Currently there are systems that will allow remote database manipulation and audit trail or other information downloads.

One specialized circumstance involves what may be referenced as a "narcotics box," which is transported such as on an ambulance (Emergency Medical Services vehicle) for use by EMS personnel, such as paramedics or other first responders. Furthermore, such narcotics box may be preloaded by a supervisor, and then carried onto an EMS vehicle for possible use during the course of a shift. For example, the current assignee provides a narcotics box for EMS vehicles, which is outfitted with an electronic lock to provide access control along with an audit trail. Communications may be via WiFi, Ethernet, or a completely non-network based arrangement. The box itself may be comprised of a heavy duty construction, such as seam welded 14 gauge steel, and have a scratch-resistant finish. Further, the box may have a built-in converter for dedicated power when used on an EMS vehicle, along with an auto-relocking door feature with mechanical key override.

Commonly owned US patents related to electronic lock subject matter include, for example, U.S. Pat. No. 6,116,067 entitled "Electronically Controlled Lock System for Tool Containers"; U.S. Pat. No. 7,145,434 entitled "System and Method for Key Control in an Electronic Locking System"; U.S. Pat. No. 7,380,426 entitled Panel Lock for Electronic, Electrical, or Control Cabinet"; U.S. Pat. No. 7,768,378 entitled Field Retrofittable Refrigerator Lock with Audit Trail"; U.S. Pat. No. 8,199,019 entitled "Field Retrofittable Refrigerator Lock with Temperature Monitoring, Temperature Based Access Control and Alarming"; U.S. Pat. No. 8,516,864 entitled "Electronic Latch Mechanism"; U.S. Pat. No. 8,742,889 entitled "Apparatus and Method for Electronic Access Control"; and U.S. Pat. No. 8,970,344 entitled "Method and System for Data Control in Electronic Locks."

In addition, inventory control generally involves the specific awareness of items and numbers of inventory items. In the context of a so-called narcotics box and stored controlled substances, such data ideally would be dosage and drug specific, as well as numerically specific.

In the subject of tracking individual pieces of inventory, a field has developed which relates to so-called radio frequency-based identification (RFID) technology. Very simply, RFID involves the use of electromagnetic fields for the purpose of automatically identifying (and therefore tracking) RFID tags attached to or associated with specific objects. One manufacturer called "Times-7" (Cupertino, Calif.) provides various limited profile UHF RFID antennas suitable for a range of space constrained applications, such as flush wall mounting or other restrictive environments faced by users. Another manufacturer called Impinj (Seattle, Wash.) provides high-performance, enterprise-class fixed RFID readers. Another manufacturer MEPS Real-Time, Inc. (Carlsbad, Calif.) combines RFID tagging with contents in a refrigerator to take inventory of everything that was removed or restocked back based on such RFID tags. MEPS has various US patents, including U.S. Pat. Nos. 7,812,774; 7,830,320; 7,911,402; 8,179,323; 8,384,545; 8,633,863; 8,686,859; 8,928,140; 9,013,307; 9,013,309; 9,189,769; and 9,223,934, and including published US patent applications including United States Patent Application Publication Nos. 20170013071 and 20110216364. Other companies such as Ruro (Frederick, Md.) and TERSO SOLUTIONS GMBH (Madison, Wis.) provide various inventory management systems. Another US patent disclosing the use of RFID is U.S. Pat. No. 9,536,359 entitled "Delivery system via electronic lockboxes."

The complete disclosures of all US patent publication-related documents referenced herein are fully incorporated herein by reference, and for all purposes.

While various implementations of data control for access control systems have been developed, no design has emerged that generally encompasses all of the desired characteristics as hereafter presented in accordance with the subject technology.

SUMMARY OF THE SUBJECT MATTER

In view of the recognized features encountered in the prior art and addressed by the presently disclosed subject matter, improved apparatus and methodology are presently disclosed for combined electronic inventory data and access control in electronic lock based access control systems. It is to be understood that the presently disclosed subject matter equally encompasses both apparatus and methodology.

In one exemplary configuration, an electronic access and inventory system may include tracking of a plurality of doses of controlled substances such that a virtual "chain of custody" is established and maintained. "Chain of custody" in the present context is meant to be able to know and show who was in control of an item (for example, a controlled substance) minute-by-minute, so that that level of control can be established at every moment of a day or given time period.

In accordance with certain aspects of certain embodiments of the presently disclosed subject matter, tracking may be established and maintained for a narcotics box or case location. In further detailed embodiments, the narcotics box or case contents (that is, the controlled substances-drugs) may be tracked.

In yet other exemplary embodiments, such tracking may specifically take place in the context of an ambulance narcotics box case/contents, involving such as EMS personnel, such that a complete record of custody of the case/contents is maintained from morning or start-of-shift removal from a central station, to throughout the work day, to return to station.

Some exemplary embodiments herewith relate to various configurations for RFID tags to be incorporated directly with a "product" (or medicine dosage pak) such that the pak/RFID tag combination is destroyed or has altered performance (ID characteristic) when it is opened, thereby causing the RFID tag to no longer further operate in the same way as it did previously. Such various "product" alternative embodiments may operate and/or be used in conjunction and combination with systems and methods otherwise described herein, particularly to accommodate different sized or shaped medicinal items (such as vials, ampules, or preloaded injectables) to be administered.

In accordance with yet additional aspects of certain embodiments of the presently disclosed subject matter, the electronic access system may be configured for placement of RFID tags directly on a "product" (or medicine dosage pak) such that the pak is destroyed or has altered performance (ID characteristic) when it is opened, thereby causing the RFID tag to no longer further operate in the same way as it did previously, to thereby read "removed" relative to maintained inventory information. Alternatively, in some embodiments, the RFID tag performance is modified in some trackable way whenever the pak or some frangible component thereof is "ruptured," such as reduced in performance for a relatively lower signal strength output, or such as having an ID that changes in response to a "tamper" indication.

In accordance with yet further aspects of certain embodiments of the presently disclosed subject matter, RFID tags may be provided preprogramed for corresponding to a particular drug or controlled substance to be stocked into a box, in order to eliminate the need for separate, individual enrollment of tags into the system. Further, per some embodiments, tagging may be color coated or otherwise visually enhanced for recognition and for human or robotic/automated handling. Increased speed of identification and handling can be of significant importance in a medical emergency setting that may be faced such as by EMS personnel.

For further exemplary embodiments, particularly for tracking methodology comprising a presently disclosed audit trail, EMS personnel may receive at the beginning of a shift receive a preloaded box or case to be mounted into their associated EMS vehicle. Once secured, an initial inventory may be taken of the contents as mounted into the vehicle. Thereafter, tracked transactions throughout a shift will eventually re reported, and a completed shift inventory will be taken relative to an initial inventory to determine cumulative usage throughout the shift for comparison with the detailed audit report of each individual withdrawal/transaction relative to the box during the course of the shift. Such augmented audit trail generation combined with electronic access control can result in improved inventory control, the generation of automated billing, improved diversion control, and in improved future planning based on determination of consumption patterns.

One presently disclosed exemplary embodiment relates to a system for combined electronic inventory data and access control. Such exemplary system preferably may comprise a closable enclosure; a plurality of respective tamper evident RFID tags, each respectively associated with a corresponding plurality of matable paired cap and container components for receiving respective consumable inventory items, to be received in such enclosure; and an electronically actuated lock system for selectively allowing locking and unlocking of such enclosure. Further, per such exemplary system, such tamper evident RFID tags preferably have a tamper evident feature associated with a mated pair of such cap and container components for providing an altered ID characteristic readable by an RFID reader once such tamper evident feature may be disturbed by separation of such mated pair of cap and container components for access to their respective consumable inventory items; and such system further may include an RFID reading system, associated with such enclosure, and adapted for determining at a selected time tamper evident RFID tags with unaltered ID characteristics received within such enclosure when closed, so as to identify corresponding respective consumable inventory items associated therewith.

Per some alternatives of the foregoing, such tamper evident feature may comprise an external loop associated with a respective tamper evident RFID tag and entrained through its associated mated pair of cap and container components to be ruptured whenever such mated pair of cap and container components may be separated for access to their respective consumable inventory items. For yet others, such altered ID characteristic thereof may comprise at least one of that such ID characteristic may include a flagged tamper bit as readable by an RFID reader whenever such RFID tag external loop may be ruptured, that such ID characteristic as readable by an RFID reader may be eliminated whenever such RFID tag external loop may be ruptured, and that such ID characteristic may have relatively reduced signal strength as readable by an RFID reader whenever such RFID tag external loop may be at least partially ruptured.

For some variations of the foregoing, such paired cap and container components may include respective openings which may be alignable when such cap and container components may be mated so that their associated external loop pass through such respective openings. For yet others thereof, such openings may comprise a pair of respective holes through such cap and a pair of respective holes through opposing outside walls of such container.

For some other alternatives of the foregoing, such openings may comprise a pair of respective holes through such cap and a pair of respective slots through opposing outside walls of such container, so that an external loop passed through such respective holes of such cap may be introduced into such slots of such container outside walls whenever such cap may be fitted to such container. In other variations, some such systems in some instances may further include respective protruding element alignment nodes and motion limiting stops on the outside of such container and on an inside rim of such cap, to prevent direct-pull removal of such cap from such container; and respective ratcheting members on the outside of such container and on such inside rim of such cap, for respective engagement of such ratcheting members whenever such cap may be fitted to such container, to limit rotation of such cap thereafter to a single direction thereof relative to such container for removal of such cap from such container.

Yet for other some variations, each of such respective plurality of cap components may include means for supporting and holding its associated respective tamper evident RFID tag. For some such variations, such means for supporting and holding may include paired elements protruding from each respective cap for cooperating to hold its associated respective tamper evident RFID tag in place.

For other alternatives in some instances, each of such RFID tags may have a wire receiver slot thereon, and each of external loops of each of such tamper evident RFID tags each may comprise a wire that may include one end thereof directly attached to its RFID tag and one loose end thereof which can be inserted and locked into such receiver slot on such RFID tag and thereafter not removed from such slot.

For some variations, such closable enclosure may be lockable in a closed position thereof; and such RFID reading system may determine inventory of such enclosure at a plurality of times.

In some instances of such exemplary system subject matter, such plurality of times may include at least one determination later in time than another determination to establish inventory changes in such enclosure comprising inventory either of removed from or added to such enclosure during the interim between such two determinations. For some such, such electronically actuated lock system may be further adapted for maintaining an audit trail for actuation of such electronically actuated lock system and associating such audit trail with removed inventory to track chain of custody for such removed inventory; and such system may further include an integrated inventory control system in communication with such electronically actuated lock system. In some instances, such electronically actuated lock system may be further adapted for associating such audit trail with non-removed inventory to track such non-removed inventory; and such system may further include a central server communicating over a network for providing communications between such integrated inventory control system and such electronically actuated lock system. Still further, such system may further include a plurality of such closable enclosures, each having a respective electronically actuated lock system, and wherein such integrated inventory control system may be in communication with each of such closable enclosures via its respective electronically actuated lock system.

Per some alternatives, such system may further include a removable case receivable in such enclosure and having an associated non-alterable RFID tag for tracking of whether such removable case may be received within such enclosure, such removable case may be further adapted for receiving therein such consumable inventory items and their respective tamper evident RFID tags with respective tamper evident features.

For some exemplary variations, such plurality of respective tamper evident RFID tags with respective tamper evident features may be associated with respective consumable inventory items comprising controlled drugs for use on a mobile EMS vehicle. In some such instances, such tamper evident RFID tags with respective tamper evident features may be associated with respective markings readable by a human user.

For some alternatives of the foregoing, such closable enclosure may include a lockable door; and such system may further include paired sensors operatively associated with such door and such electronically actuated lock system for detection of whether such door may be open or closed, and an external power cable for providing external power to such electronically actuated lock system.

Still for further variations in some instances, such closable enclosure may include a reinforced housing with a lockable door; and such electronically actuated lock system may include an electronically movable latch and electronic access control circuit mounted within such reinforced housing, a user interface display and control panel mounted on the outside of such reinforced housing for controlling such movable latch into either of a locked or unlocked position thereof, and a corresponding stop member for preventing such enclosure door from being opened whenever such movable latch may be in such locked position thereof.

In yet other alternatives, such electronically actuated lock system may include a credential reader, a microprocessor based control circuit, and an electronic lock to allow access to such enclosure whenever acceptable credentials may be presented to such credential reader. Per some such alternatives, such microprocessor based control circuit maintains a log of activities of such electronic lock for providing access to such enclosure; and such log may include at least one of user name, credential type and ID, supervisor level, and valid access times. In other alternatives thereof, such system further may include a temperature sensor associated with such enclosure; and such microprocessor based control circuit may maintain temperature limit settings for stored inventory, and may monitor the output of such temperature sensor to set off an alarm if monitored temperatures may be outside of limit settings. Some such systems further may include an environmental sensor for monitoring of at least one of temperature, humidity, and vibrations.

For some of such systems, such RFID reading system associated with such enclosure further may include a limited profile RFID antenna within such enclosure. For others, such lockable enclosure may include an RFID antenna within such enclosure, and may include electromagnetic shielding so to block any external electromagnetic fields, so that any RFID readings may be limited to operative RFID tags and their associated contents which may be within such enclosure when such door may be closed.

Yet another presently disclosed exemplary embodiment may relate to a system for storage of consumable inventory items for use with combined electronic inventory data and access control, preferably comprising a pair of matable respective separable cap and container components, and a tamper evident RFID tag. Further preferably, for such pair of matable respective separable cap and container components, such container component may be preferably adapted for receiving a consumable inventory item, and such cap component may be preferably adapted to be selectively attached to and removed from such container component by a user, with such cap component when attached to such container component blocking access to any consumable inventory item received in such container component. For such tamper evident RFID tag, such tag preferably may have a tamper evident feature and may be associated with at least one of such matable cap and container components, for providing an altered ID characteristic readable by an RFID reader once such tamper evident feature may be disturbed by separation of such pair of cap and container components for access to a respective received consumable inventory item.

For some such exemplary embodiments, such tamper evident feature may comprise an external loop associated with such tamper evident RFID tag and entrained through its associated pair of cap and container components when mated to be ruptured whenever such mated pair of cap and container components may be separated for access to their respective received consumable inventory item. In others, such altered ID characteristic thereof may comprise at least one of that such ID characteristic may include a flagged tamper bit as readable by an RFID reader whenever such RFID tag external loop may be ruptured, that such ID characteristic as readable by an RFID reader may be eliminated whenever such RFID tag external loop may be ruptured, and that such ID characteristic may have relatively reduced signal strength as readable by an RFID reader whenever such RFID tag external loop may be at least partially ruptured.

Per some variations of the foregoing, such paired cap and container components may include respective openings which may be alignable when such cap and container components may be mated so that their associated external loop pass through such respective openings. For some of those, such openings may comprise a pair of respective holes through such cap and a pair of respective holes through opposing outside walls of such container. In other variations, such openings may comprise a pair of respective holes through such cap and a pair of respective slots through opposing outside walls of such container, so that an external loop passed through such respective holes of such cap may be introduced into such slots of such container outside walls whenever such cap may be fitted to such container. Some of those variation may further include respective protruding element alignment nodes and motion limiting stops on the outside of such container and on an inside rim of such cap, to prevent direct-pull removal of such cap from such container; and respective ratcheting members on the outside of such container and on such inside rim of such cap, for respective engagement of such ratcheting members whenever such cap may be fitted to such container, to limit rotation of such cap thereafter to a single direction thereof relative to such container for removal of such cap from such container.

In other alternatives of the foregoing embodiment, such cap component may include means for supporting and holding such tamper evident RFID tag. Ion some such alternatives, such means for supporting and holding may include paired elements protruding from such cap for cooperating to hold such tamper evident RFID tag in place. For other alternatives, such RFID tag may have a wire receiver slot thereon, and such external loop of such tamper evident RFID tag may comprise a wire that may include one end thereof directly attached to such RFID tag and one loose end thereof which can be inserted and locked into such receiver slot on such RFID tag and thereafter not removed from such slot.

Other variations of the foregoing may further comprise a plurality of pairs of such matable respective separable cap and container components for receiving respective consumable inventory items; and a corresponding plurality of respective tamper evident RFID tags, each respectively associated with at least one of such matable cap and container components of such pairs. Some of those may further include a closable enclosure for selective placement therein by a user of at least one of such plurality of pairs of such matable respective separable cap and container components. Others may further include an electronically actuated lock system for selectively allowing locking and unlocking of such enclosure; and an RFID reading system, associated with such enclosure, and adapted for determining at a selected time tamper evident RFID tags with unaltered ID characteristics received within such enclosure when closed, so as to identify corresponding respective consumable inventory items associated therewith. For some of those, such closable enclosure may be lockable in a closed position thereof; and such RFID reading system may determine inventory of such enclosure at a plurality of times. For some of those, such plurality of times may include at least one determination later in time than another determination to establish inventory changes in such enclosure comprising inventory either of removed from or added to such enclosure during the interim between such two determinations.

For some other variations, such electronically actuated lock system may be further adapted for maintaining an audit trail for actuation of such electronically actuated lock system and associating such audit trail with removed inventory to track chain of custody for such removed inventory; and such system further may include an integrated inventory control system in communication with such electronically actuated lock system. Some of those may further include a central server communicating over a network for providing communications between such integrated inventory control system and such electronically actuated lock system. Still further, some of those may further include a plurality of such closable enclosures, each having a respective electronically actuated lock system, and wherein such integrated inventory control system may be in communication with each of such closable enclosures via its respective electronically actuated lock system.

Some exemplary such systems may further include a removable case receivable in such enclosure and having an associated non-alterable RFID tag for tracking of whether such removable case may be received within such enclosure, such removable case further adapted for receiving therein such consumable inventory items and their respective tamper evident RFID tags with respective tamper evident features.

For some exemplary systems, such plurality of respective tamper evident RFID tags with respective tamper evident features may be associated with respective consumable inventory items comprising controlled drugs for use on a mobile EMS vehicle. For some of those, such tamper evident RFID tags with respective tamper evident features may be associated with respective markings readable by a human user.

For other presently disclosed exemplary systems, such closable enclosure may include a lockable door; and such system further may include paired sensors operatively associated with such door and such electronically actuated lock system for detection of whether such door may be open or closed, and an external power cable for providing external power to such electronically actuated lock system.

For other systems, such closable enclosure may include a reinforced housing with a lockable door; and such electronically actuated lock system may include an electronically movable latch and electronic access control circuit mounted within such reinforced housing, a user interface display and control panel mounted on the outside of such reinforced housing for controlling such movable latch into either of a locked or unlocked position thereof, and a corresponding stop member for preventing such enclosure door from being opened whenever such movable latch may be in such locked position thereof.

For other systems, such electronically actuated lock system may include a credential reader, a microprocessor based control circuit, and an electronic lock to allow access to such enclosure whenever acceptable credentials may be presented to such credential reader. For some of those, such microprocessor based control circuit may maintain a log of activities of such electronic lock for providing access to such enclosure; and such log may include at least one of user name, credential type and ID, supervisor level, and valid access times. For some of those, such system further may include a temperature sensor associated with such enclosure; and such microprocessor based control circuit may maintain temperature limit settings for stored inventory, and monitors the output of such temperature sensor to set off an alarm if monitored temperatures may be outside of limit settings.

Per some exemplary systems, such system further may include an environmental sensor for monitoring of at least one of temperature, humidity, and vibrations.

For other present systems, such RFID reading system associated with such enclosure further may include a limited profile RFID antenna within such enclosure.

For others, such lockable enclosure may include an RFID antenna within such enclosure, and may include electromagnetic shielding so to block any external electromagnetic fields, so that any RFID readings may be limited to operative RFID tags and their associated contents which may be within such enclosure when such door may be closed.

In other present systems, such container may be sized for receiving a consumable inventory item. For some of those, such container may be one of an integral one-piece container and a multi-piece container. Still further, such container may comprise an at least two-piece container, with such at least two pieces thereof having respective elongated shapes with respective ends, with one set of ends forming a circular feature for engaging an associated paired cap component, and with another set of ends distal to such circular feature engaging one another for in part holding such set of distal ends together.

Yet another exemplary embodiment in accordance with the presently disclosed subject matter relates to an electronic access control system for inventory data and access control for electronically controlled lock systems, comprising a communications network; a plurality of electronic locks, respectively associated with a plurality of securable enclosures, and each of such locks having respective network communications devices for respectively connecting such each electronic lock with such communications network; and a central server, connected with such plurality of electronic locks over such network, and selectively providing at least one of data updates and management for each of such electronic locks. Preferably, each of such securable enclosures may include a plurality of respective tamper evident RFID tags, each respectively associated with a corresponding plurality of matable paired cap and container components for receiving respective consumable inventory items, to be received in such enclosure, such tamper evident RFID tags having a tamper evident feature associated with a mated pair of such cap and container components for providing an altered ID characteristic readable by an RFID reader once such tamper evident feature may be disturbed by separation of such mated pair of cap and container components for access to their respective consumable inventory items; and a plurality of respective RFID reading systems, associated with each such respective enclosure, and adapted for determining at a selected time tamper evident RFID tags with unaltered ID characteristics received within such enclosure when closed, so as to identify corresponding respective consumable inventory items associated therewith.

For some such presently disclosed systems, such tamper evident feature may comprise an external loop associated with a respective tamper evident RFID tag and entrained through its associated mated pair of cap and container components to be ruptured whenever such mated pair of cap and container components may be separated for access to their respective consumable inventory items; and such altered ID characteristic thereof may comprise one of a flagged tamper bit as readable by an RFID reader whenever such RFID tag external loop may be ruptured, and that such ID characteristic as readable by an RFID reader may be eliminated whenever such RFID tag external loop may be ruptured. For some of those variations, such paired cap and container components may include respective openings which may be alignable when such cap and container components may be mated so that their associated external loop pass through such respective openings. For still some others thereof, such openings may comprise a pair of respective holes through such cap and a pair of respective slots through opposing outside walls of such container, so that an external loop passed through such respective holes of such cap may be introduced into such slots of such container outside walls whenever such cap may be fitted to such container. Some may further include respective protruding element alignment nodes and motion limiting stops on the outside of such container and on an inside rim of such cap, to prevent direct-pull removal of such cap from such container; and respective ratcheting members on the outside of such container and on such inside rim of such cap, for respective engagement of such ratcheting members whenever such cap may be fitted to such container, to limit rotation of such cap thereafter to a single direction thereof relative to such container for removal of such cap from such container.

For some variations of such presently disclosed systems, each of such respective plurality of cap components may include paired elements protruding from each respective cap for cooperating to hold its associated respective tamper evident RFID tag in place. For others, each of such RFID tags may have a wire receiver slot thereon, and each of such external loops of each of such tamper evident RFID tags each may comprise a wire that may include one end thereof directly attached to its RFID tag and one loose end thereof which can be inserted and locked into such receiver slot on such RFID tag and thereafter not removed from such slot.

It is to be understood by those of ordinary skill in the art that the present disclosure relates to both apparatuses and to corresponding and/or associated methodologies.

Accordingly, yet another exemplary embodiment of presently disclosed subject matter may relate to methodology for combined electronic inventory data and access control, comprising providing a closable enclosure with an electronically actuated lock system for selectively allowing locking and unlocking of such enclosure; providing a plurality of respective tamper evident RFID tags, each respectively associated with a corresponding plurality of matable paired cap and container components for receiving respective consumable inventory items, to be received in such enclosure, such tamper evident RFID tags having a tamper evident feature associated with a mated pair of such cap and container components for providing an altered ID characteristic readable by an RFID reader once such tamper evident feature may be disturbed by separation of such mated pair of cap and container components for access to their respective consumable inventory items; associating an RFID reading system with such enclosure; and determining with such RFID reading system at a selected time tamper evident RFID tags with unaltered ID characteristics received within such enclosure when closed, so as to identify corresponding respective consumable inventory items associated therewith.

In some variations thereof, such tamper evident feature may comprise an external loop associated with a respective tamper evident RFID tag and entrained through its associated mated pair of cap and container components to be ruptured whenever such mated pair of cap and container components may be separated for access to their respective consumable inventory items. For others, such altered ID characteristic thereof may comprise at least one of that such ID characteristic may include a flagged tamper bit as readable by an RFID reader whenever such RFID tag external loop may be ruptured, that such ID characteristic as readable by an RFID reader may be eliminated whenever such RFID tag external loop may be ruptured, and that such ID characteristic may have relatively reduced signal strength as readable by an RFID reader whenever such RFID tag external loop may be at least partially ruptured.

For other variations of the foregoing exemplary methodology, such paired cap and container components may include respective openings which may be aligned when such cap and container components may be mated and their associated external loop may be passed through such respective openings. For some such variations, such openings may comprise a pair of respective holes through such cap and a pair of respective holes through opposing outside walls of such container. For others, such openings may comprise a pair of respective holes through such cap and a pair of respective slots through opposing outside walls of such container, and such methodology may include passing an external loop through such respective holes of such cap and introducing such loop into such slots of such container outside walls whenever such cap may be fitted to such container. Some such variations may further include respective protruding element alignment nodes and motion limiting stops on the outside of such container and on an inside rim of such cap, to prevent direct-pull removal of such cap from such container; and respective ratcheting members on the outside of such container and on such inside rim of such cap, for respective engagement of such ratcheting members whenever such cap may be fitted to such container, to limit rotation of such cap thereafter to a single direction thereof relative to such container for removal of such cap from such container.

Yet an additional variation of the foregoing may further include supporting and holding an associated respective tamper evident RFID tag on each of such respective plurality of cap components. For some of those variations, such supporting and holding may include providing paired elements protruding from each respective cap for cooperating to hold its associated respective tamper evident RFID tag in place.

For yet other alternatives, each of such RFID tags may have a wire receiver slot thereon, and each of the external loops of each of such tamper evident RFID tags each may comprise a wire that may include one end thereof directly attached to its RFID tag and one loose end thereof, and such methodology further may include inserting such loose end and locking it into the receiver slot on such RFID tag so that such loose end may be thereafter not removed from such slot.

For other presently disclosed alternatives, present methodology may further include determining at a plurality of times inventory of such enclosure using such RFID reading system. For some of those alternatives, such plurality of times may include at least one determination later in time than another determination to establish inventory changes in such enclosure may comprise inventory either of removed from or added to such enclosure during the interim between such two determinations. For some of those, such electronically actuated lock system may be further adapted for maintaining an audit trail for actuation of such electronically actuated lock system and associating such audit trail with removed inventory to track chain of custody for such removed inventory.

Yet other alternative presently disclosed methodology embodiments may further include providing a removable case receivable in such enclosure and having an associated RFID tag for tracking of whether such removable case may be received within such enclosure, such removable case further adapted for receiving therein such consumable inventory items and their respective frangible RFID tags. For some of those, such RFID reading system may be further adapted for determining whether such removable case with its associated non-frangible RFID tag may be received within such enclosure when closed.

In still other alternatives, presently disclosed methodology may further include providing such electronically actuated lock system with a credential reader, a microprocessor based control circuit, and an electronic lock to allow access to such enclosure whenever acceptable credentials may be presented to such credential reader, and wherein such microprocessor based control circuit maintains a log of activities of such electronic lock for providing access to such enclosure. In others, presently disclosed methodology may further include providing such lockable enclosure may include an RFID antenna within such enclosure; and providing such lockable enclosure with electromagnetic shielding so to block any external electromagnetic fields, so that any RFID readings may be limited to RFID tags and their associated contents which may be within such enclosure when such door may be closed. Some embodiments may include taking such RFID readings every time such door is closed. For yet others, presently disclosed methodology may further include associating respective visual markings with such respective consumable inventory items to be read by a human user for identifying particular inventory items stocked in such enclosure.

Yet another exemplary embodiment of presently disclosed methodology may relate to methodology for an electronic access control system for inventory data and access control for electronically controlled lock systems, comprising providing a communications network; providing a plurality of electronic locks, each of such locks having respective network communications devices for respectively connecting such each electronic lock with such communications network; respectively associating such plurality of locks with a plurality of securable enclosures; providing each of such securable enclosures with a plurality of respective tamper evident RFID tags, each respectively associated with a corresponding plurality of matable paired cap and container components for receiving respective consumable inventory items, to be received in such enclosure, such tamper evident RFID tags having a tamper evident feature associated with a mated pair of such cap and container components for providing an altered ID characteristic readable by an RFID reader once such tamper evident feature may be disturbed by separation of such mated pair of cap and container components for access to their respective consumable inventory items; providing each of such securable enclosures a plurality of respective RFID reading systems, associated with each such respective enclosure, and adapted for determining at a selected time tamper evident RFID tags with either of altered or unaltered ID characteristics received within such enclosure when closed, so as to identify corresponding respective consumable inventory items associated therewith; using such RFID reading systems, selectively establishing data at such respective enclosures for identifying corresponding respective consumable inventory items associated therewith; providing a central server connected with such plurality of electronic locks over such network; and selectively providing at least one of data updates and data management for each of such electronic locks, conducted by such central server over such network.

For some such exemplary embodiments, such tamper evident feature may comprise an external loop associated with a respective tamper evident RFID tag and entrained through its associated mated pair of cap and container components to be ruptured whenever such mated pair of cap and container components may be separated for access to their respective consumable inventory items; and such altered ID characteristic thereof may comprise one of a flagged tamper bit as readable by an RFID reader whenever such RFID tag external loop may be ruptured, and that such ID characteristic as readable by an RFID reader may be eliminated whenever such RFID tag external loop may be ruptured. For some of those, such paired cap and container components may include respective openings which may alienable when such cap and container components may be rated so that their associated external loop pass through such respective openings. For still others thereof, such openings may comprise a pair of respective holes through such cap and a pair of respective slots through opposing outside walls of such container, so that an external loop passed through such respective holes of such cap may be introduced into such slots of such container outside walls whenever such cap may be fitted to such container. Yet others thereof may further include respective protruding element alignment nodes and motion limiting stops on the outside of such container and on an inside rim of such cap, to prevent direct-pull removal of such cap from such container; and respective ratcheting members on the outside of such container and on such inside rim of such cap, for respective engagement of such ratcheting members whenever such cap may be fitted to such container, to limit rotation of such cap thereafter to a single direction thereof relative to such container for removal of such cap from such container.

For some other variations of the foregoing, each of such respective plurality of cap components may include paired elements protruding from each respective cap for cooperating to hold its associated respective tamper evident RFID tag in place.

For yet other variations thereof, each of such RFID tags may have a wire receiver slot thereon, and each of the external loops of each of such tamper evident RFID tags each may comprise a wire that may include one end thereof directly attached to its RFID tag and one loose end thereof which can be inserted and locked into the receiver slot on such RFID tag and thereafter not removed from such slot.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIGS. 7 and 8, respectively, depict exemplary computer screen readout images according to one exemplary embodiment of the presently disclosed subject matter;

FIGS. 17A through 17D illustrate respective views of various exemplary container/cap combinations for use in accordance with and per presently disclosed subject matter;

FIGS. 20A through 20E illustrate various respective views of an exemplary container embodiment for use with a "press fit" style container/cap exemplary embodiment in accordance with presently disclosed subject matter;

FIGS. 23A through 23G illustrate various respective views of an exemplary cap embodiment component (center and outer pieces thereof combined) for use with a "press fit" style container/cap exemplary embodiment in accordance with presently disclosed subject matter;

FIGS. 25A through 25C illustrate various respective views of an exemplary cap embodiment component (an outer piece thereof) for use with a "ratchet" style container/cap exemplary embodiment in accordance with presently disclosed subject matter;

FIGS. 26A through 26D illustrate various respective views of an exemplary cap embodiment component (a center piece thereof) for use with a "ratchet" style container/cap exemplary embodiment in accordance with presently disclosed subject matter; and FIGS. 27A through 27I illustrate various respective views of an exemplary cap embodiment component (center and outer pieces thereof combined) for use with a "ratchet" style container/cap exemplary embodiment in accordance with presently disclosed subject matter.

Figure 1:
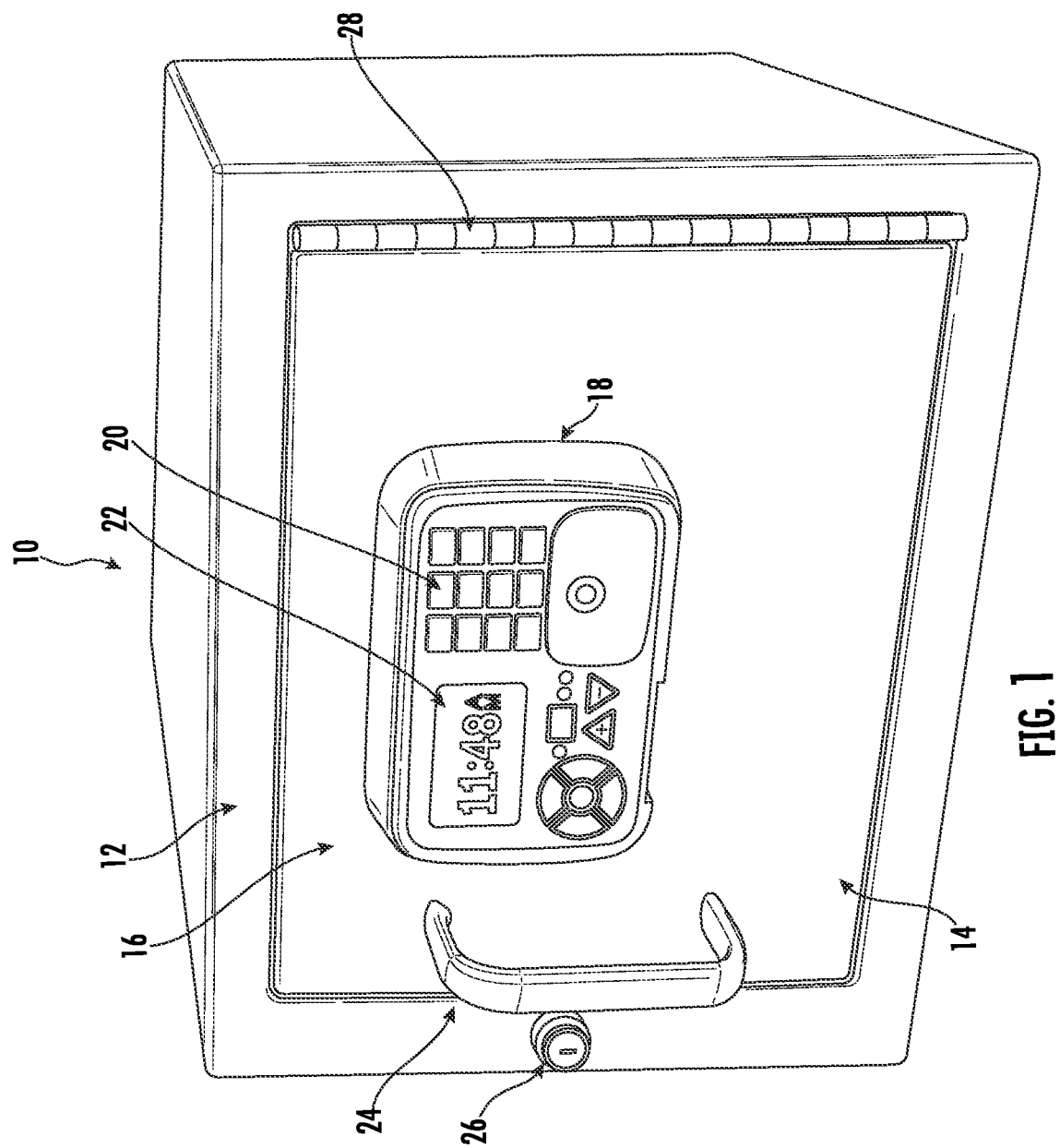
FIG. 1 depicts an upper right isometric view of an image of an exemplary representative enclosure with a representative door thereof in a closed and locked position, further illustrated with an exemplary lock provided in accordance with one embodiment of the presently disclosed subject matter installed thereon.

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As discussed in the Summary of the Subject Matter section, the presently disclosed subject matter is concerned with combined electronic inventory data and access control for electronically controlled lock systems.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

It should be specifically noted that while the present disclosure generally describes the lock disclosed herein as a retrofittable lock, such terminology should not be taken as a limitation of the presently disclosed subject matter in any way as the presently disclosed lock may, indeed, be provided as original equipment.

The presently disclosed subject matter relates to inventory data and access control, integrated into electronically controlled lock systems. Such electronically controlled lock systems may include one or more electronic locks used to provide secure storage of various items within a cabinet or drawer. An exemplary electronic lock may include a motorized latch and an electronic access control circuit mounted within a reinforced housing and provided as either a retrofittable lock or as original equipment for a cabinet or enclosure. User interfaces may be provided through an LCD display and control panel mounted on the face of the housing, or otherwise.

Additionally, various optional transducers, such as a temperature transducer may be provided for installation within some cabinets or enclosures where an environmental condition to be monitored is of importance. A motorized latch may engage a corresponding hole, or strike, or other stop member, for preventing the cabinet door from being opened.

It is to be understood by those of ordinary skill in the art that the presently disclosed subject matter equally encompasses other optional features, different than just an optional temperature transducer. For example, one or more optional devices may be utilized with the presently disclosed subject matter to detect a variety of environmental conditions, or other conditions. For example, either or both of temperature and humidity may be detected relative to a room or a piece of equipment, of vibrations levels or other characteristics of such room/equipment may be monitored.

Reference will be made in detail to the various exemplary embodiments of an electronic lock in accordance with the presently disclosed subject matter. Referring to the drawings, FIG. 1 depicts an upper right isometric view of an image generally 10 of an exemplary representative enclosure generally 12 with a representative door 14 thereof in a closed and locked position, further illustrated with an exemplary lock generally 16 provided in accordance with one embodiment of the presently disclosed subject matter installed thereon and other presently disclosed subject matter therein. Lock 16 includes a main housing 18 including electronic assembly, battery pack, and communications port features. Otherwise, a programming keypad 20, display 22, handle 24, separate mechanical key override lock 26, and door hinges 28 are provided. Lock 16 may be variously attached to cabinet 12 and door 14 by incorporation into a formed opening (not shown) in door 14, or otherwise attached (details of which form no particular aspect of the presently disclosed subject matter).

Figure 2A:
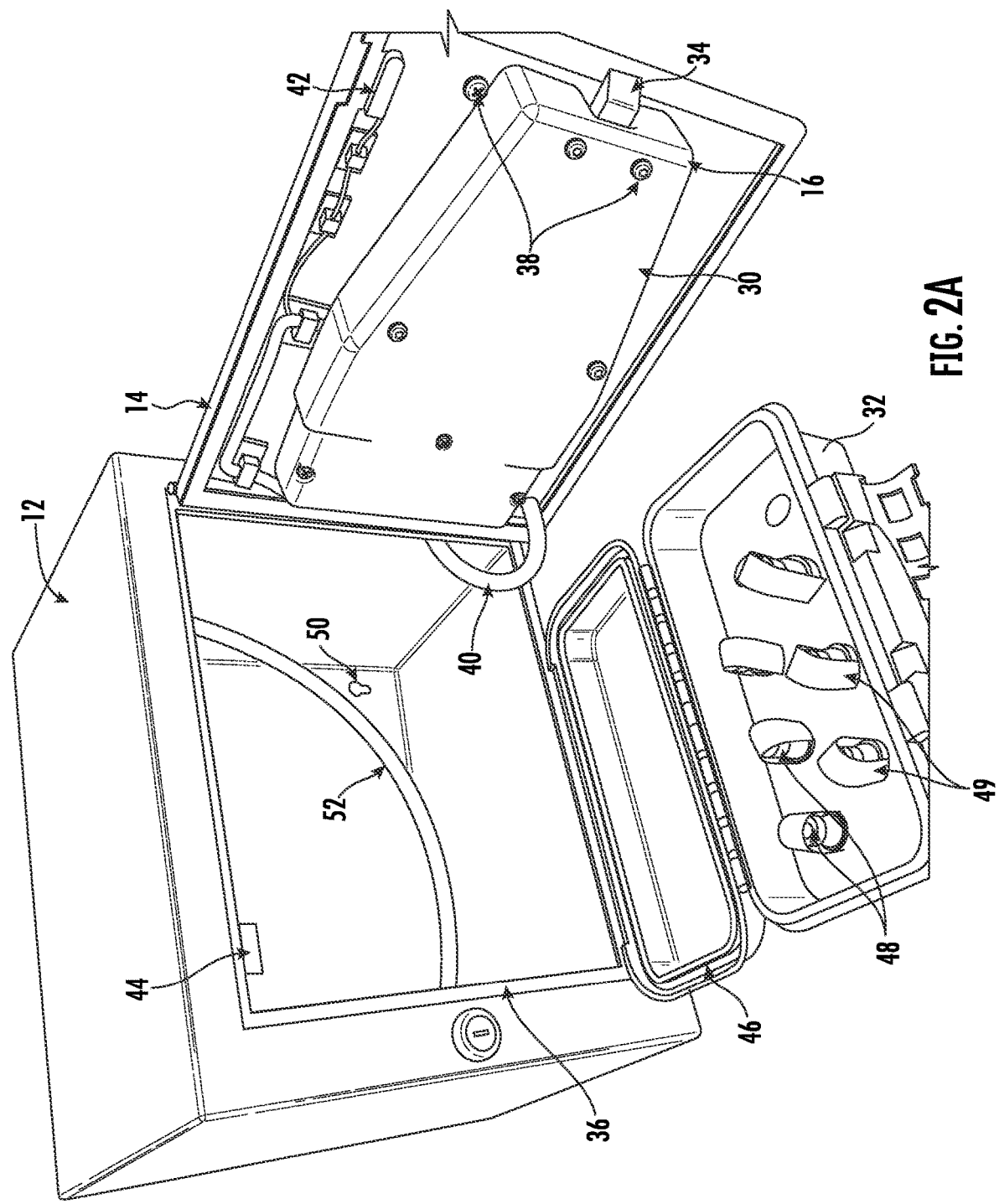
FIG. 2A depicts an upper left isometric view of an image of the exemplary representative enclosure of FIG. 1 with a representative door thereof in an open position, further illustrated with an exemplary lock provided in accordance with one embodiment of the presently disclosed subject matter installed thereon, and with such enclosure associated with a removable storage unit (or box) for storage therein.

FIG. 2A depicts an upper left isometric view of an image of the exemplary representative enclosure 12 of FIG. 1 with a representative door 14 thereof in an open position, further illustrated with an exemplary lock back cover generally 30 provided in accordance with one embodiment of the presently disclosed subject matter installed thereon, and with such enclosure associated with a removable storage unit (or box) 32 for storage therein. Lock 16 (shown from its back side) is configured for a selectively extending member generally 34 to engage a strike edge 36 of enclosure 12 that, when properly positioned, keeps the cabinet 12 locked. Strike edge 36 may be integrally formed with cabinet 12 or provided by other appropriate means, details of which form no particular aspect of such locking feature. Various mounting screws 38 or their equivalents may be provided for securing back 30 to door 14. Also, a cable (not seen) generally under cover 30 may in some embodiments connect front and rear portions of lock 16 on either side of door 14. In other embodiments, the rear portion of lock 16 may directly communicate through the door with the front portion of such lock. A cable 40 may be used for providing power from an associated vehicle to lock 16.

Further, magnetic sensors 42 and 44, or other forms of sensors, may be mounted in conjunction with door 14, to detect its open or closed condition, which may be communicated to lock 16 such as through wiring as illustrated (in FIG. 2A).

As will be understood by those of ordinary skill in the art from the complete disclosure herewith, lock 16 amounts to a motorized or controllably driven latch, which may make use of such as a motor or solenoid (not shown) or other type of prime mover for operating extendable member 34. In some exemplary embodiments, a permanent magnet DC motor may be used; however, various types of motors can be employed. Also, when used, a motor may be provided with a gear train that moves a mechanism which in turn retracts or extends element 34.

As discussed in conjunction with the complete disclosure herewith, cabinet 12 when opened allows access to a stored box or storage unit 32. Such removable box 32 may itself have an openable lid 46, which when opened allows access to stored medicinal dosages 48. Such dosages may comprise individual pills, capsules, or vials of drugs to be injected, as well known to those of ordinary skill in the art. As also shown in FIG. 2A, each dosage 48 is associated with its own respective RFID tag 49. While in some instances a given tag may simply have information regarding a specific drug in terms of its associated contents, in other instances more information or data may be stored in or by a tag. For example, the lot number, expiration date, purchase date, and similar data could be stored. As represented, such tags 49 are configured and situated in accordance with presently disclosed subject matter to be frangible, so that they are ruptured or destroyed when an inventory user accesses the inventory item 48. When a tag 49 is destroyed in such fashion (by normally accessing its associated dosage 48), such tag 49 stops its RFID function. In accordance with the presently disclosed subject matter, such fact is eventually tracked by the inventory data system of the presently disclosed subject matter, which shows such associated dosage 48 as removed from inventory.

As shown, cabinet 12 may include openings 50 for mounting of cabinet 12 and/or for the passage of wiring (generally 52) between the interior and exterior of cabinet 12. Such wiring 52 may extend around within the cabinet 12 interior to emerge (wiring 40) adjacent to lock 16 to provide vehicle power for lock 16 in accordance with presently disclosed subject matter, as otherwise discussed herein.

Because RFID technology can be fairly robust, in some instances, it's possible that a given form of RFID tag selected for use in a particular implementation may tend to have reduced level outputs rather than to stop working altogether when "ruptured" or damaged as individual dosages are accessed. In such an implementation, the presently disclosed subject matter is applicable to indicate removed dosages by still using the comparative tracking methodology disclosed herewith. However, rather than tracking for just, in effect, a "zero" result while checking for the presence of a particular RFID tag, the comparison is to determine a change in the relative signal strength (RSSI) associated with such given tag. A particular implementation in such embodiment would involve determining a desired threshold level of reduction in RSSI to indicate that an adequate amount of physical changes ("damage") to the RFID tag had occurred, such that it signals a dosage has been accessed. Such determination in accordance with presently disclosed methodology would involve ensuring that a sufficiently lowered RSSI threshold were selected for such assurance, while still distinguishing from relatively smaller changes in RSSI which may occur simply, for example, from a given RFID tag being situated in a relatively slightly harder to read location.

Figure 2B:
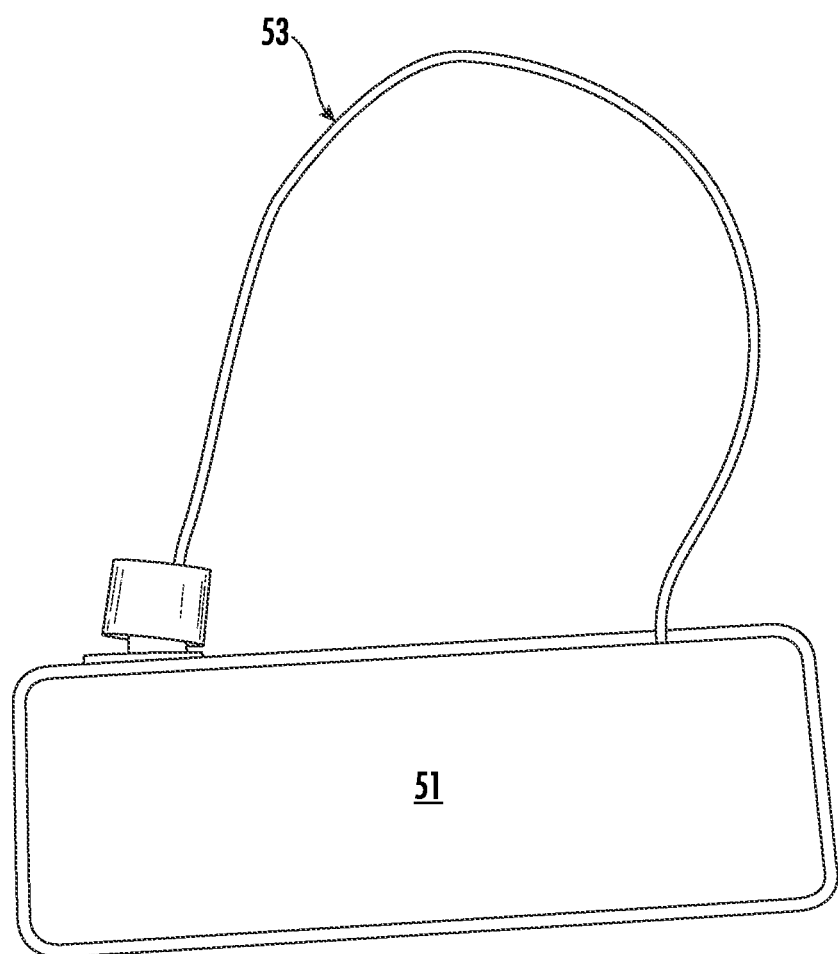
FIG. 2B depicts an exemplary alternative RFID tag for use in another exemplary embodiment of the presently disclosed subject matter.

Another alternative embodiment and methodology in accordance with presently disclosed subject matter involves using an RFID tag that has a tamper evident bit. FIG. 2B depicts an exemplary alternative RFID tag (generally 51) for use in such an alternative exemplary embodiment of the presently disclosed subject matter.

In particular RFID tag 51 may have a trace or external loop of wire (generally 53), which when broken, causes a "tamper" bit to be set in the RFID tag 51. That means that the RFID tag 51 puts out a changed ID after loop 53 is broken than before loop 53 is broken. By using the same comparative tracking methodology of the presently disclosed subject matter, such change in ID is detected and used to determine that a previously enclosed individual dosage has been accessed.

A variety of techniques may be used, as will be understood by those of ordinary skill in the art, to incorporate such an RFID tag 51 into a physical arrangement to result in breaking of loop 53 whenever the dosage is accessed. For example, with reference to FIG. 2A, loop 53 may be positioned similarly to tag 49 and secured such that loop 53 is forced to be broken in order to access the associated dosage 48. Thereafter, since the associated tag 51 will have a changed ID, exercise of the comparative tracking methodology of the presently disclosed subject matter determines that such individual dosage 48 has been accessed, as corresponds with that particular tag 51. In some instances, loop 53 can comprise a continuous electric loop (when properly and fully positioned) so that such loop (in fact, in some instances, an electric wire), changes a circuit indication to an associated circuit or chip whenever it is broken (not continuous).

One exemplary such tag is a commercially available product from NXP Semiconductors, referenced as the UCODE G2iM series transponder integrated circuits (IC's), including a so-called "tag tamper alarm." The chip bits of such an exemplary device are shown below in Table 1, indicating that a single bit in provided, indicative of whether the associated loop 53 is intact or broken.

TABLE 1

| Indicator bits | | | | Temporary bits | | | Permanent bits Conditional |
|---|---|---|---|---|---|---|---|
| Tamper Indicator | External supply indicator | RFU | RFU | Invert Output | Transparent mode on/off | Data mode data/raw | Read Range Reduction on/off |
| 0 | 1 | 2 | 3 | 4 | 5 | 6 | 7 |

To facilitate human interaction, such RFID tags may be associated with color coordinated containers so that particular colors are associated with particular corresponding drugs and/or dosages. In the instance of using an exemplary RFID tag embodiment such as exemplary tag 51, the user may identify a particular color in order to select a desired drug and/or dosage, while the tracking technology presently disclosed will detect breaking of the associated wire or loop 53 in order to automatically determine and track (record) which dosage has been accessed. In the context of this embodiment of the presently disclosed subject matter, an "unruptured" RFID tag would mean that the wire or loop 53 has not been broken, and the ID characteristic from such unruptured RFID tag would show that a tamper bit or indicator thereof has not been set or flagged (and thus remains at "0").

More generally speaking, as various embodiments of the presently disclosed technology are utilized, all embodiments commonly make comparative tracking assessments, so that a tag no longer seen, or a tag seen at an RSSI level below a determined threshold, or a tag seen with a tamper evident indication, all result in detection that a corresponding protected/enclosed dosage was accessed. Thus, a "frangible" RFID tag as referenced by the presently disclosed subject matter is intended to refer to tags which themselves have frangible components, such as the body thereof, and/or have an associated external wire or loop or other feature thereof, the rupture of which frangible component causes a change or alteration to the ID characteristics of such RFID tag. Such changes can be elimination altogether of the ID characteristic, or a relatively reduced signal strength thereof, or setting or flagging of a tamper evident bit.

Figure 3:
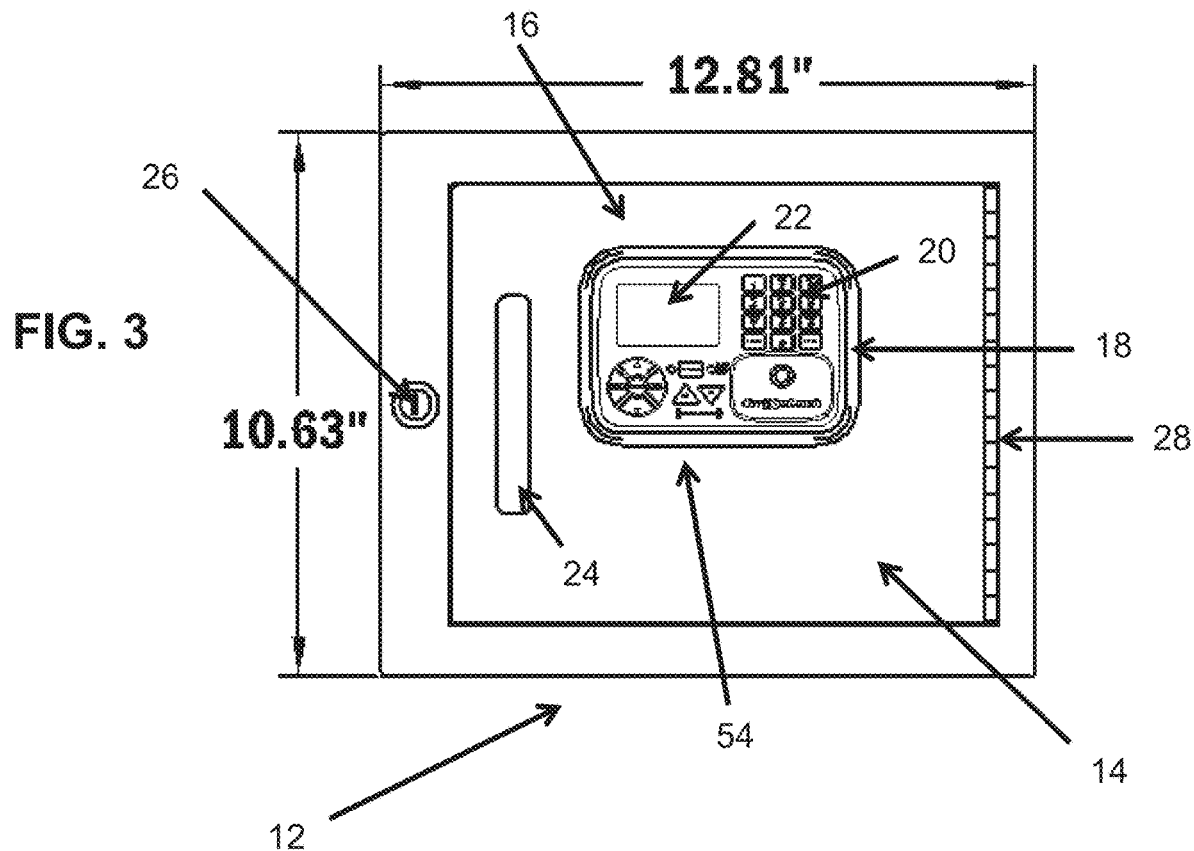
FIG. 3 depicts a front elevation view drawing of an exemplary enclosure similar to that of FIG. 2A but in a closed position thereof, and with exemplary marked dimensions.
Figure 4:
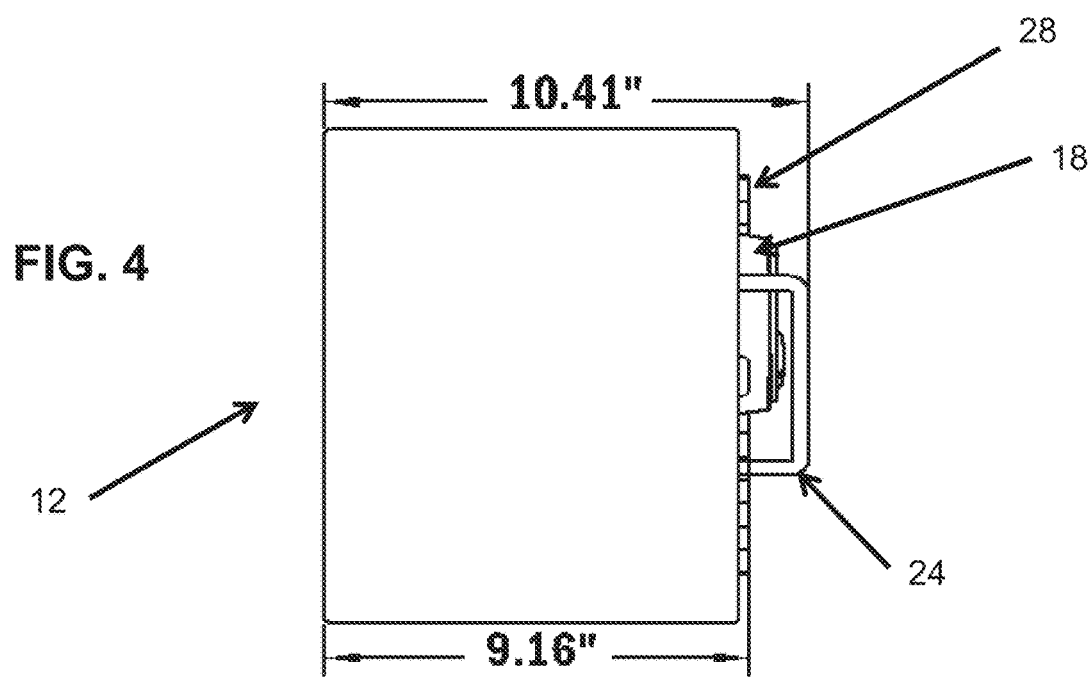
FIG. 4 depicts a side elevation view drawing of the exemplary enclosure of FIG. 2A, also in a closed position thereof, and with exemplary marked dimensions.

FIGS. 3 and 4, respectively, depict front and side elevation view drawings of an exemplary enclosure generally 12 similar to that of FIG. 2A but in a closed position thereof, and with exemplary marked dimensions. Reference characters repeated in FIGS. 3 and 4 from FIGS. 1 and 2 are intended to represent same or analogous features of the presently disclosed subject matter, without requiring additional explanation. The FIG. 3 front view of cabinet 12 additionally represents navigation keys generally 54 on the face of lock main housing 18, along with keypad 20 and display 22. Such navigation keys aid in programming certain operational characteristics of the lock in accordance with the presently disclosed subject matter. Between navigation keys 54 and keypad 20, representative buttons and functionality may include such as a back button, an enter button, a down button, and an up button. In an exemplary embodiment, display 22 may correspond to an LCD display; however, other types of displays may also be employed. Such buttons and the display are used to navigate a menu based programming scheme. The programming scheme is used to select or unselect various programming options within a lock constructed in accordance with the presently disclosed subject matter.

FIGS. 3 and 4 also represent exemplary dimensions of an exemplary cabinet 12, useful for mounting or carry in an EMS vehicle. As shown, an exemplary width and height may be about 12.81 inches by 10.63 inches. Further, a depth at the handle may be 10.41 inches, while a depth at the hinges may be 9.16 inches.

Extending member 34 is operated under the control of a microprocessor based circuit located within lock main housing 18. In accordance with the illustrated exemplary embodiment of the presently disclosed subject matter, electronic lock 16 receives input from a user attempting to gain access to the cabinet via the exemplary keypad 20 shown on the face of housing 18. It should be appreciated by those of ordinary skill in the art that a variety of different types of access control credentials may be used instead of or in addition to such keypad. Such credentials may include, but are not limited to, proximity cards, magnetic stripe cards, smart cards, RF fobs, IR fobs, and Dallas Semiconductor i-Buttons, as well as a plethora of biometric type access control technologies available to industry.

When electronic lock 16 receives data, in an exemplary case a personal identification number (PIN) from a user, it processes the PIN and determines the validity of the code. Typically, the electronic lock will have a number of available valid codes. In accordance with an exemplary embodiment, anywhere from 250 to 1000 valid codes may be provided, or even higher numbers for some embodiments, such as up to 5000 or higher. It should be appreciated, however, that such number is a design limitation of particular installations, and not a particular limitation of broader aspects of the presently disclosed subject matter. Electronic lock 16 is configured to compare an entered PIN to its list of pre-programmed valid codes. If the code is determined to be valid, access is granted. Lock 16 can be programmed manually or through a personal computer (PC) based program.

Figure 5:
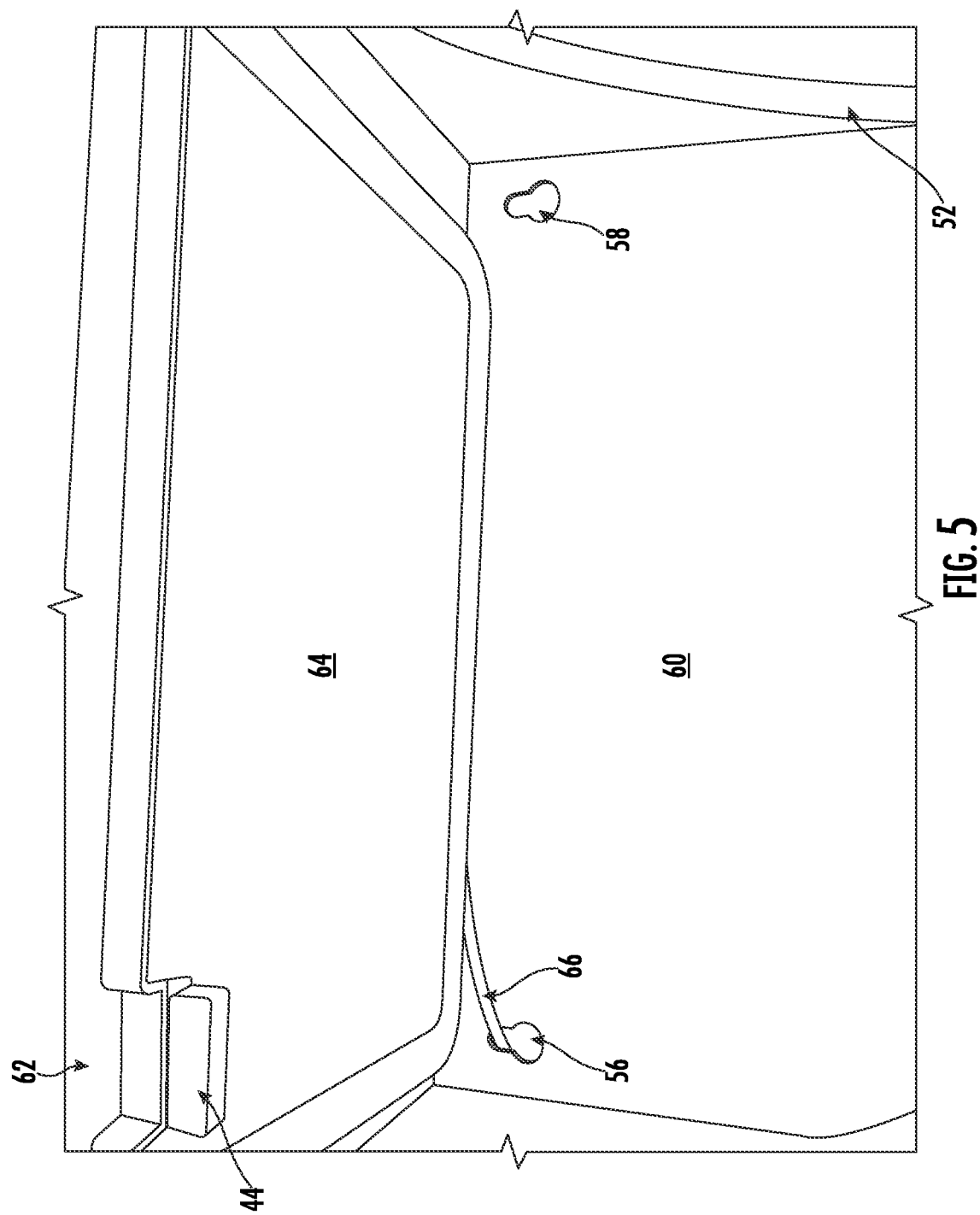
FIG. 5 is an isometric view of an image of an exemplary interior related feature of a presently disclosed exemplary enclosure, and representing an exemplary RFID antenna placement in accordance with presently disclosed subject matter.

FIG. 5 is an isometric view of an image of an exemplary interior related feature of a presently disclosed exemplary enclosure. As otherwise referenced herein, wiring 52 may enter the interior (generally 60) of an enclosure via such as a mounting hole formed in such enclosure. Additional such holes (keyhole-shaped in this embodiment) 56 and 58 are illustrated as formed in a back wall of enclosure, opposite what would be a door of the enclosure. A magnetic sensor 44 or similar may be associated with detecting the position of such a door (not illustrated), as otherwise discussed herein.

On the underside of a top surface 62 of such enclosure, an antenna generally 64 may be mounted in accordance with presently disclosed subject matter. Generally, it is preferable that such an antenna be operative as a UHF RFID antenna and suitable for an RFID sensing system, within the subject enclosure. One example of a useful antenna for such a system is available from "Times-7" (Cupertino, Calif.). One such model is the Times-7 Model A5010 Circular Polarized Antenna, which provides an ultra-low profile design available in a compact 250 mm/10 inch square footprint. As shown, such model also accommodates a flush wall mounting on upper interior surface 62.

Antenna 64 may be connected to wiring, such as wiring 66 which passes through opening 56, as illustrated by exemplary FIG. 5.

Figure 6:
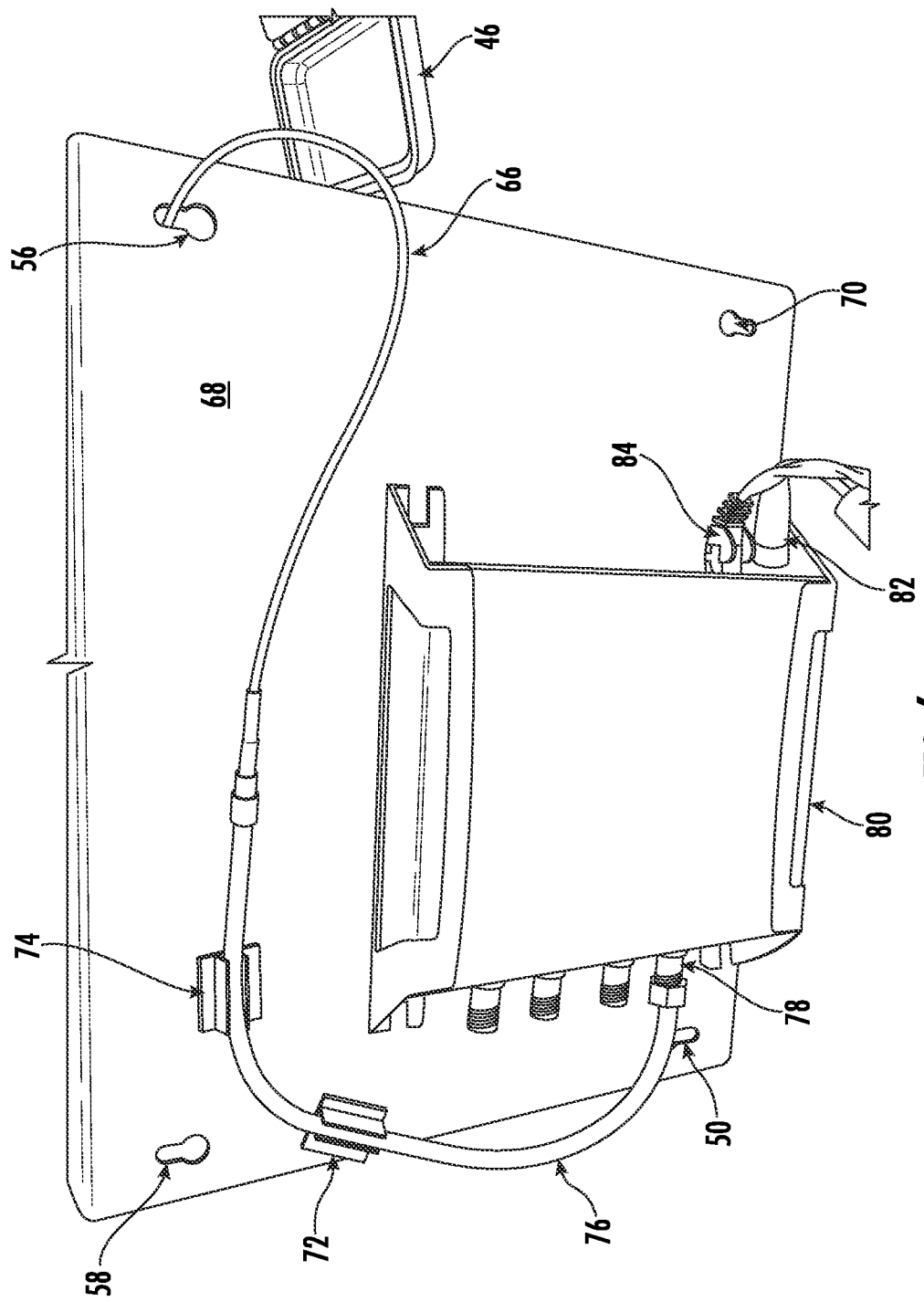
FIG. 6 depicts an image of an exemplary external (rear side) view of an exemplary enclosure of the presently disclosed technology, including RFID-related features associated therewith in combination, according to one exemplary embodiment of the presently disclosed subject matter.

FIG. 6 depicts an image of an exemplary external (rear side) view of a rear wall generally 68 of an exemplary enclosure of the presently disclosed technology, including RFID-related features associated therewith in combination, according to one exemplary embodiment of the presently disclosed subject matter. The more complete image of the rear side of back or rear wall 68 as illustrated in FIG. 6 shows an exemplary four respective mounting holes or openings 50, 56, 58, and 70. Further, exemplary mounting clips 72 and 74 may be affixed to such rear wall portion of wall 68, for receiving wiring 66 and/or extensions 76 thereof, as illustrated. Wiring 66 and/or an extension 76 thereof terminates in connector 78, which may be associated with an RFID reader device, generally 80, as discussed herein.

FIG. 6 illustrates in effect a prototype arrangement, whereby the RFID antenna 64 of FIG. 5 (in the interior 60 of an enclosure) is connected via wiring 66 and/or 76 with an RFID reader generally 80. An exemplary such reader is the "Impinj" brand Model Speedway R420 RAIN RFID reader. Such a device is a high-performance, enterprise-class fixed reader that allows for the ability to create a contiguous read zone, in this instance, inside of enclosure or cabinet 12. Such device also allows operational modes for high throughput, high tag density uses. In the exemplary set-up of FIG. 6, a power cord 82 and internet connection 84 are also associated with RAIN RFID reader 80. Other models of "Impinj" brand reader assemblies may be utilized in particular installations, and include, but are not limited to, for example, Models RS500, RS1000, and RS2000. In each instance, such devices may be utilized as a module which is affixed to another circuit board involved with implementation of the presently disclosed subject matter combinations.

RAIN RFID technology is derived from an alliance which seeks universal adoption of UHF RFID technology, similar to the way other wireless technology organizations have advanced such as WiFi and Bluetooth technologies. Specifically, RAIN uses a GS1 UHF Gen2 protocol which ISO/IEC has standardized as 18000-63. The term RAIN is an acronym derived from RAdio frequency IdentificatioN. It is intended in part as a reference to the link between UHF RFID and the cloud, where RFID-based data can be stored, managed and shared via the Internet connection 84. As a result, a RAIN RFID solution allows use of a reader to read and write a tagged item, manage data, and respond.

While UHF RFID is specifically discussed in the presently disclosed subject matter, such subject matter equally may encompass use of HF RFID, such that the presently disclosed subject matter is not limited to any specific frequency range of use or practice, either now or later existing.

In this instance, the associated enclosure 12 can be modified, as needed, to create the formation of a so-called "Faraday Cage" effect, whereby the enclosure 12 is used to block any external electromagnetic fields, so that any RFID readings are strictly limited to contents (RFID tags) which are within the enclosure 12 once its door is closed. A Faraday shield may be formed by a continuous covering of conductive material or by a mesh of such materials. One shielding aspect for some embodiments herewith may include the use of conductive gasketing around the perimenter of door 14. The resulting shield phenomenon protects the reading antenna 64 from external radio frequency interference (RFI), since the enclosure 12 conducts current around the outside of the enclosed space with none passing through the interior 60.

FIGS. 2A and 6 illustrate the open lid 46 of an exemplary removable box 32, which when opened (in part, in some instances, by rupturing an associated RFID tag 49) allows access to stored medicinal dosages 48. As noted above, such dosages may comprise individual pills, capsules, or vials of drugs to be injected, which may be respectively included in their own smaller container (see FIG. 2A), as well known to those of ordinary skill in the art. Examples of some controlled substances may include Fentanyl, Morphine, Midazolam (aka Versed), Diazepam (aka Valium), and Lorazepam (aka Ativan). One efficiency of the presently disclosed subject matter is that tags may be prepared which are preprogramed for corresponding to particular of such drugs, to eliminate more time-consuming enrollment otherwise of generic tags. For example, tags 49 may be provided that specifically correspond to, for example, Fentanyl, and the RFID system will be able to know that the narcotics box has X number of containers of Fentanyl (and Y numbers of containers of Versed, and Z number of containers of Ativan, etc.). Such feature of the presently disclosed subject matter allows for simple inventory of drug types without the specific (time consuming) need of specifically tagging (and recording, data entering, etc.) every specific container of a medication. Also, other advantages of presently disclosed subject matter is that such RFID tags may be placed directly on the vials or a container for them such that the tags are physically destroyed in order to open the vial or individually packaged medicinal doses. Another possible advantage is use of color coding, to prevent unauthorized users from understanding the particular contents of a given item. In general, tagging may be color coated or otherwise visually enhanced for recognition and for human or robotic/automated handling. Increased speed of identification and handling for dosages 48 can be of significant importance in a medical emergency setting that may be faced such as by EMS personnel. Likewise, the use of automation (automated data capture features) for operation of the presently disclosed inventory data control system means that EMS personnel do not have to be distracted with "record keeping" at perhaps critical times in conduct of their primary roles with their patients being treated.

In addition to monitoring the contents (medicinal dosages) of an enclosure (or narcotics case), the location of such narcotics case itself can be tracked, the location of the EMS vehicle or ambulance bearing such narcotics case and its contents may be tracked, and associated EMS personnel may be tracked, all as part of the presently disclosed subject matter. The result is that a complete record of custody of the case and contents may be obtained. Such record covers from a narcotics case morning or start-of-shift removal from a station to through the day, and to return to station.

FIGS. 7 and 8, respectively, depict exemplary computer screen readout images generally 86 according to one exemplary embodiment of the presently disclosed subject matter. As understood by those of ordinary skill in the art from the complete disclosure herewith, the subject RFID antenna and reader configuration in combination with the controlled access enclosure as disclosed herewith, may be used to automatically determine the operating RFID tags 49 stored with the subject enclosure (narcotics box). It is to be understood since RFID tags 49 are destroyed by removal of associated contents 48 that the indication of an RFID tag 49 stored within the enclosure 12 means that the associated contents of such RFID tag or tags 49 are within the enclosure 12, per the presently disclosed subject matter. Thus, as represented by FIG. 7, an associated inventory run sets up identification of what all was "originally" within the enclosure (such as at the start of an EMS crew shift). In the example illustrated, there are eight lines, each respectively representing a dosage 48 with its associated RFID tag 49 intact (and operable). While variations may be practiced, color highlights, such as in lines 2, 7, and 8 of the FIG. 7 exemplary illustration, means that some significant data is accumulating relative to the corresponding dosage 48. Data points relative to enclosure 12 take place with the door 14 to the enclosure 12 closed. Reference character 88 of FIGS. 7 and 8 point to exemplary highlighted line 2, to reflect that the item otherwise fully identified on such line has notable data. Columns 89 of FIGS. 7 and 8 concern "Total Count." FIG. 7 illustrates for example that communications with the RFID tag 49 associated with the dosage 48 of line 2 are fewer (a count of 102 illustrated in Column 89 for line 2) than, for example, the associated RFID tag 49 for line 1 (reflecting a contact count of 661 in Column 89 for line 1 of FIG. 7). As the amount of time increases since a tag has been read (the total count number does not increase relative to time), the row becomes more pink. The number of read cycles that have occurred since no change in its read status is shown in Columns 90 of FIGS. 7 and 8. FIG. 8 represents an inventory check at a point in time, for example, that all dosages have been removed, so all reporting lines 1 through 8 are highlighted in red, to reflect such fact (see reference character 90). As shown in FIG. 8, all of the No Change numbers of Column 90 are relatively high, and all lines are flagged red accordingly. As shown in FIG. 7, the No Change numbers in Column 90 for lines 2, 7, and 8 are relatively higher than for the other lines, so those are flagged in pink. Once the total count number has not increased in some time, and the "No Change" number is high, the data indicates that an RFID tag 49 has probably been removed from the area (interior 60 of enclosure 12) that the antenna 64 is seeing/reading. As will be understood by those of ordinary skill in the art from the complete disclosure herewith, the computer screen readout examples of FIGS. 7 and 8 may be practiced in conjunction with any of the embodiments disclosed herewith, including those which make use of tags which become completely inoperative when "ruptured," those which have relatively reduced RSSI characteristics when damaged, and those which have a changed ID characteristic bit when some component thereof is affected.

As should be further understood from the complete disclosure herewith, such augmented audit trail generation combined with electronic access control can result in improved inventory control, the generation of automated billing, improved diversion control, and in improved future planning based on determination of consumption patterns. That is because report summaries can provide information on a variety of information, such as case location at all times (using RFID and/or other techniques for tracking the narcotics case), case content changes by time, and narcotics box access.

One audit trail exemplary method may involve the steps of:

EMS personnel receives case from supervisor at the beginning of a work shift;
EMS personnel shows access control card to narcotics box and gains access;
EMS personnel opens secured door to enclosure;
EMS personnel inserts narcotics case into narcotics box;
EMS personnel closes secured door to enclosure;
RFID reader scans narcotics box for case number and contents (report #1);
EMS personnel shows access control card to narcotics box and gains access;
EMS personnel opens secured door to enclosure;
EMS personnel removes narcotics case;
EMS personnel closes secured door to enclosure;
EMS personnel potentially utilizes selected drugs from narcotics box, including destroying RFID tag for any drugs used, in order to gain actual access to such drugs;
EMS personnel shows access control card to narcotics box and gains access;
EMS personnel opens secured door to enclosure;
EMS personnel inserts narcotics case into narcotics box;
EMS personnel closes secured door to enclosure;
RFID reader scans narcotics box for case number and contents (report #2)
Inventory control system compares report #1 to report #2 and defines what RFID tags are different;
The removal, closing, and scan steps are repeated possibly numerous times—each time creating a report;
EMS personnel shows access control card to narcotics box and gains access;
EMS personnel opens secured door to enclosure;
EMS personnel removes narcotics case;
EMS personnel closes secured door to enclosure;
EMS personnel returns case to supervisor.

Variations to such methodology may be practiced. For example, the supervisor may use an RFID scanning approach to identify a narcotics case after it has been preloaded for a shift by the supervisor, to confirm the narcotics case and its contents at the start of a shift. Similarly, the supervisor can use an RFID scanning approach to identify a narcotics case and its contents after it has been returned at the end of a shift.

Also, the access control system may provide a datalogging feature. That is, users will have the ability to view and download various data associated with the electronic lock, including "audit trail" data and possibly other recorded data. Such history can be viewed by pressing a designated button, such as an "up" button, on the keypad, which will display selected data; or by pressing a "down" button on the keypad, which will display other selected data. Such data can be logged in predetermined increments with the size of the increment being set by the system administrator or supervisor. In addition, the system is provided with the ability to connect a personal computer (PC) and download all the data related to a given enclosure. Automation of the inventory data features of the presently disclosed subject matter may be achieved, for example, by conducting an RFID inventory read triggered by door 14 opening and closing as sensed by magnetic switch or sensors 42, 44. As will be understood by those of ordinary skill in the art, the resulting "audit trail" or inventory data and related may be processed for desired information. For example, by knowing who accessed a given narcotics box when it was opened and the case removed, and knowing who accessed the narcotics box when the case was returned, and knowing the difference in the contents of the returned box versus the removed box, it may be logically determined what user (for example, EMS personnel) took what items (dosages 48) and when.

Additionally, the system is provided with the ability to connect individual electronic locks over a network to a central server. The network connections may be either hardwired or wireless, such as through an RF interface or through an 802.11 WiFi wireless network. Data and programming associated with individual locks and the access control system may be remotely downloaded/uploaded from or to the central server through the network. As used herein, a network may include a dial-in network, a local area network (LAN), wide area network (WAN), public switched telephone network (PSTN), the Internet, intranet or other type(s) of networks, now or later existing, including hybrid and/or meshed networks. A network may include any number and/or combination of hard-wired, wireless, or other communication links.

In accordance with the presently disclosed subject matter, system settings can be made through a control panel on the front of the system, such as through a PC based access control system that is either directly connected to the lock or remotely connected to the lock over a network.

Figure 9:
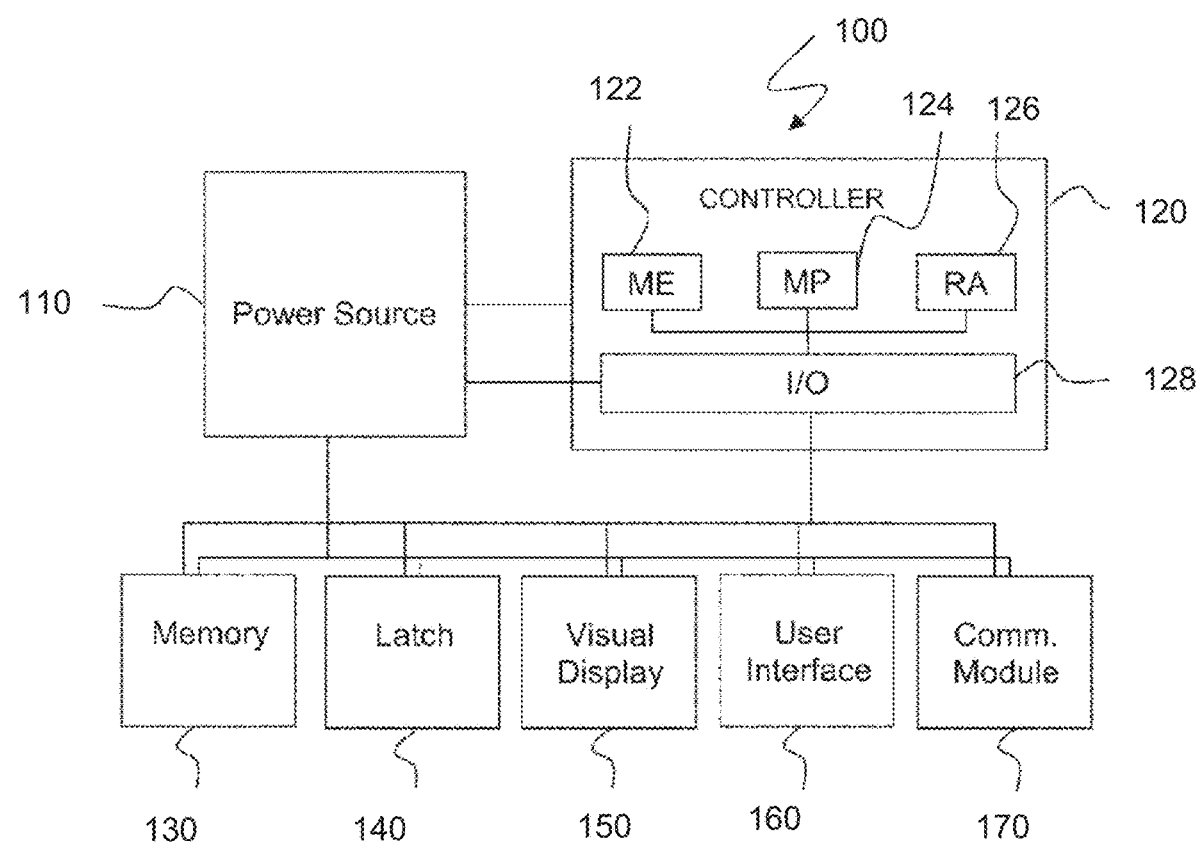
FIG. 9 depicts a block diagram of an exemplary electronic lock according to one exemplary embodiment of the presently disclosed subject matter.

FIG. 9 depicts a block diagram of an exemplary electronic lock according to one exemplary embodiment of the presently disclosed subject matter. Referring to FIG. 9, a block diagram of an exemplary electronic lock 100 is shown in accordance with one embodiment of the presently disclosed subject matter. As illustrated, electronic lock 100 may include a power source 110, a controller 120, memory 130, latch 140, visual display 150, user interface 160, and communications device or module 170. Power source 110 may be any power device for supplying power to the electronic lock 100. For instance, power source 110 may be a battery pack or other power pack that provides electrical power to electronic lock 100.

Power source 110 is operatively connected to both the controller 120 and to the various other components of the electronic lock. The controller 120 may have the capability to direct the power supply 110 to selectively provide power to the various components of the electronic lock 100 or to remove power from the various components of the electronic lock 100. For instance, the controller 120 may be configured to control when the communications device or module 170 receives power from the power supply 110 so that the controller 120 may selectively power on or power off the communications module 170 in accordance with certain aspects of the presently disclosed subject matter, as will be discussed in detail below with reference to FIG. 10.

Controller 120 is the main processing unit of electronic lock 100. Controller 120 may include a memory 122, microprocessor 124, random access memory 126, and input/output device 128, as shown in FIG. 9. Those of ordinary skill in the art, using the teachings provided herein, should appreciate that the presently disclosed subject matter is not limited to any particular controller 120, but may include any device configured to control the various components of the electronic lock 100.

Controller 120 may be programmed with various instructions to perform various functions in accordance with aspects of the presently disclosed subject matter. For instance, controller 120 may include one or more computing devices that are adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to, application-specific circuits. Of course, combinations of computer-executed software and hard-wired logic or other circuitry may be suitable, as well. In a typical implementation, the controller could use a microcontroller chip attached to a memory device as well as other hardware to assist with various functions. The microcontroller could execute a special-purpose program produced using any programming language or combination of languages as may be suitable for the purpose, and as may exist or be later developed. While presently disclosed subject matter lends itself to the use of separate chips for the CPU, memory, and other interface logic, the design would be just as applicable if some or all of those functions were combined into one or more larger chips.

Electronic lock 100 may include a memory 130 connected to the controller 120. Memory 130 may be used to store various types of data associated with electronic lock 100 and/or an electronic access control system. For instance, memory 130 may be used to store user data, such as, user name, credential type and ID, supervisor level, and valid access times; lock data, such as lock name, access hardware (e.g. keypad or hardware), and open time; relational data detailing which users can access or open which electronic locks; and audit trail data and/or inventory data.

Electronic lock 100 may include a latch mechanism 140 that is operatively connected to controller 120. Latch mechanism 140 may be similar to the electronic latch assembly discussed above or may be any other latch mechanism configured to secure a cabinet or enclosure. In a preferred exemplary embodiment, whenever latch mechanism 140 receives a command from controller 120, the latch assembly unlocks the cabinet or enclosure for which the electronic latch 100 is used to provide secure storage.

The subject embodiment of a present electronic lock may further include a visual display 150 and user interface 160. Such visual display 150 and user interface 160 allow for a user to input and/or manipulate data or other information into the lock and to visually inspect certain settings, features, and/or data or other information associated with the lock. The visual display 150 and user interface 160 may be similar to the user interface and visual display depicted in FIGS. 1 and 4, or may have any other configuration that allows for the display and manipulation of data or other information at the electronic lock.

Still referring to FIG. 9, controller 120 may be operatively connected to communications module 170 which is used to interface electronic lock 100 to a network, to a computing device, or to other electronic locks. Communications module 170 may be any device for enabling communication with other electrical devices. For example, the communications module may be a modem, a Bluetooth communications module, an RF communications module, or any other device that enables communications with a network or remote device. In a particular embodiment, communications module 170 may be a modem adapted to enable communications over an 802.11 WiFi wireless network.

Figure 10:
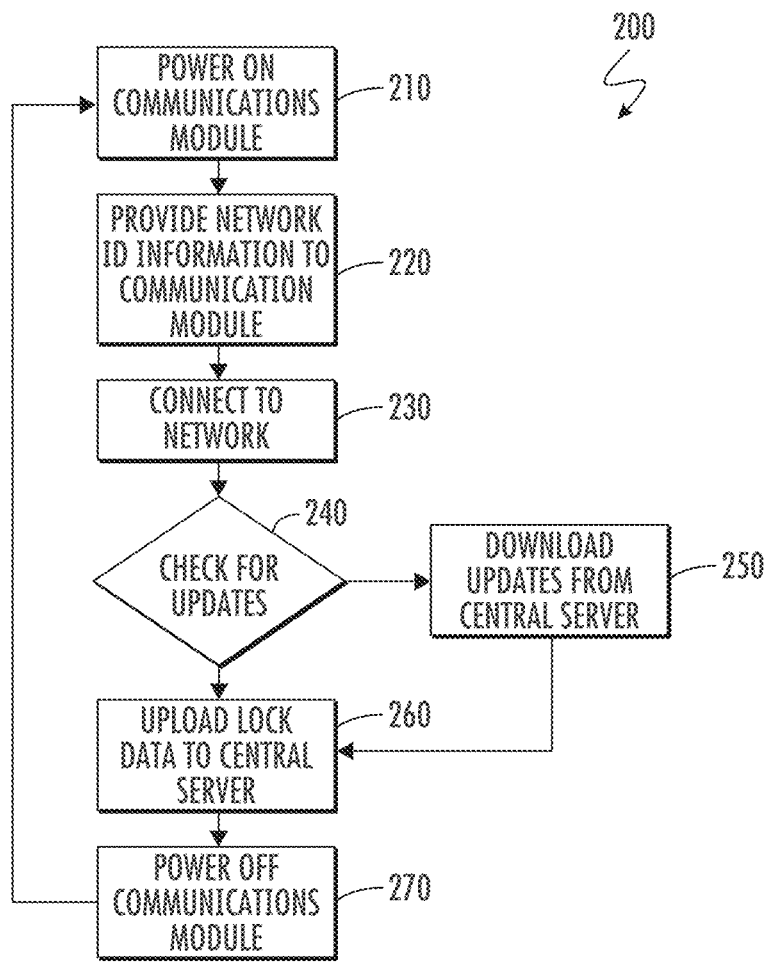
FIG. 10 depicts exemplary steps associated with a method according to one exemplary embodiment of the presently disclosed subject matter.

FIG. 10 depicts exemplary steps associated with a method according to one exemplary embodiment of the presently disclosed subject matter. With reference to FIG. 10, an exemplary method generally 200 for enabling network communication over an 802.11 WiFi wireless network will be discussed in detail. At step 210, a communications module of an electronic lock is powered on. The communications module may be powered on pursuant to programmed instructions from the electronic lock or pursuant to the manual pressing of a button on the electronic lock or other triggering event that directs the communications module of the electronic lock to power on.

At step 220, network identification information is provided to the communications module. Such network identification information must be provided to the communications module to allow the communications module to connect to and communicate over the network. Such information may include, for example, the SSID of the 802.11 WiFi network, the appropriate encryption pass keys to enable access to the WiFi network, and/or the IP address of the central server. Once the network identification information has been provided to the communications module, the communications module can connect the electronic lock to the network, as shown at step 230. The electronic lock can then communicate with a central server or other remote device over the network and can receive and transmit data over the network.

At step 240, the electronic lock checks for updates from the central server. If updates are available, then the electronic lock downloads such updates and stores them in memory as shown at step 250. For instance, the electronic lock may download new relational data which identifies which users can access the cabinet or enclosure secured by the electronic lock. At step 260, the electronic lock uploads data, such as audit trail data or inventory information to the central server. In such manner, audit trail data, inventory data, and other data stored at the individual locks may be updated to a central location periodically over the network without a supervisor having to visit each individual lock in the field.

At step 270, the communications module of the electronic lock may be powered off to conserve power supply resources. The electronic lock may be programmed to power off the communications module after a predetermined time interval after the communications module has been powered on. In addition, the electronic lock may be programmed to power off the communications module once all updates have been downloaded from the central server and once all lock data, such as audit trail data and inventory data, have been uploaded to the central server.

The presently disclosed subject matter allows for the interfacing of many electronic locks to a central server over an 802.11 WiFi wireless network while preserving limited power supply resources available with electronic locks. For facilities already have existing 802.11 WiFi wireless networks, the presently disclosed subject matter facilitates the implementation of an electronic access control systems using existing infrastructure. The networked connection of electronic locks to a central server allows for the updating of many electronic locks simultaneously and facilitates the tracking of lock data such as audit trial data and inventory data from a central location, providing significant advantages.

By connecting a plurality of electronic locks over a network, a supervisor or other user can then update electronic access control data used by the locks in one of two ways. The supervisor or other user can provide updates to the electronic lock at the individual lock, or the supervisor or other user can provide the updates into a central server, which then communicates each of those updates to the individual electronic locks.

An access control system capable of updating multiple electronic locks simultaneously, such as over a WiFi network or other network, may generate database control problems. Low end database control systems utilizing, for example, Microsoft Access, lose significant reliability if multiple database manipulations occur simultaneously. In order to accomplish multiple reliable database manipulations simultaneously, a more sophisticated database management system may be required. However, using such a sophisticated database management system creates difficulties in implementation, as microprocessors in electronic locks that can communicate with these databases are expensive. Moreover, such microprocessors do not lend themselves to low energy consumption.

Figure 11:
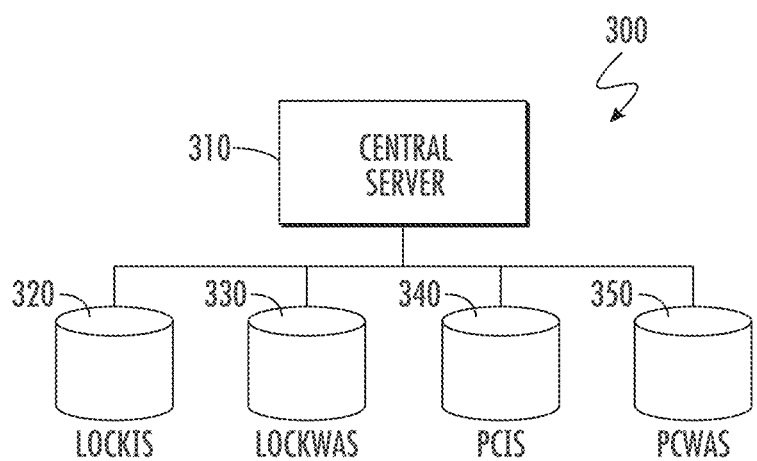
FIG. 11 depicts a database system according to one exemplary embodiment of the presently disclosed subject matter.
Figure 12:
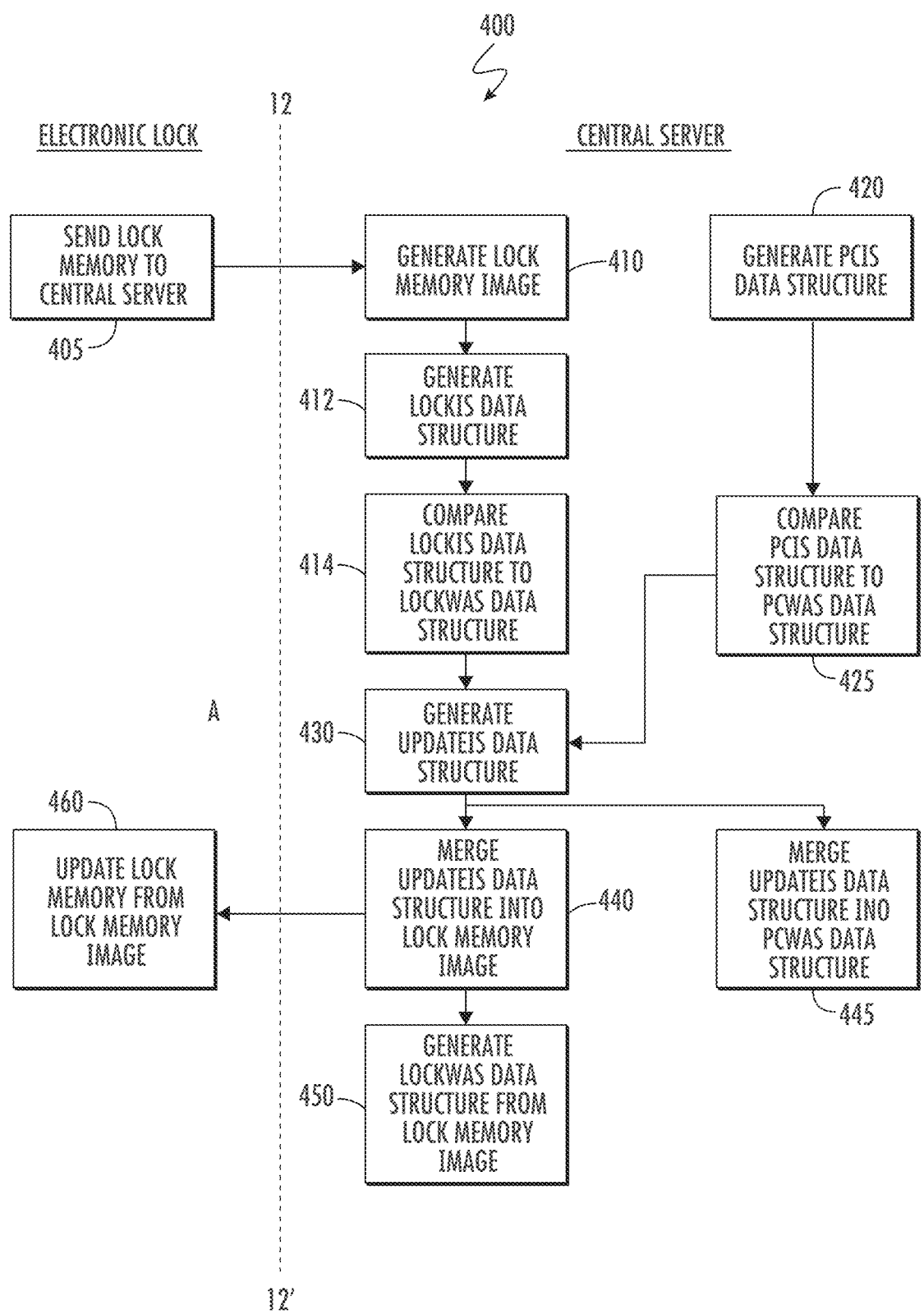
FIG. 12 depicts exemplary steps associated with a method according to another exemplary embodiment of the presently disclosed subject matter.

Another aspect of the presently disclosed subject matter provides for efficient data exchange between the plurality of electronic locks and the central server without having to integrate expensive processing capability into the individual electronic locks. The methodology and apparatus according to such exemplary aspect of certain embodiments of the presently disclosed subject matter shifts the computing horsepower from the small processors and controllers available on an electronic lock to the more significant computing resources available at a central server. With reference to FIGS. 11 and 12, present exemplary methodology and apparatus are discussed in detail.

FIG. 11 depicts a database system according to one exemplary embodiment of the presently disclosed subject matter. More specifically, FIG. 11 depicts an exemplary database structure 300 that may be used in accordance with one disclosed exemplary embodiment to provide four databases that are operably connected to central server 310. Such databases may in some instances be regarded as being inventory reports, at various points in time. Such databases may include LOCKIS 320; LOCKWAS 330; PCIS 340 and PCWAS 340. The LOCKIS database 320 includes data and/or information about the current state of data stored in the memory of the electronic lock. The LOCKWAS database 330 includes data and/or information about the state of data stored in the memory of the electronic lock the last time the electronic lock was connected to the central server 310. The PCIS database 340 contains data and/or information about the current state of data stored at the central server. The PCWAS database 350 contains data and/or information about the state of data stored at the central server the last time the electronic lock was connected to the central server. The electronic access control system uses such exemplary four databases to reconcile the information and/or data stored or provided at the central server with the plurality of electronic locks.

FIG. 12 depicts exemplary steps associated with a method according to another exemplary embodiment of the presently disclosed subject matter. More specifically, FIG. 12 depicts the exemplary steps associated with one exemplary present method 400 of updating a plurality of electronic locks connected to a central server. At step 405, an electronic lock sends information stored in lock memory to the central server. Central server generates a lock memory image from this information as illustrated at step 410 and generates data structure LOCKIS from such lock memory image as illustrated at step 412. Such LOCKIS data structure includes data and/or information about the current state of data stored in the memory of the electronic lock.

At step 414, exemplary present method 400 compares the LOCKIS data structure to the LOCKWAS data structure already stored at the central server. The LOCKWAS data structure includes data and/or information about the state of data stored in the memory of the electronic lock the last time the electronic lock was connected to the central server 310 (FIG. 11). The purpose of such comparison is to see if a supervisor or other user has input updates at the electronic lock since the last update from the central server that are not yet reflected in the central server memory. Present exemplary method 400 compares the LOCKIS data structure to the LOCKWAS data structure to determine any differences. The differences between the LOCKIS data structure and the LOCKWAS data structure are used to generate temporary data structure UPDATEIS as shown at step 430.

At step 420, the central server generates the PCIS data structure. The PCIS data structure contains data and/or information about the current state of data stored at the central server. For example, the PCIS data structure includes update information input into the central server by a supervisor or user. At step 425, the method 400 compares the PCIS data structure to the PCWAS data structure. The PCWAS data structure includes data and/or information about the state of data stored in the memory of the central server the last time the electronic lock was connected to the central server 310 (FIG. 11). The purpose of such comparison is to see if a supervisor or other user has input updates at the central server since the last update from the central server that are not yet reflected in the electronic lock memory. Present exemplary method 400 compares the PCIS data structure to the PCWAS data structure to determine any differences. The differences between the PCIS data structure and the PCWAS data structure are used to generate temporary data structure UPDATEIS as shown at step 430.

UPDATEIS data structure is a temporary data structure created by the central server that includes differences between the PCIS and PCWAS data structures and the LOCKIS and LOCKWAS data structures. At step 440, the central server merges such temporary UPDATEIS data structure into the lock memory image that reflects updates input by a user or supervisor at the central server. At step 445, the central server uses such UPDATEIS data structure to generate a new PCWAS data structure that reflects updates input by a user or supervisor at the electronic lock. Those of ordinary skill in the art will appreciate from the flowcharts herewith that additional features and functionality exist, even though not described herein in detail. For example, in some instances the comparison of differences between the PCIS and PCWAS data structures and the LOCKIS and LOCKWAS data structures will yield different changes (for example, 60 seconds in the former instance, and 30 seconds in the latter instance). In such events, typically there will be an inherently dominate feature which will prevail (such as the PC in the example above).

At step 450, the central server generates a new LOCK-WAS data structure. The central server then updates the lock memory from the lock memory image as shown at step 460. As illustrated in FIG. 12, the majority of steps associated with method 400 occur at the central server. The dashed line 12-12' indicates the exemplary present separation of steps that can occur at the central server and the steps that can occur at the electronic lock. As can be seen, the electronic lock is only required to transmit its lock memory to the central server as shown at step 405 and to receive updates to the lock memory as illustrated at step 460. All of the other processing steps associated with method 400 per presently disclosed subject matter may occur at the central server. In such manner, such aspect of certain embodiments of the presently disclosed subject matter shifts computing resources from the electronic lock to the central server. Such allows smaller, less expensive processors and controllers to be used in the electronic locks and preserves power supply resources at the electronic lock. While present embodiments may favor a particular division of labor between the lock's controller and the server, future embodiments may favor a different balance.

Figure 13:
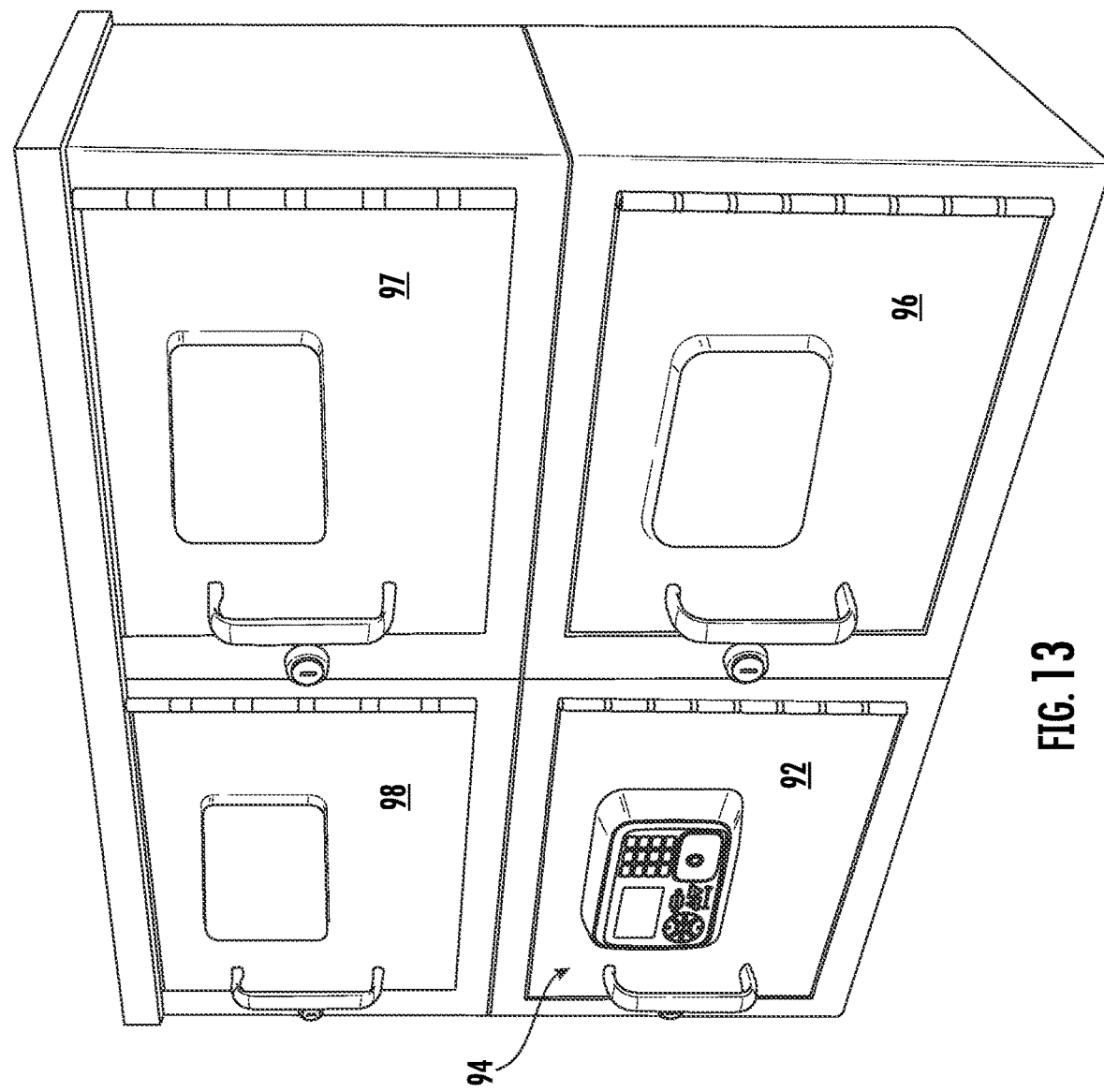
FIG. 13 depicts an image of an exemplary stacked array of plural enclosures in accordance with the presently disclosed subject matter.

FIG. 13 depicts an image of a prototype of an exemplary stacked array of plural enclosures in accordance with the presently disclosed subject matter. For illustrations purposes, enclosure 92 includes a representative electronic lock 94 while enclosures 96, 97, and 98 only include a representative placeholder for installation of a lock.

An installation such as represented by FIG. 13 may illustrate storage of narcotics boxes such as in the office of a supervisor, prepared to be sent out, or waiting to be prepared to be sent out. As otherwise discussed herein, it is to be understood that any of such enclosures may be identified themselves and/or their content read by the application of RFID technology as discussed herein.

Figure 14:
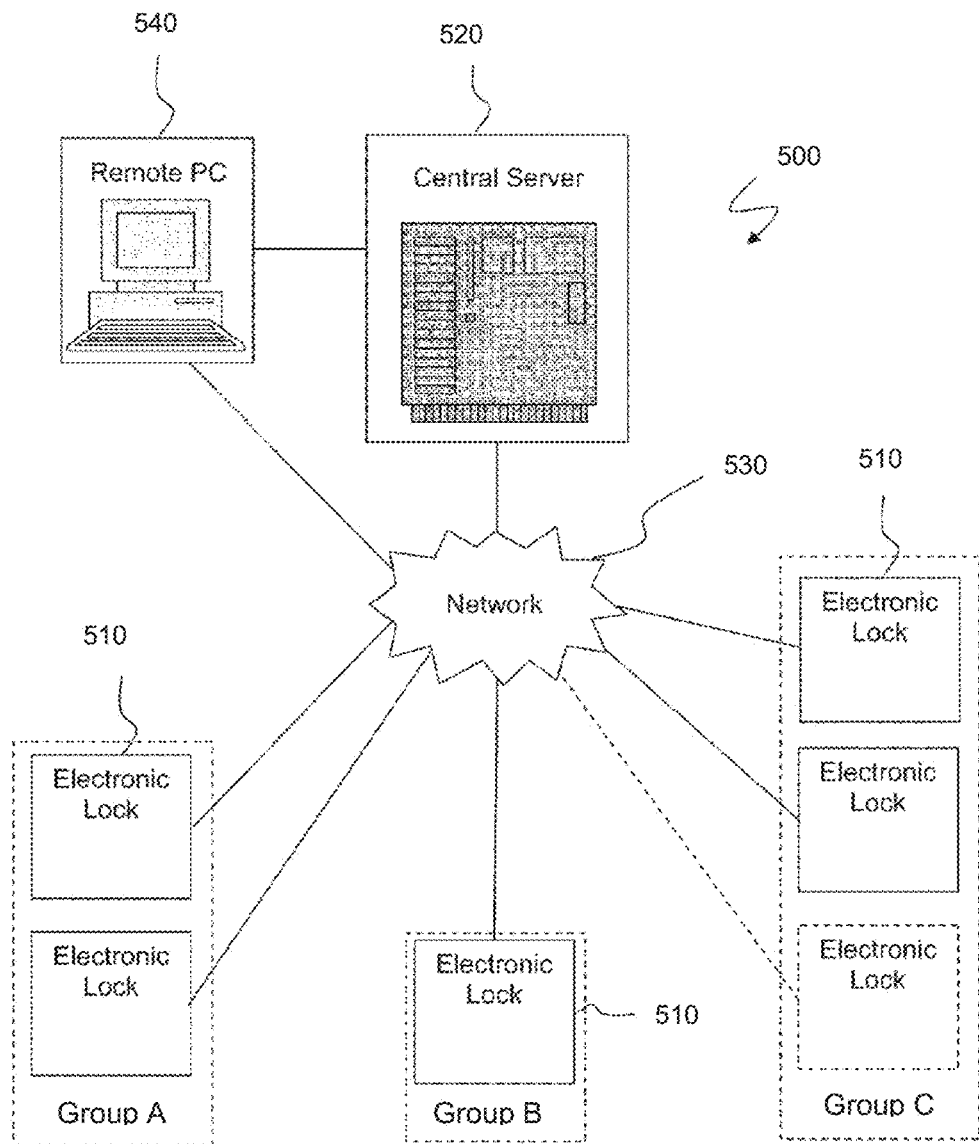
FIG. 14 depicts an exemplary present electronic access control system including a plurality of electronic locks used to secure a plurality of different enclosures or cabinets according to one exemplary embodiment of the presently disclosed subject matter.

With reference to FIG. 14, a block diagram of an exemplary electronic access control system 500 used to secure a plurality of boxes, cases, or enclosures is illustrated. Electronic access control system 500 includes a plurality of electronic locks 510 operatively connected to central server 520 over network 530, or otherwise connected to central server, or to a supervisor's device. Based on the disclosure provided herein, one of ordinary skill in the art will recognize that the inherent flexibility of computer-based systems allows for a great variety of possible configurations, combinations, and/or divisions of tasks and functionality between and among components of the electronic access system 500. For instance, server processes discussed herein may be implemented using a single server or multiple servers working in combination. Those of ordinary skill in the art will appreciate that the various server representations in the drawings herewith are intended to represent both such single or multiple server implementations. Databases and applications may be implemented on a single system or distributed across multiple systems. Distributed components may operate sequentially or in parallel.

In electronic access control system 500, a plurality of electronic locks 510 are used to secure multiple stacks of boxes, including Stack or Group A, Stack or Group B, and Stack or Group C. Each of the groups may have one or more electronic locks, representative of an associated narcotics box for which an individual electronic lock 510 is required or desired. It is to be understood from the disclosure herewith that the terminology a plurality of securable enclosures may mean a group comprising respective cabinets (or other forms of enclosures), respective drawers, doors, or similar in one or more cabinets, or respective parts or subcomponents of various mixtures of the foregoing. For instance, Group A is illustrated as having two electronic locks 510. Such two electronic locks 510 may be for separate narcotics boxes or other enclosures in Group A. Similarly, Group C is illustrated as having three electronic locks 510. Such three electronic locks 510 may be for separate narcotics boxes or other enclosures within Group C. The third electronic lock 510 of Group C is illustrated in dashed line to signify that any number of electronic locks 510 may be associated with a single group.

As discussed above, each of the electronic locks 510 of the electronic access control system 500 uses and creates data that may be managed by the access control system. For example, plural narcotics boxes all having a particular predetermined profile as to their initial contents, may be readied as a group in Group A, while other content-profiles may be prepared in association with Group B or Group C Access control systems may allow manipulation and control of the access control data at the actual electronic lock 510 itself through, for instance, user interface 160 shown in FIG. 9. In such circumstances, the updating and modification of access control data for each of the individual electronic locks 510 may require a supervisor, service person, or someone of higher position than a "normal" user to go to the lock 510 with a computer such as a laptop computer to perform the data updating and manipulation. Such method requires someone to visit each electronic lock 510 that needs to be updated. If there are hundreds of locks that need to be maintained, such process can be quite time consuming and expensive.

As shown in FIG. 14, the plurality of electronic locks 510 may be connected to a central server 520 over a network 530, per the presently disclosed subject matter. In this manner, updates and other data manipulation and control can occur at the central server 520 and be communicated to each of the plurality of electronic locks 510 over network 530. Data can be managed at the central server 520 or via a remote computing device 540 operatively connected to central server 520.

Network 530 may be any hardwired or wireless network or combinations thereof for connecting the plurality of electronic locks 510 to central server 520. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

In one embodiment, the plurality of electronic locks 510 are connected to central server 520 through an 802.11 WiFi network interface. Enabling wireless communication over an 802.11 WiFi network has many advantages, including, for example, facilitating the exchange of data between a central server and an electronic lock that is used to secure a mobile cabinet or enclosure that would be difficult to connect to a hard wired network.

Electronic locks 510 may interface with network 530, for example, through communications module 170 shown in FIG. 9. Unfortunately, current WiFi wireless network technology does not lend itself to long term battery operation (such as multiple months, or a year, or more). Communications modules adapted to communicate with 802.11 WiFi wireless networks have significant power requirements. Battery packs or other power source modules powering such communication modules often need to be recharged frequently, sometimes daily, to provide continuous power to the communication modules. Charging of battery packs or other power modules on electronic locks, however, is a commercially unfeasible option.

Existing communication modules for communication over 802.11 WiFi networks include a "sleep mode" during which the communication module draws less power from the power source to preserve power supply resources. The communication module, while in "sleep mode" listens for a wake up signal communicated over the WiFi network. The communications module wakes up and returns to full power upon hearing of the wake up signal. After data has been communicated over the network, the communication module may return to a "sleep mode" to preserve power supply resources. Such "sleep mode" feature as currently available is still generally commercially undesirable for electronic lock systems because the communications module, while in "sleep mode," still draws significant power from the power supply source. Therefore, while sleep modes may be helpful under some present or future circumstances, a design which does not require them essentially has more present versatility.

One aspect of the presently disclosed subject matter preserves power supply resources while enabling communication over an 802.11 WiFi network. According to such aspect of the presently disclosed subject matter, an electronic lock includes a controller that is capable of completely powering off a communication module for enabling communications over an 802.11 WiFi network. For instance, as shown in FIG. 9, controller 120 may be adapted to completely power off the communications module 170. By completely powering off the 802.11 WiFi communications module, significant power supply resources can be preserved or conserved.

Once the 802.11 WiFi communications module has been powered off, it can no longer listen for a wake-up signal which triggers the communications module to power back on and to receive and transmit data over the network. To address such issue, one aspect of the presently disclosed subject matter for particular embodiments includes programming the electronic lock to periodically power on the 802.11 WiFi communications module at predetermined time intervals to enable communication over the network. For instance, the electronic lock may be programmed to power on the communications module once a day, once a week, once a month, or after any other time interval. In addition, the electronic lock may include a manual button or other interface that enables a user to manually power on the communications module. After the communications module has been powered on, the electronic lock can receive and transmit data over the network until the communications module powers back down.

One example of specifications for a representative embodiment is set forth in the following Table 2. Such Table 2 incorporates a variety of scenarios which may be encountered, to show how operation of a particular embodiment of presently disclosed subject matter may be conducted. Such operational features are not specifically limited to a given presently disclosed embodiment. In other words, such operative features may be utilized in various embodiments of the presently disclosed technology, with all such embodiments commonly making comparative tracking assessments, so that a tag no longer seen, or a tag seen at an RSSI level below a determined threshold, or a tag seen with a tamper evident indication, all result in detection that a corresponding protected/enclosed dosage was accessed. An exemplary listing of such drugs/dosages is included in the Table 2 subject matter disclosure herewith.

TABLE 2

RFID box example specifications

Definitions

RFID BOX- A narcotics box assembly loaded with an RFID reader typically on an ambulance
CURRENT INVENTORY- This is a list of DRUG TAGs last processed into the RFID BOX
LAST READ- The list of DRUG TAGs in the RFID box the last time the contents were read
DRUG TAG- An RFID tag on a drug
MISSING DRUG TAGS- Any DRUG TAGs that are not in the LAST READ but are in the CURRENT INVENTORY
NEW DRUG TAGS- Any DRUG TAGS that are in the LAST READ but are not in the CURENT INVENTORY
LIMBO TAGS- Any MISSING DRUG TAGs that do not have information entered into the system regarding their whereabouts
USER- person accessing the RFID box
FULL REMOVE- when all of DRUG TAGs are removed from the RFID BOX
FULL ADD- when DRUG TAGs are added to and empty RFID BOX
PARTIAL REMOVE- when one or more DRUG TAGS (but not all of them) are removed from the RFID box
PARTIAL ADD- when DRUG TAGS are added to the RFID BOX.
INCIDENT- A system that allows tracking of administered DRUG TAGS. This system will track an INCIDENT NUMBER from a third party software (which might include - Image Trend, Water, or Siencia). If the INCIDENT system is turned on- LockView will present an INCIDENT VIEWER which will track the following as part of the INCIDENT NUMBER- USER, DRUG TAG(s), date/time, RFID BOX
INQUIRY- When the LAST READ shows a MISSING DRUG TAG-- the RFID BOX has the ability to inquire with the USER the whereabouts of the MISSING DRUG TAG. The system will be programmable to provide options regarding the whereabouts of the MISSING DRUG TAG. Programmable choices are consumed, expired, broken, and lost. If the INCIDENT system is turned on, the choices are incident, expired, broken, and lost. The LockView operator will choose (in the Lock Editor) if the INCIDENT system is turned on and which available options the USER has when there is a MISSING DRUG TAG. If all options are chosen- the user will have the following choices upon the RFID BOX finding a MISSING DRUG TAG:

If the INCIDENT system is turned ON and it is a FULL ADD the following options will be presented to the USER:
        Beginning of shift, INCIDENT NUMBER, Expired, Broken, Lost
    If the INCIDENT system is turned ON and it is NOT a FULL ADD the following options will be presented to the USER:
        INCIDENT NUMBER, Expired, Broken, Lost
    If the INCIDENT system is NOT turned ON and it is a FULL ADD the following options will be presented to the USER:
        Beginning of shift, Consumed Expired, Broken, Lost
    If the INCIDENT system is NOT turned ON and it is NOT a FULL ADD the following options will be presented to the USER:
        Consumed, Expired, Broken, Lost BEGINNING OF SHIFT- The state where the user wants the LAST READ to replace the CURRENT INVENTORY without regard for MISSING DRUG TAGS
RFID Tag Editor in LockView- Major Buttons
    ADD DRUG TAG
    EDIT DRUG TAG
    SHOW DRUG TAGS
        DRUG TAG SEARCH (when you hit this, you can filter the list of tags by all attributes)
        DRUG TAG TYPE- search by active, inactive or ALL tags
        EXPIRED TAGS- show only DRUG TAGs that have expired drugs
        LIMBO TAGS- show only MISSING DRUG TAGs that do not have proper/complete removal info or incident report info
Side Buttons
    DRUG TAG AUDIT TRAIL-
        The DRUG TAG audit trail will consist of date added along with all of the information regarding the event that caused the DRUG TAG to become consumed: USER, RFID BOX, INCIDENT NUMBER (if INCIDENT system is enabled) and details
    VIEW INCIDENT EDITOR for selected tag
TAG ATTRIBUTES 1. Tag #
2. Drug
    1. Fentanyl
    2. Midazolam (Versed)
    3. Morphine
    4. Hydromorphone (Dilaudid)
    5. Ketamine (Ketalar)
    6. Meperidine (Demerol)
    7. Diazepam (Valium)
    8. Lorazepam (Ativan)
    9. Generic - Special items that may be carried by various departments - Manual entry of info.
3. Type of container (single dose vial, ampule, preloaded syringe) and dosage
4. Drug manufacturer TABLE 2-continued RFID box example specifications 5. Lot
     6. Expiration
     7. Date added
     8. Date Used
     9. How removed-- Incident, expired, broken, lost
    10. Incident number (if system is turned on)
    11. User who used it (potentially a dual user)
    12-16 Extra-for future designations Incident Viewer Major Buttons
    ADD Incident (used for LIMBO TAGS only)
    ADD Details to incident
    INCIDENT SEARCH (when you hit this, you can filter the list of incidents by all features)
    Incidents will have the following fields.
        Number
        Date/Time
        User who entered the info
        DRUG TAGS and RFID box involved
        General information
    Able to sort by
        DRUG TAGS
        Date/Time
        USER
        INCIDENT number
        DRUG TYPE
        RFID BOX RFID Box operations The list of fully processed DRUG TAGS in the RFID BOX is called the CURRENT INVENTORY. The contents of the RFID box are read every time after the door is closed- this is called the LAST READ. The CURRENT INVENTORY is then compared to the LAST READ. The results of this comparison will present seven possible sceneriaos:
1. FULL REMOVE- The CURRENT INVENTORY has 2 or more DRUG TAGS. After the LAST READ ALL DRUG TAGS are now missing, which means that the contents of the RFID box are empty.
2. FULL ADD- After a FULL REMOVE, when one or more DRUG TAGS are added.
3. PARTIAL REMOVE- The CURRENT INVENTORY has 2 or more DRUG TAGS. After the LAST READ there are one or more DRUG TAGS still remaining as well as MISSING DRUG TAGS.
4. PARTIAL ADD- The CURRENT INVENTORY has 1 or more DRUG TAGS. After the LAST READ there are NEW DRUG TAGS found and no MISSING DRUG TAGS
5. FULL REMOVE ONE ITEM - The CURRENT INVENTORY has 1 DRUG TAG. After the LAST READ there is one MISSING DRUG TAG, which means that the contents of the RFID box are empty.
6. COMBINATION PARTIAL REMOVE/ADD- The CURRENT INVENTORY has 1 or more DRUG TAGS. After the LAST READ there are one or more DRUG TAGS found. These DRUG TAGS are a combination of DRUG TAGS found in the CURRENT INVENTORY, MISSING DRUG TAGS and NEW DRUG TAGS.
7. NO ACTION- When the CURRENT INVENTORY and the LAST READ are identical. This means that the USER accessed the RFID box and added/removed no DRUG TAGS.

The following will occur after the different types of reads:
1. FULL REMOVE- The CURRENT INVENTORY has 2 or more DRUG TAGS. The LAST READ is comparted to the CURRENT INVENTORY and the all DRUG TAGs are removed. Nothing happens with the memory or the display.
2. FULL ADD- (only occurs after a FULL REMOVE) The LAST READ is comparted to the CURRENT INVENTORY and the DRUG TAGS have returned. Any NEW DRUG TAGS are added to the CURRENT INVENTORY. If any NEW DRUG TAGs are currently LIMBO TAGs, they will be removed from the LIMBO tag list. If there are MISSING DRUG TAGS, The USER will be asked an INQUIRY regarding each MISSING DRUG TAG. If beginning of shift is chosen, the CURRENT INVENTORY will be replaced by the LAST READ and the INQUIRY will end. If beginning of shift is not chosen- The USER will be asked an INQUIRY regarding each MISSING DRUG TAG. The user will be asked regarding the drug type corresponding to the prefix of the MISSING DRUG TAG. Once the USER responds to the INQUIRY, the MISSING DRUG TAG will be removed from the CURRENT INVENTORY. If the USER does not respond to the INQUIRY, the tag will become a LIMBO TAG.
3. PARTIAL REMOVE- The CURRENT INVENTORY has 2 or more DRUG TAGS. The LAST READ is comparted to the CURRENT INVENTORY and there are one or more DRUG TAGS as well as MISSING DRUG TAGS. The USER will be asked an INQUIRY regarding each MISSING DRUG TAG. The user will be asked regarding the drug type corresponding to the prefix of the MISSING DRUG TAG. Once the USER responds to the INQUIRY, the MISSING DRUG TAG will be removed from the CURRENT INVENTORY. If the USER does not respond to the INQUIRY, the tag will become a LIMBO TAG.
4. PARTIAL ADD- The LAST READ is comparted to the CURRENT INVENTORY. Any NEW DRUG TAGS are added to the CURRENT INVENTORY. If any NEW DRUG TAGs are currently LIMBO TAGs, they will be removed from the LIMBO tag list.

TABLE 2-continued

RFID box example specifications

5. FULL REMOVE ONE ITEM- The CURRENT INVENTORY has 1 DRUG TAG. The LAST READ is comparted to the CURRENT INVENTORY and there now is one MISSING DRUG TAG. The USER will be asked an INQUIRY regarding the MISSING DRUG TAG. The user will be asked regarding the drug type corresponding to the prefix of the MISSING DRUG TAG. Once the USER responds to the INQUIRY, the MISSING DRUG TAG will be removed from the CURRENT INVENTORY. If the USER does not respond to the INQUIRY, the tag will become a LIMBO TAG.
6. COMBINATION PARTIAL REMOVE/ADD- The CURRENT INVENTORY has 1 or more DRUG TAGS. After the LAST READ there are one or more DRUG TAGS found. These DRUG TAGS are a combination of DRUG TAGS found in the CURRENT INVENTORY, MISSING DRUG TAGS and NEW DRUG TAGS. NEW drug tags will be processed according to the rules of PARTIAL ADD. MISSING TAGS will be processed according to the rules of PARTIAL REMOVE.
7. NO ACTION- When the CURRENT INVENTORY and the LAST READ are identical. This means that the USER accessed the RFID box and added/removed DRUG TAGS.

General Tag info

All tags will be unique and can be loaded into the system one of 2 ways. First, the tag can be manually scanned and added into the TAG editor. Secondly, it can be automatically added into the system buy appearing in an INITIAL LOAD or STANDARD MODE RFID read. If the tag is entered automatically, this tag will be automatically entered into the RFID tag editor. The operator will be able to edit this tag and enter additional information later. The prefix of the tag ID will determine the drug type.
The audit trail should not show that LIMBO TAGs are removed until the end/beginning of shift. There is a possibility that the tag will be returned before the end/beginning of shift. Once the beginning of shift has occurred, the list of LIMBO TAGS is emptied and the last user to not have the tag will be noted in the audit trail.

Variations may be practiced in different embodiments of presently disclosed subject matter. For example, as noted per the operational example of Table 2 herewith, an "incident" system or feature may be included. Such a feature, when included in a given embodiment, will allow a report to be generated regarding all of the particulars regarding a given incident, regardless of whether the overall system is turned on or off, per the included specifications of Table 2. Such particulars may include, for example, associated incident date and EMS crew data (when the embodiment involves an EMS crew).

Another alternative feature which may be practiced in some embodiments is to provide the enclosure or storage box with internal walls which are not perfectly parallel. By being intentionally off-parallel, the RF waves do not compound in a way that can otherwise produce "ringing," which results in better performance for locating or tracking/detecting tags within the case.

Further, embodiments may be practiced for which scanning for contents present is only conducted whenever the system detects that the door is closed. For example, door switch 44 may be monitored to ensure the door is closed prior to any inventory tracking step. Using such methodology helps to ensure that there are no misreads due to any stray RFID tags which may be in the area but not in the case.

Part of the presently disclosed subject matter relates to technology for the addition and/or incorporation of tamper evident tags, which is intended to refer to an RFID tag that will report a different ID as a function of whether or not it has been tampered with. One form of tag particularly useful for incorporation into presently disclosed embodiments makes use of a wire loop that extends out of the tag and snaps back into the housing. The tag will send a signal through the wire and, if the wire is electrically intact, will report that it is not tampered with. If the wire is broken, the tag will report that it has been tampered with.

Figure 15:
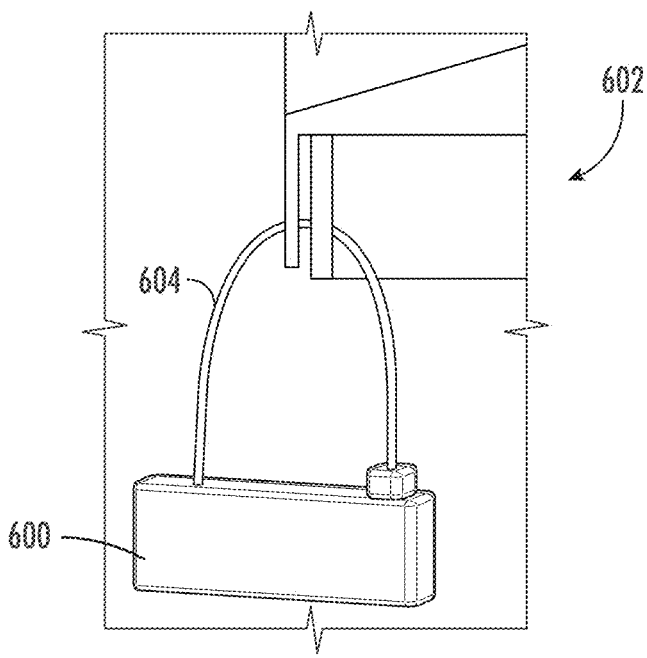
FIG. 15 depicts a known (prior art) RFID security seal tag, illustrated in place with a simple mechanical closure.
Figure 16A:
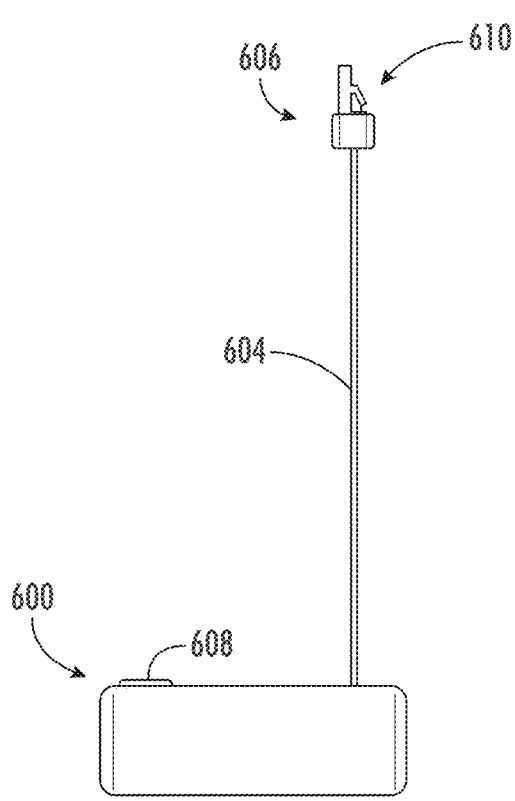
FIGS. 16A and 16B illustrate respective plan and side views of the known (prior art) tag of present FIG. 15, prior to placement/installation thereof.
Figure 16B:
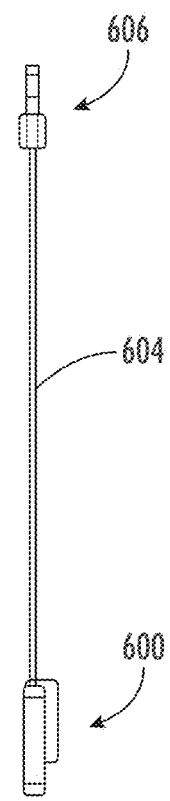

One example of a known (prior art) RFID security seal tag that may be practiced with presently disclosed subject matter is represented by FIGS. 15, 16A, and 16B. FIG. 15 depicts a known (prior art) RFID security seal tag generally 600, illustrated in place with a simple mechanical closure generally 602. As shown, a tamper evident feature, in this case in pertinent part a circuit wire generally 604, is looped through two cooperating features of closure 602, and each end of wire 604 is connected to the main body of tag 600. Once in such configuration, wire 604 cannot be separated from tag 600 without being broken, which changes the ID profile of tag 600, as understood by those of ordinary skill in the art. One example of such a tag 600 available in the marketplace is Part: #WF-SM-STV1 by William Frick & Company, Libertyville, Ill.

FIGS. 16A and 16B illustrate respective plan and side views of the known (prior art) tamper evident tag of present FIG. 15, prior to placement/installation thereof. In other words, a free end generally 606 of wire 604 has not been yet received into a receptacle 608 of the main body of tag 600. As represented, such free end 606 has a barb feature 610 or similar so that the wire cannot be withdrawn without breaking the wire.

FIGS. 17A through 27I relate to various presently disclosed embodiments for integrating such a preexisting tamper evident tag (an RFID tag with a tamper evident feature) into a container that will contain the narcotics (drug dosages). In particular, while various sized containers may be practiced, one exemplary set may include three different options. For example, a relatively smaller container may be sufficiently sized to accommodate 1 mL, 2 mL, and 5 mL drug vials. A relatively larger container may be sufficiently sized to accommodate 1 mL, 2 mL, and 5 mL ampules. A third container may be a special container both configured and sized for enclosing syringes or components thereof, such as the "Carpuject" brand syringe assembly which has a component for loading into an accompanying injector.

FIGS. 17A through 17D illustrate respective views of various exemplary container/cap combinations for use in accordance with and per presently disclosed subject matter. For example, FIGS. 17A and 17D illustrate two opposite-side perspective views of an exemplary relatively larger container generally 700 receiving an exemplary ampule generally 702. Each container 700 is fitted with a matching/ associated cap generally 704. Each cap 704 supports an associated tag generally 706, which has its own respective wire generally 708. As further discussed herein, such wires loop through a portion of both the cap and the container such that relative movement of the cap vis-à-vis the container (for access of the enclosed ampule) results in breakage of the entrained wire, for operation of the corresponding tag 706, as will be understood by those of ordinary skill in the art from the complete disclosure herewith.

Similarly, FIGS. 17B and 17C illustrate two opposite-side perspective views of an exemplary relatively smaller container generally 710 receiving an exemplary vial generally 712. Each container 710 is fitted with a matching/associated cap generally 714. Each cap 714 supports an associated tag generally 706, which has its own respective wire generally 708. As further discussed herein, such wires loop through a portion of both the cap and the container such that relative movement of the cap vis-à-vis the container (for access of the enclosed vial) results in breakage of the entrained wire, for operation of the corresponding tag 706.

Figure 17E:
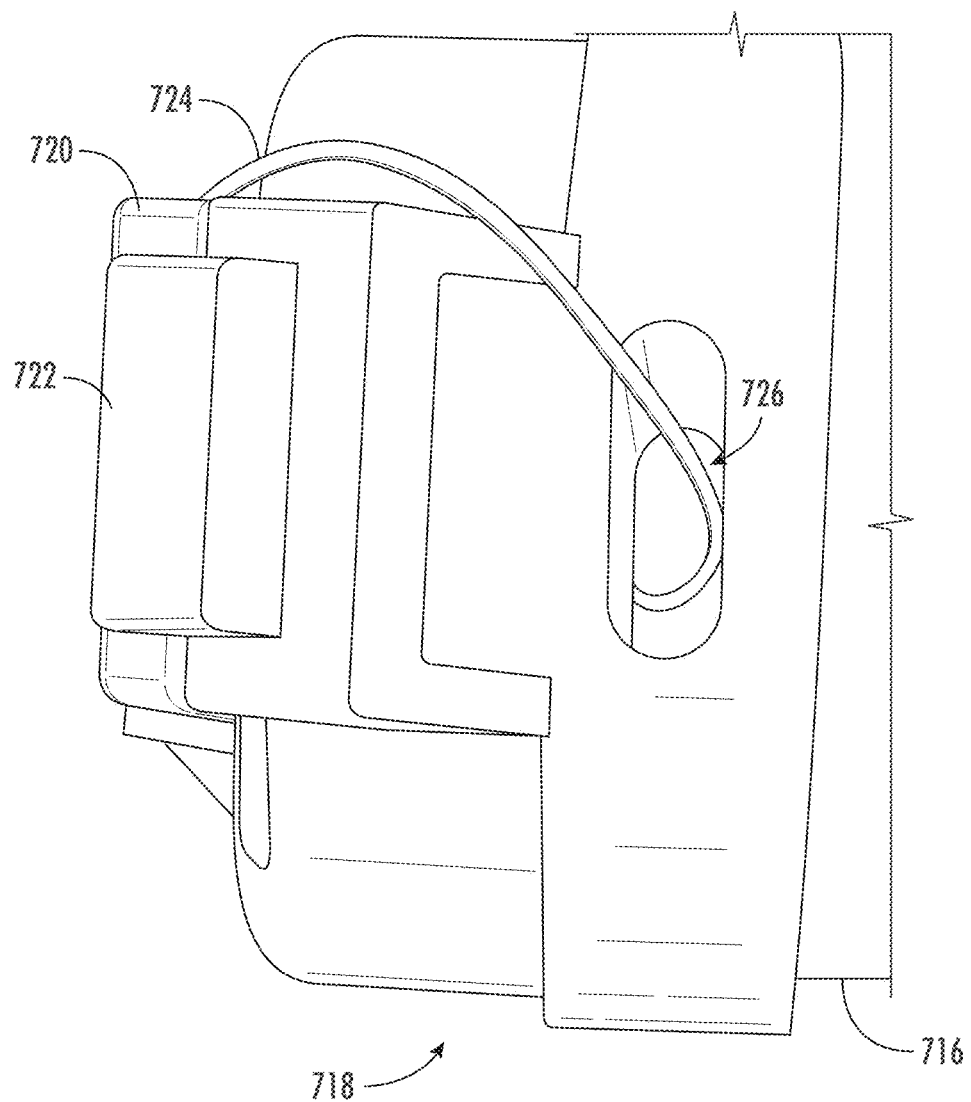
FIG. 17E illustrates an enlarged (closeup) view of a presently disclosed exemplary container/cap combination for use in accordance with and per presently disclosed subject matter.

FIG. 17E illustrates an enlarged (closeup) view of a presently disclosed exemplary container (716)/cap (718) combination for use in accordance with and per presently disclosed subject matter. In particular cap 718 secures a representative tamper evident tag 720 (having a tamper evident feature) in place such as through use of protruding elements 722. Such protruding elements comprising paired elements protruding from each cap cooperate together to form in effect means for supporting and holding an associated respective tamper evident RFID tag. With tag 720 so positioned, wire 724 of tag 720 may then be routed through plural holes 726 of the container and cap which align to form a channel for passage of wire 724. Whenever cap 718 is rotated sufficiently relative to container 716 in order to remove contents from container 716, wire 724 becomes broken.

Figure 18A:
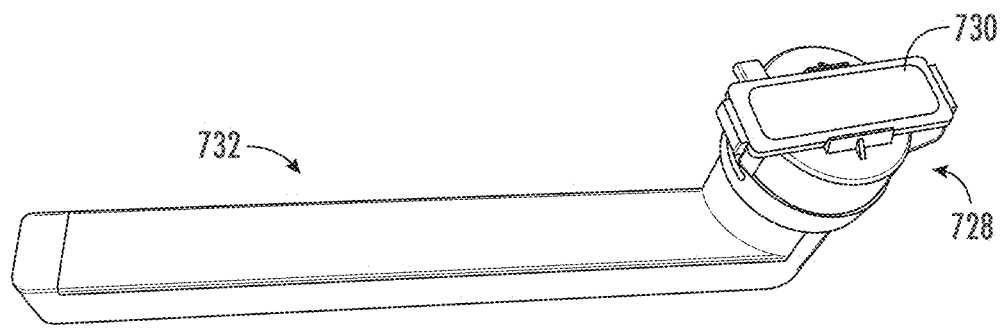
FIGS. 18A though 18C illustrate respective perspective views of an exemplary container/cap embodiment for use with specific injectable dosages for use in accordance with and per presently disclosed subject matter.
Figure 18B:
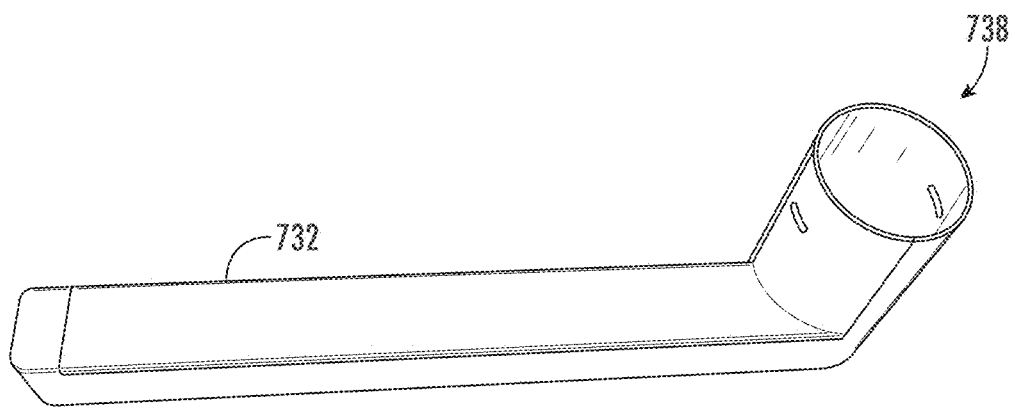
Figure 18C:
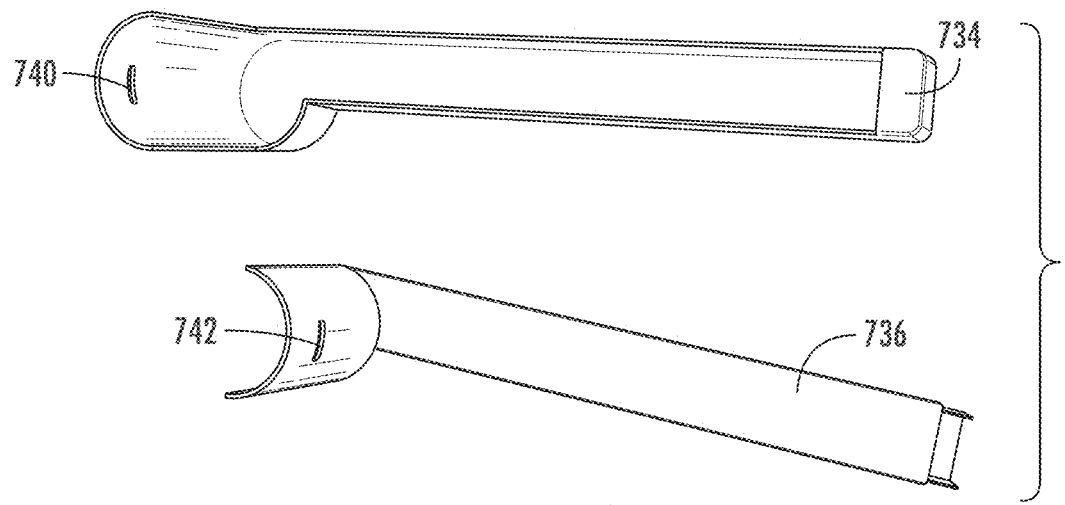

FIGS. 18A though 18C illustrate respective perspective views of an exemplary container/cap embodiment for use with specific injectable dosages for use in accordance with and per presently disclosed subject matter. FIG. 18A shows a full cap and container combination, with cap generally 728 supporting a tag 730, and mounted on a two-piece container generally 732. FIG. 18B illustrates the container generally 732 but without the cap. FIG. 18C illustrates the two pieces 734 and 736 of the container 732 separated from each other. As illustrated, when together, such two pieces form a generally circular feature 738 for cooperating with cap 728, similar to the other embodiments discussed above. The ends of respective pieces 734 and 736 that are distal from such circular feature 738 engage one another to help hold two-piece container 732 together. For example, upper piece (lid) 736 may include an extension member on its end distal from feature 738 which engages under a portion of the other piece 734, to hold the distal ends together. The elongated body of container 732 allows it to receive corresponding shaped, elongated devices such as injectable pre-loaded dosages. Respective holes 740 and 742 formed through respective pieces 734 and 736 allow for passage of a wire through the container, as discussed in conjunction with other embodiments herewith.

Figure 19:
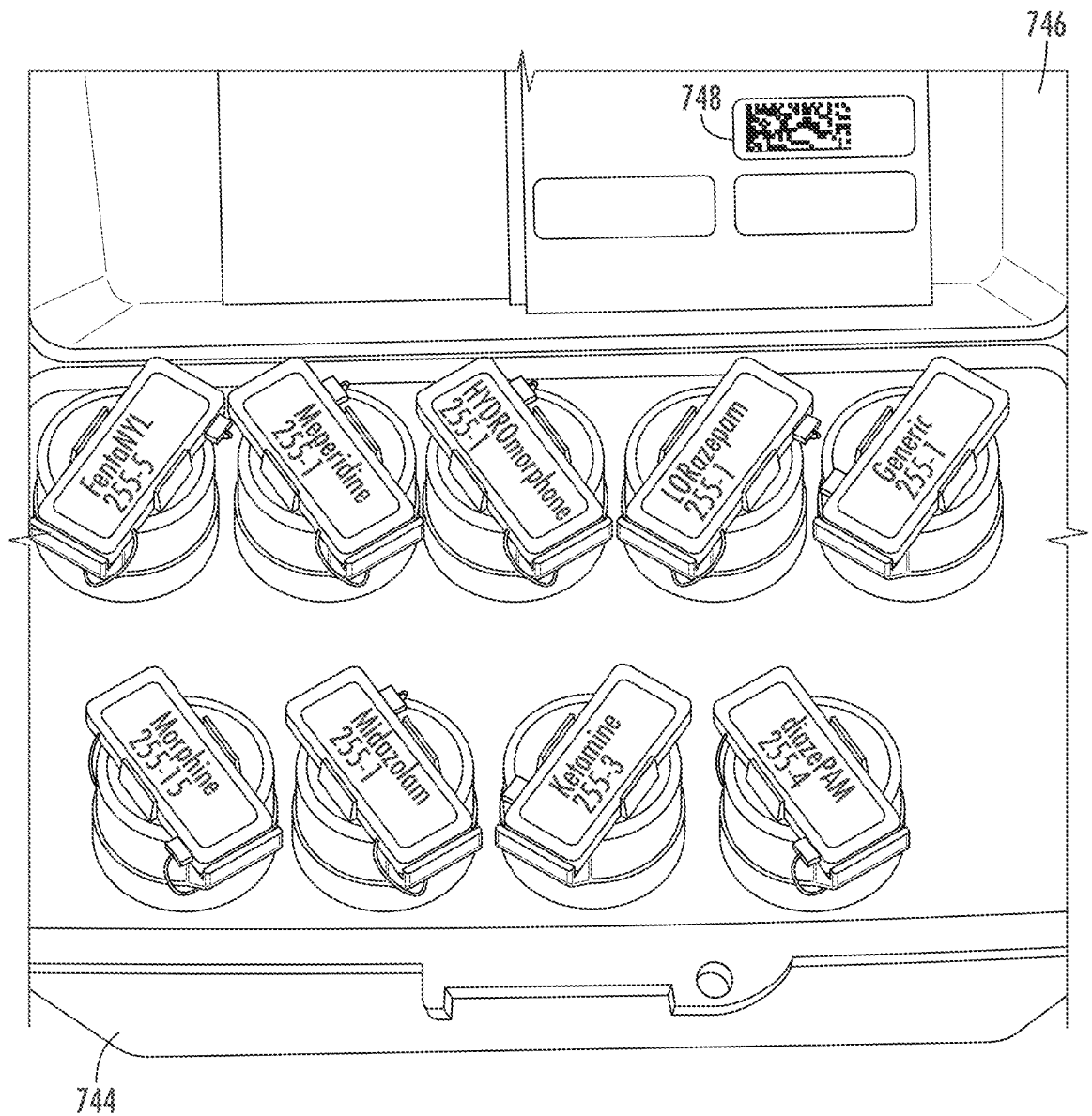
FIG. 19 illustrates a perspective view of an exemplary case receiving an exemplary plurality of respective container/cap combinations for use in accordance with and per presently disclosed subject matter.

FIG. 19 illustrates a perspective view of an exemplary case receiving an exemplary plurality of respective container/cap combinations for use in accordance with and per presently disclosed subject matter. Thus, FIG. 19 represents a closable enclosure (bottom 744 and closable lid 746) within which may be received a plurality of respective RFID tags with a respective frangible component (wire) and associated with respective consumable (drug dosages) inventory items. When used with an electronically actuated lock system for selectively allowing locking and unlocking of the enclosure, and an RFID reading system, an overall system is provided for combined electronic inventory data and access control.

FIG. 19 represents inclusion of a number of the container/cap exemplary embodiments disclosed herewith, each with placed RFID tags. FIG. 19 also represent the ability to use color-coding as well as worded labels, to facilitate human recognition of contents. Exemplary alternative label 748 also represents the possible use of further machine readable labeling.

FIGS. 20A through 20E illustrate various respective views of an exemplary container embodiment generally 800 for use with a "press fit" style container/cap exemplary embodiment in accordance with presently disclosed subject matter. The "press fit" language utilized herein is not necessarily meant to convey an interference fit, but what may be thought of as a snug fit or frictional slip fit between the container 800 and an associated cap.

As shown, FIG. 20A illustrates a perspective view, FIG. 20B a top plan view, FIG. 20C a front plan view, FIG. 20D a side plan view, and FIG. 20 E a sectional view along section line A-A of FIG. 20D. Container 800 generally comprises a cylinder having a solid bottom 808 and an opposing open end generally 802. A pair of opposing side wall openings 804 and 806, respectively, are 180 degrees opposite one another, for passage of an RFID tag wire therethrough, as otherwise discussed herein.

Exemplary dimensions are shown on such drawings and others, including dimensions of a potential tag 600, so that cooperation of the length of the wire 604 and body of tag 600 together with the physical dimensions of the container/cap of the presently disclosed embodiment may yield in combination a secured container (until the wire 604 is broken). Nonetheless, it is to be understood that variations may be practiced, including for example as needed to accommodate a tag device having different dimensions than that as shown by example in FIGS. 15, 16A, and 16B herewith.

FIGS. 21 A through 21C illustrate various respective views of an exemplary cap embodiment component (an outer piece thereof) for use with the "press fit" style container/cap exemplary embodiment in accordance with presently disclosed subject matter. At the same time, FIGS. 22 A through 22D illustrate various respective views of an exemplary cap embodiment component (a center piece thereof) for use with the "press fit" style container/cap exemplary embodiment in accordance with presently disclosed subject matter. Such outer and center pieces become joined together in order to form the cap component of the press fit style container/cap embodiment. While various means of joinder may be practiced, one preferred approach may involve ultrasonic welding.

Figure 21A:
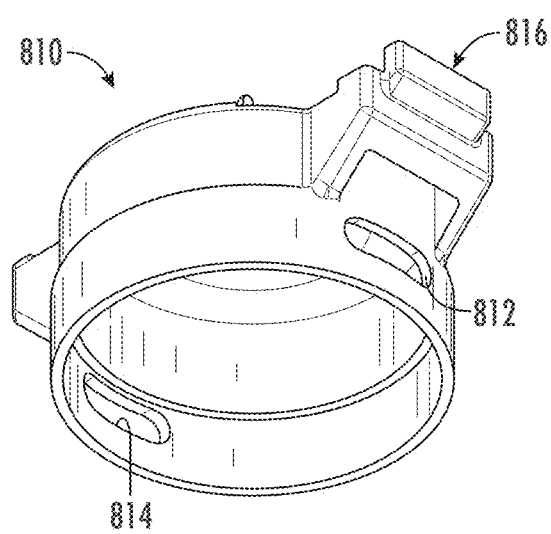
FIGS. 21A through 21C illustrate various respective views of an exemplary cap embodiment component (an outer piece thereof) for use with a "press fit" style container/cap exemplary embodiment in accordance with presently disclosed subject matter.
Figure 21B:
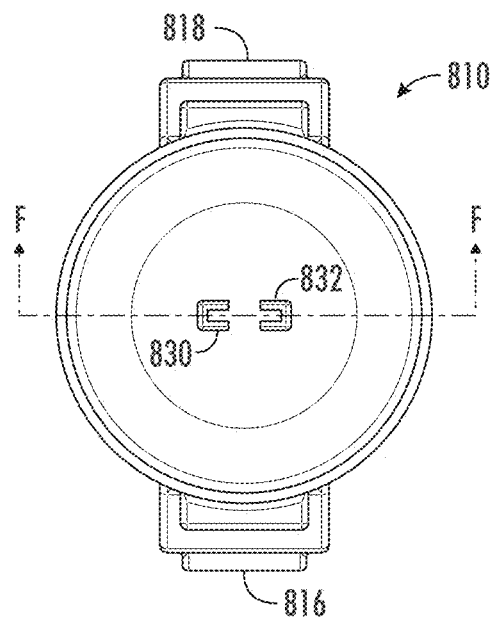
Figure 21C:
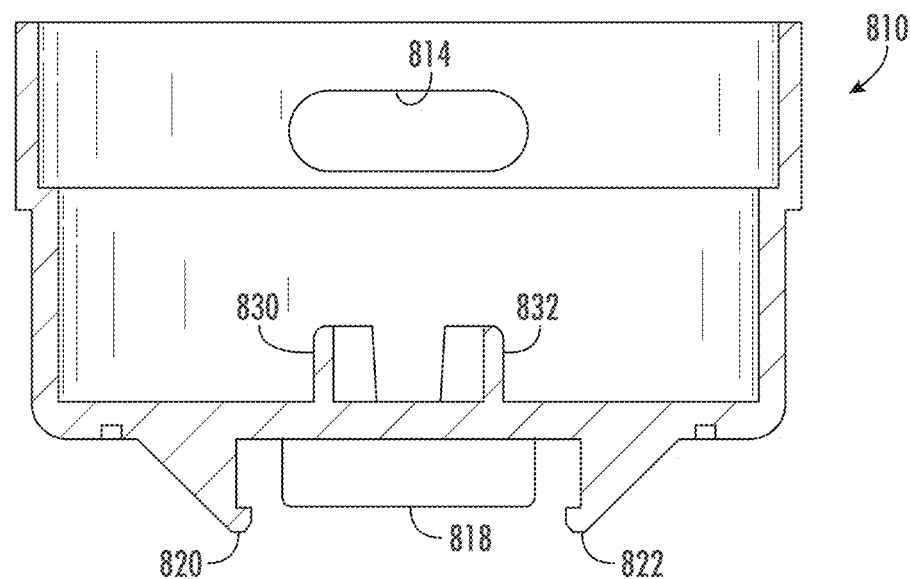

With reference to FIGS. 21A through 21C, FIG. 21A shows a generally perspective view of outer piece generally 810 prior to any such joinder with the center piece, FIG. 21B shows a generally bottom plan view of the exemplary embodiment of present FIG. 21A, and FIG. 21C shows a cross-sectional view of FIG. 21B, taken along section line F-F thereof. As seen, respective side openings 812 and 814 are formed 180 degrees opposite each other, for passage of a tag wire therethrough. Two opposing pair of elements 816/818 and 820/822 serve to support and secure an RFID tag (not shown) to such portion of the cap, as otherwise shown in other figures and discussed elsewhere in this disclosure.

Figure 22A:
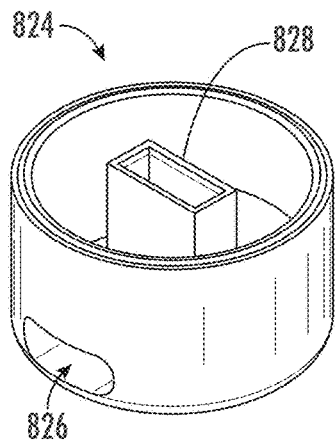
FIGS. 22A through 22D illustrate various respective views of an exemplary cap embodiment component (a center piece thereof) for use with a "press fit" style container/cap exemplary embodiment in accordance with presently disclosed subject matter.
Figure 22B:
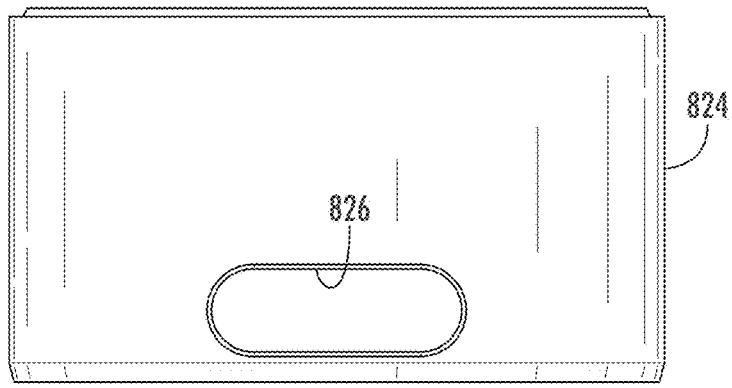
Figure 22C:
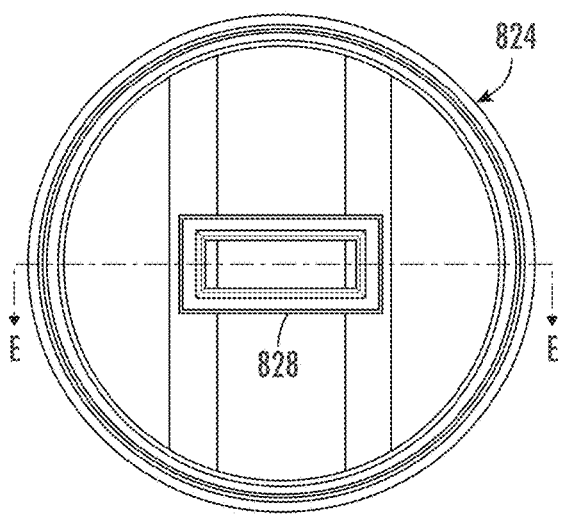
Figure 22D:
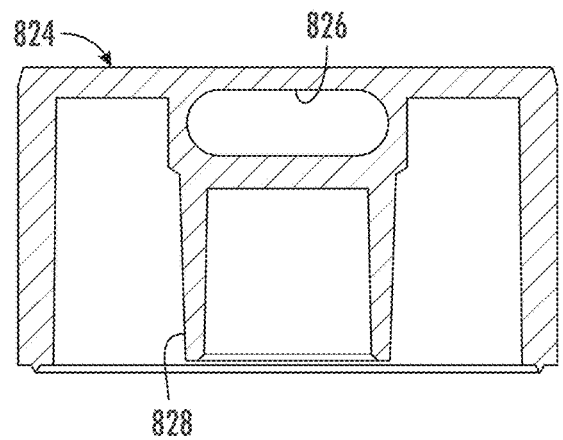

With reference to FIGS. 22A through 22D, FIG. 22A shows a generally perspective view of center piece generally 824 prior to any such joinder with piece outer piece 810, FIG. 22B shows a generally side elevational view of the exemplary embodiment of present FIG. 22A, FIG. 22C shows a generally bottom plan view thereof, and FIG. 22D shows a cross-sectional view of FIG. 22C, taken along section line E-E thereof. A channel 826 is formed through piece 824, and which aligns with openings 812 and 814 of outer piece 810 whenever pieces 810 and 824 are brought together. Each of pieces 810 and 824 have various alignment features to ensure such alignment of channel 826 with openings 812 and 814. In particular, center piece 824 includes a generally non-square rectangular feature generally 828 which mates with a pair of features 830 and 832 of piece 810, to ensure the correct alignment.

Figure 23A:
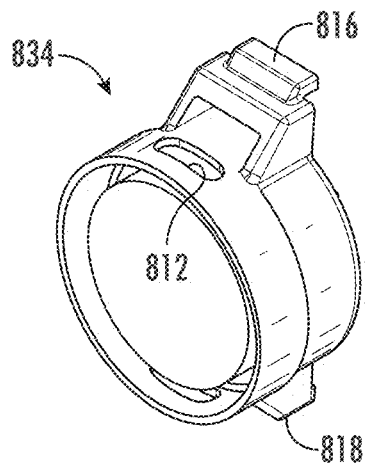
Figure 23B:
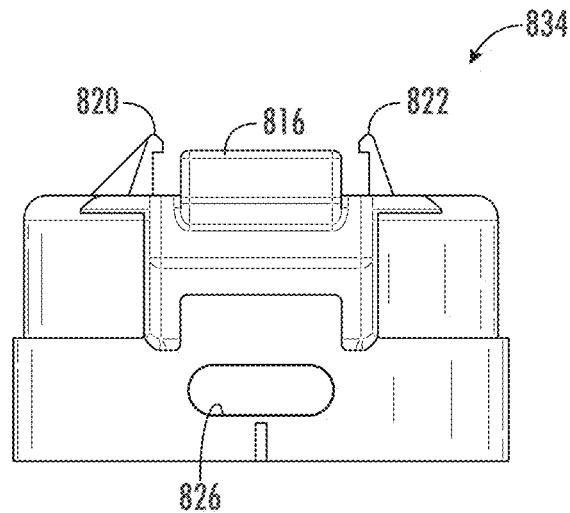
Figure 23C:
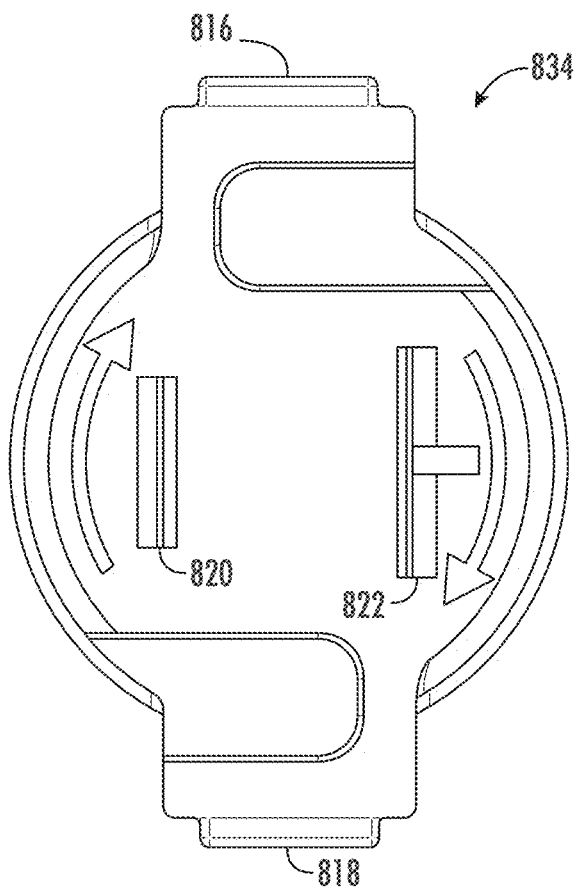
Figure 23D:
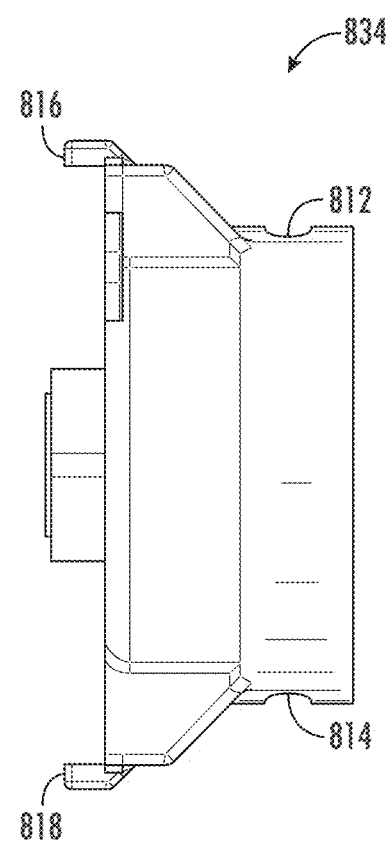

FIGS. 23A through 23G illustrate various respective views of an exemplary cap embodiment component generally 834 (center and outer pieces thereof combined) for use with a "press fit" style container/cap exemplary embodiment in accordance with presently disclosed subject matter. In particular, FIG. 23A illustrates a generally perspective view thereof, while FIGS. 23B, 23C, 23D, and 23 E illustrate, respectively, side elevation, top elevation, another side elevation, and bottom elevation views thereof. FIGS. 23F and 23G represent cross-sectional views of FIG. 23E, taken along section lines A-A and B-B thereof, respectively. Repeat use of reference numbers from FIGS. 21A through 22D is intended to represent same or analogous features.

FIGS. 24A through 24G illustrate various respective views of an exemplary container embodiment generally 900 for use with a "ratchet" style container/cap exemplary embodiment in accordance with presently disclosed subject matter.

Figure 24A:
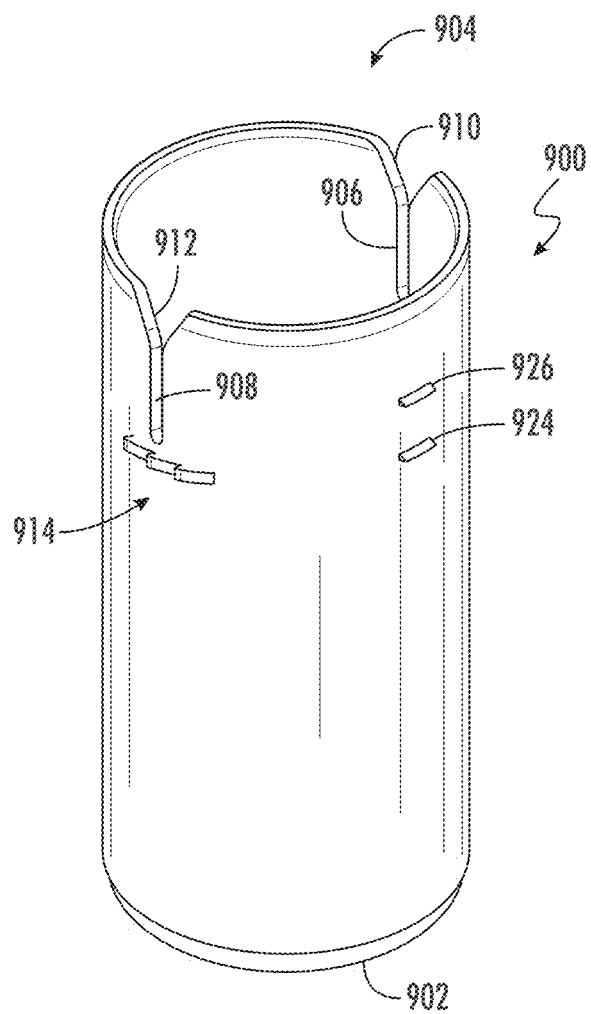
FIGS. 24A through 24G illustrate various respective views of an exemplary container embodiment for use with a "ratchet" style container/cap exemplary embodiment in accordance with presently disclosed subject matter.
Figure 24B:
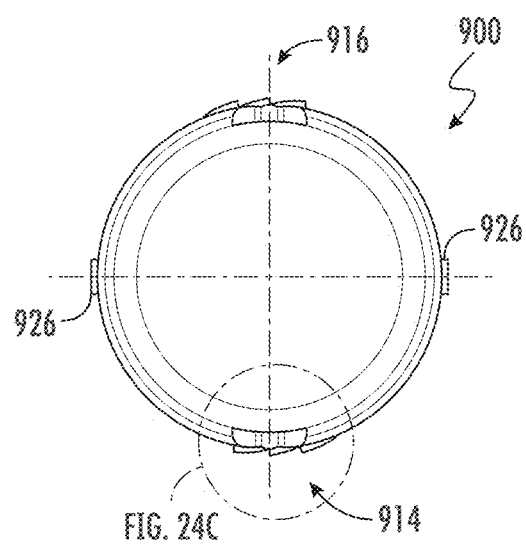
Figure 24C:
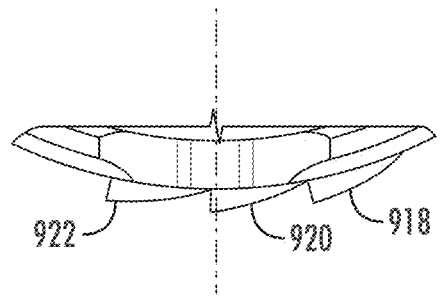
Figure 24D:
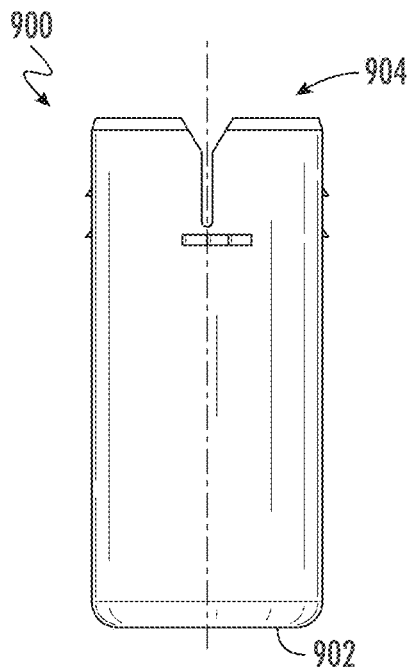
Figure 24E:
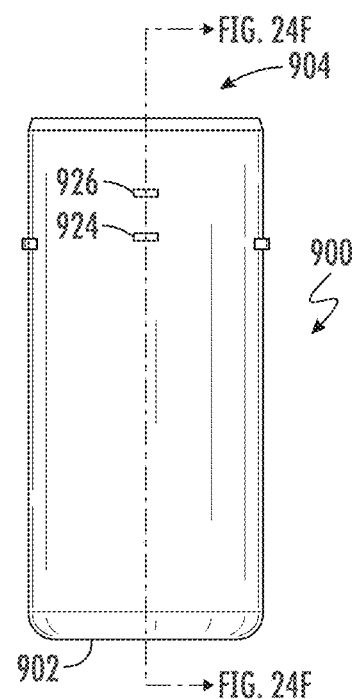
Figure 24F:
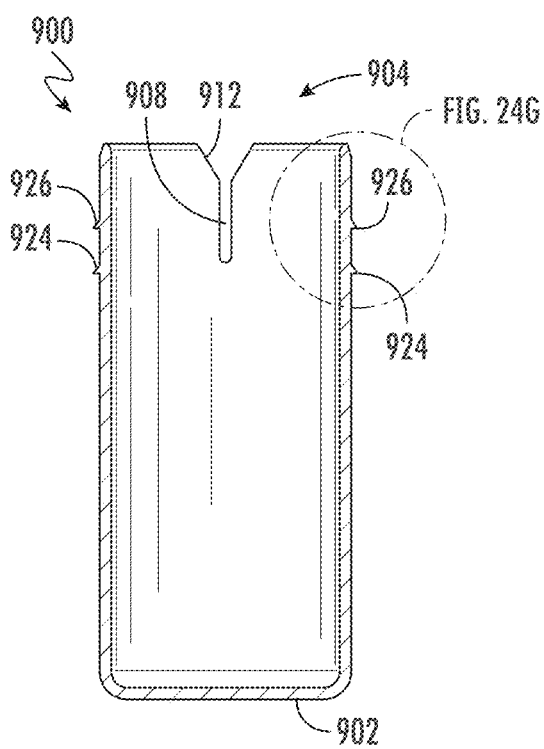
Figure 24G:
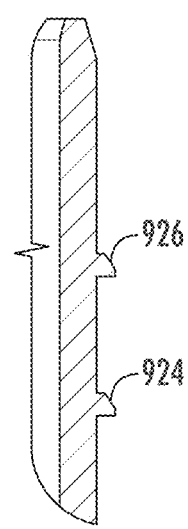

As shown, FIG. 24A illustrates a perspective view of container 900, FIG. 24B a top plan view thereof, FIG. 24D a side plan view thereof, and FIG. 24E another side view thereof. FIG. 24F illustrates a cross-sectional view of the embodiment of FIG. 24E, taken along section line A-A thereof. FIG. 24C illustrates an enlarged detail B from circle B portion of FIG. 24B, and FIG. 24 G illustrates an enlarged detail C from circle C portion of FIG. 24F. Container 900 generally comprises a cylinder having a solid bottom 902 and an opposing open end generally 904. A pair of opposing side wall slots 906 and 908, respectively, are 180 degrees opposite one another, for passage of an RFID tag wire therethrough, as otherwise described herein. Such wire slips into each respective slot via the enlarged mouth 910 and 912, respectively, of each such slot.

A pair of sets of ratchet teeth 914 and 916 are formed on opposite sides of the outside diameter of container 900, 180 degrees from each other. As shown in FIG. 24C by enlargement, preferably each such set includes three respective teeth, such as exemplary teeth 918, 920, and 922. Such container ratchet teeth engage other elements of a corresponding cap set of ratchet teeth/features, as otherwise discussed herein.

Also, a set of pairs of protruding elements 924 and 926 also are formed on the outside diameter of the cylinder of container 900, again 180 degrees from each respective set. As further discussed herein, members 924 form stops for preventing direct-pull removal of a cap from container 900, while members 926 form alignment nodes, to assist with initial proper placement of such cap onto container 900.

FIGS. 25 A through 25C illustrate various respective views of an exemplary cap embodiment component generally 928 (an outer piece thereof) for use with a "ratchet" style container/cap exemplary embodiment in accordance with presently disclosed subject matter. FIG. 25A illustrates a perspective view of such component 928 while FIG. 25B is a bottom plan view thereof. FIG. 25C is a cross-sectional view of FIG. 25B, taken along section line F-F thereof.

Similar to the "press fit" style embodiment, the "ratchet" style embodiment also has a pair of 180 degree opposing openings 930 and 932 through which a tag wire may be passed. Also, protruding paired elements 934/936 and 938/940 cooperate to hold the tag body in place, as previously discussed. Ratchet elements 942 and 944 are positioned 180 degrees from each other around component 928, and include respective plural individual ratchet teeth.

Component 928 includes two more sets of paired elements positioned 180 degrees around the component which contribute to alignment and securement aspects of the container/cap combination. Specifically, extending features 946 and 948 contribute to securement by blocking the cap from being removed from the container, once they are properly positioned by being rotated into position, as discussed otherwise herein. Extending members 950 and 952 form a slot therebetween for guiding insertion of the cap onto the container. A corresponding set of four elements appear 180 degrees across component 928, as seen in part with elements 954 and 956 in FIG. 25B.

FIGS. 26 A through 26D illustrate various respective views of an exemplary cap embodiment component generally 958 (a center piece thereof) for use with a "ratchet" style container/cap exemplary embodiment in accordance with presently disclosed subject matter. FIG. 26A is a perspective view of such component 958, while FIGS. 26B and 26C are respective side elevational and bottom plan views thereof. FIG. 26D is a cross-sectional view of FIG. 26C, taken along section line E-E thereof.

Similar to the "press fit" style embodiment, the "ratchet" style embodiment also has a channel generally 960 through which a tag wire may be passed, and a non-square rectangular guide member generally 962 for proper orientation of component 958 with outer cap piece generally 928.

Figure 27A:
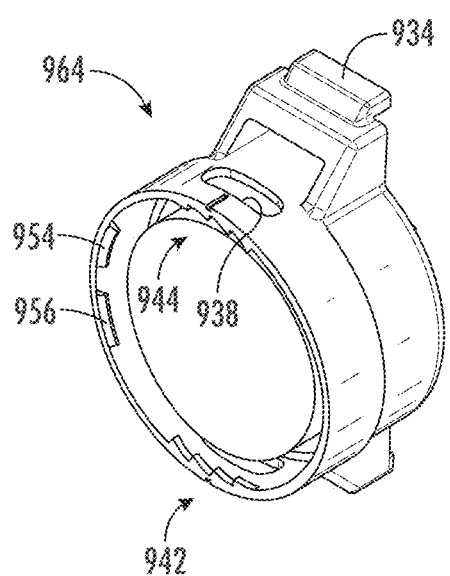
Figure 27B:
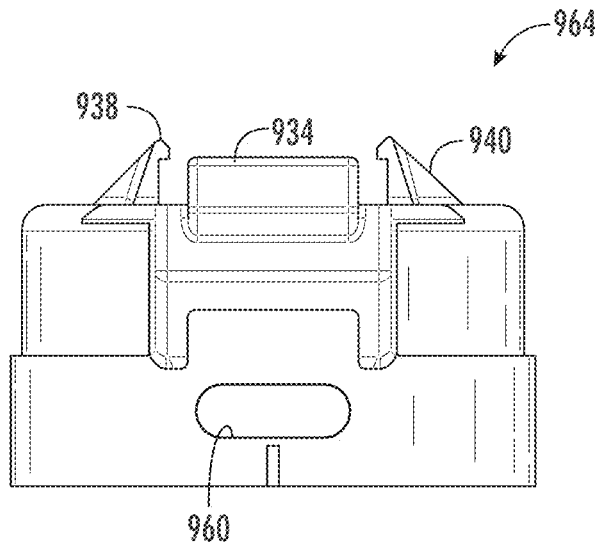
Figure 27C:
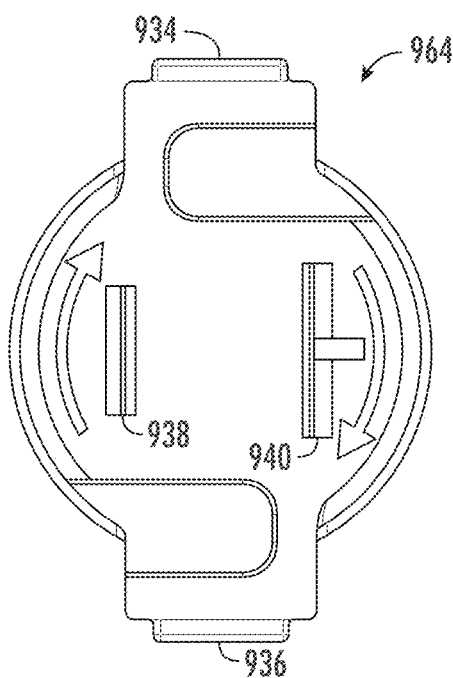
Figure 27D:
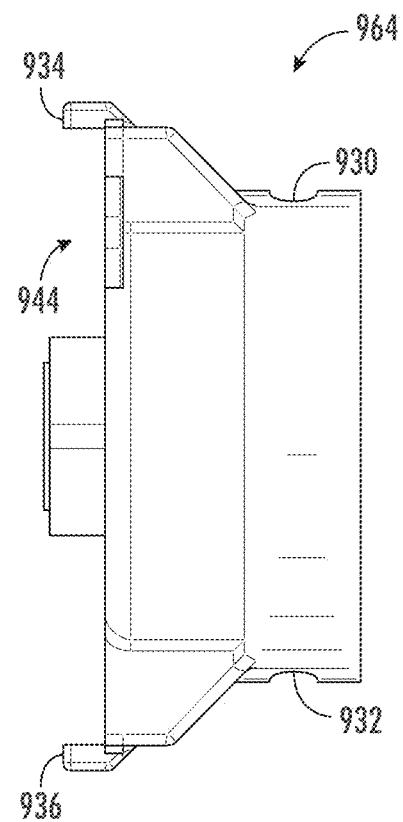

FIGS. 27A through 27I illustrate various respective views of an exemplary cap embodiment component generally 964 (center and outer pieces thereof combined) for use with a "ratchet" style container/cap exemplary embodiment in accordance with presently disclosed subject matter. FIG. 27A is a perspective view of such full cap component 964, while FIGS. 27B, 27C, 27D, and 27E are respective side elevation, top elevation, additional side elevation, and bottom elevation views thereof. FIGS. 27G, 27H, and 27I are respective cross-sectional views of FIG. 27E, taken along section lines A-A, D-D, and B-B thereof.

Figure 27E:
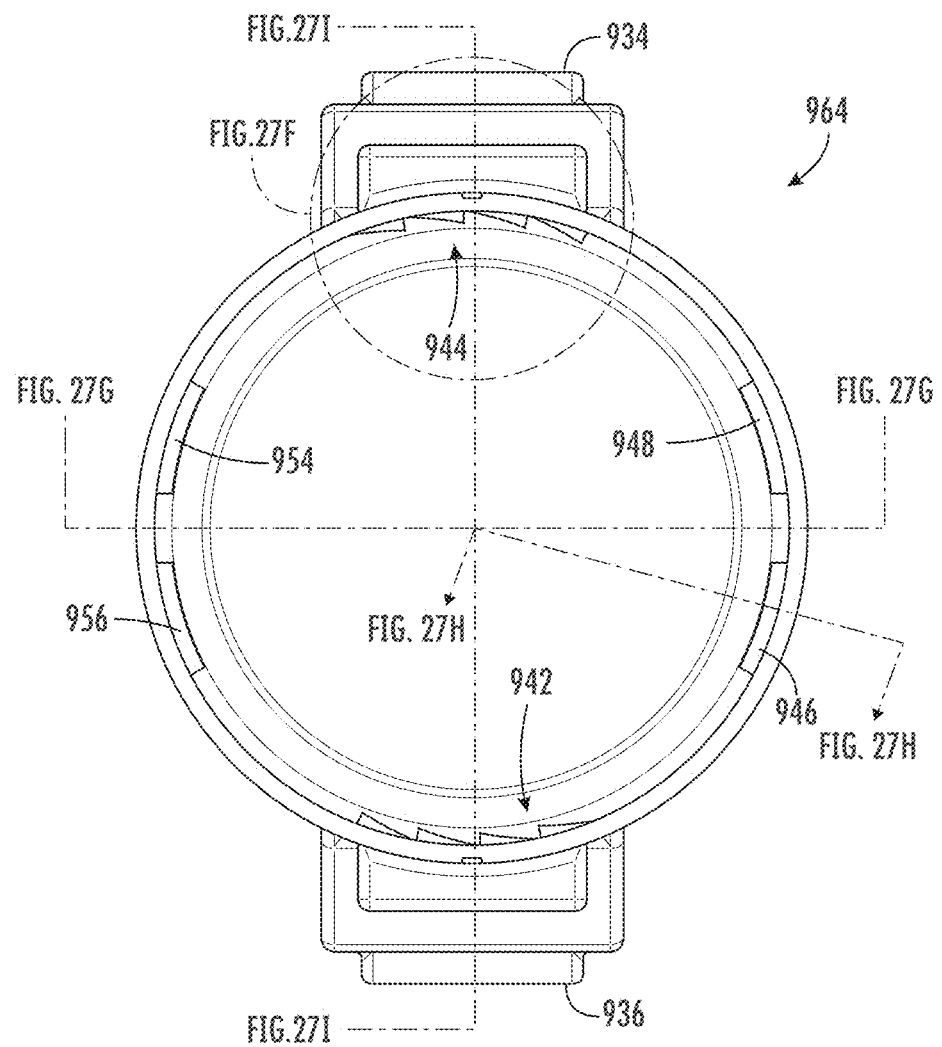
Figure 27F:
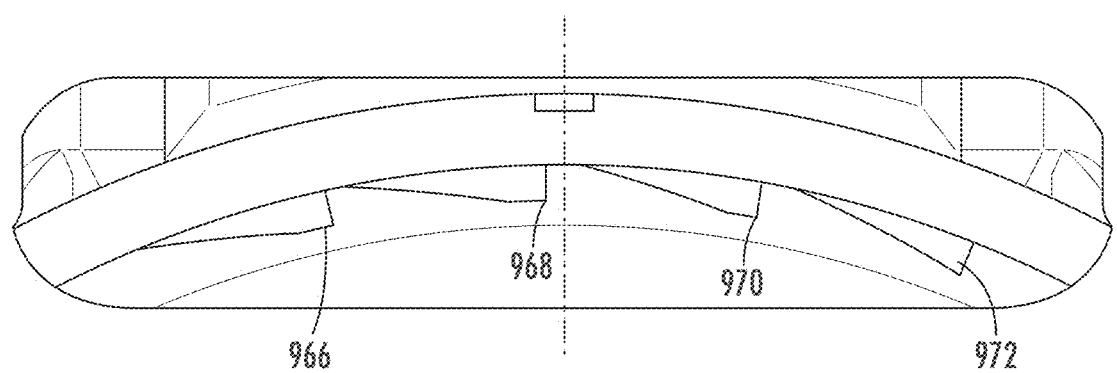

FIG. 27F is an enlarged detail from circle C of FIG. 27E, illustrating enlarged detail of respective individual ratchet teeth 966/968/970/972 in exemplary ratchet teeth section 944. Exemplary representative dimensions and interface angles are variously shown throughout the figures, and are intended as examples rather than limitations of the presently disclosed subject matter.

Both the "press fit" and "ratchet" style embodiments have various features in common. For example, a tamper evident RFID tag is installed onto the top of the cap of the container. Each of such designs has the wire from the RFID tag routed from the tag through the cap and the container and back to the tag where it is locked into the tag and completes the electrical circuit. The way that the wire is routed is such that the wire must be broken to remove the cap from the container and access the narcotic.

As with various facets of engineered products, there are trade-offs and respective advantages from use of each of the respective embodiments.

The "press fit" design is the simpler of the two designs but requires final tamper evident wire installation by the user. The cap can be provided to a user with the RFID tag installed but the tamper evident wire not yet connected back to the RFID tag. The user places the narcotic into the container that they wish to secure. The cap will then be placed onto the container. As otherwise discussed herein, the press fit container has a complete (that is, not open to the top) hole on the side. There is a complementary hole on the opposite side. Once the user places the cap onto the container, the wire must be threaded through the cap, the container, the inside of the cap, the other side of the container, the other side of the cap, and outside to mate up with the receptacle on the RFID tag. The loose end of the wire is then locked into the tag and cannot be removed once inserted. After the wire is installed properly, there is no way to remove the cap without breaking this wire, because the wire has been woven through the cap and the container. The exemplary dimensions work with a particular length of wire to ensure a sufficiently tight fit.

When the in-tact container/RFID tag is placed into the RFID narcotics box, the system will read this tag (and therefore the narcotic) as being present and not tampered with. When the user removes the cap, the tamper evident wire is broken. Once the cap has been removed, if the user places the cap back onto the container and places the container/cap/tampered RFID tag back into the RFID box, the presently disclosed system will read the tag as being tampered with and will inquire with the user as to why the tag is missing. One default approach would be to regard tampered tags as missing but other protocols could be implemented to require the user to specify then as to why the tag was tampered with.

The "ratchet" design has more steps to manufacture of the two designs, as it requires a tightly-toleranced ratchet on the cap and container to work in concert. However, a resulting advantage of additional steps undertaken in manufacturing is that the ratchet design does not require the user to have to thread the wire through the cap and the container after they insert the narcotic into the container. The cap can be provided to the user with the RFID tag installed and the tamper evident wire already fully threaded through the cap and connected back to the RFID tag. The user will place the narcotic into the container that they wish to secure. The cap will then be placed onto the container. As discussed and shown, the ratchet fit container has a slot that is open to the top on the side. There is a complementary slot on the opposite side. When the user places the cap onto the container the tamper evident wire will follow the slot on the side of the container to the bottom of the slot as the user places the cap on.

The "ratchet" design has respective ratchet system aspects respectively on the container and cap. The complementary retaining tabs on the container and cap serve to keep the user from removing the cap once the ratchet is engaged. Once the user places the cap onto the container, they will turn the cap slightly clockwise. This serves two functions 1) it will engage the first set of teeth in the ratchet system preventing the cap from being turned counterclockwise and 2) the retaining tabs on the cap will be under the retaining tab on the container, preventing the cap from being removed by pulling up. In this state, the wire is now trapped between the end of the slot in the container and the hole in the cap. The lid cannot be removed by pulling because the retaining tabs are preventing such movement and the cap cannot be twisted counterclockwise as the ratchet teeth are preventing any such movement.

After the cap is installed properly, there is no way to remove the cap without breaking the tag wire. When the in-tact container/RFID tag is placed into the RFID narcotics box, the system will read this tag (and therefore the narcotic) as being present and not tampered with. When the user removes the cap from the container by twisting the cap clockwise through the next sets of ratchet teeth, the tamper evident wire is necessarily broken. After the cap is twisted clockwise (and the wire has been broken), the retaining tab on the container is no longer blocking the retaining tab on the cap and the cap can be removed. Once the cap has been removed, if the user places the cap back onto the container and places the container/cap/tampered RFID tag back into the RFID box, the presently disclosed system will read the tag as being tampered with and will inquire with the user as to why the tag is missing. One default approach would be to regard tampered tags as missing but other protocols could be implemented to require the user to specify then as to why the tag was tampered with.

As discussed, in addition to vials and ampules, it is common for ambulances to carry syringe injection components such as the "Carpuject" syringes otherwise described herein. The user and system interface for such syringe usage follows the same approach, simply using instead the container and cap combination shown and discussed in conjunction with FIGS. 18A through 18C, as will be understood by those of ordinary skill in the art from the complete disclosure herewith.

It will also be understood from the complete disclosure herewith that a presently disclosed container/cap/RFID tag combination can be used as a stand-alone identification and/or tamper detection device, whether or not used in combination with a narcotics box or complete system as disclosed herewith.

In various embodiments, tags may be variously encoded with information. For example, for one preferred embodiment, tags may be encoded with three fields of information.

A first field can include a plurality of alpha numeric characters. For example, 6 alpha numeric characters may correspond to the drug type. An initial example set could include:

| | |
|---|---|
| 1. fentaNYL | fentnl |
| 2. Midazolam | midzlm |
| 3. Morphine | morphn |
| 4. HYDROmorphone | hymrph |
| 5. Ketamine | ketmin |
| 6. Meperidine | meprdn |
| 7. diazepam | diazpm |
| 8. LORazepam | lorzpm |

It would be possible to add additional drug names. Use of a 6 character ID provides the ability to call immediate attention to the drug type, so that the system does not have to be "taught" each tag when it sees it (that is—a user doesn't need to tell the system that tag number "2-987" is morphine—it is tag "morphn-2-987" and the system will know that "morphn" is actually morphine. The firmware can have a look up table converting the 6 character ID to the real name (for example—hymrph is HYDROmorphone). The table can be expanded in the future to add more real names that correspond to other 6 character ID's. If a 6 character ID does not have a corresponding real name, the system can simply use the 6 character ID when asking the user about the status of missing narcotics.

A second field of tag information can be a system ID (for example, from 1-256) corresponding to the system ID that programmed the tag. Such an approach would facilitate more than one location making tags in the future A third field of tag information can be a drug ID that goes, for example, from 1-(2^24-1) or (16,777,215).

Combining all three fields (especially the second and third fields) means that every tag produced would be unique, to prevent the creation of duplicate tags. Creation locations (field two) could also introduce series suffixes to further help prevent creation of duplicate identical tags.

Also, the first field can be varied to accommodate various schemes for spelling and/or presentation of drug identifications, especially to adopt changing industry standards regarding name specs.

While the presently disclosed subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. Methodology for combined electronic inventory data and access control, comprising:
providing a closable enclosure with an electronically actuated lock system for selectively allowing locking and unlocking of said enclosure;
providing a plurality of respective tamper evident RFID tags, each respectively associated with a corresponding plurality of matable paired cap and container components for receiving respective consumable inventory items, to be received in said enclosure, said tamper evident RFID tags having a tamper evident feature associated with a mated pair of said cap and container components for providing an altered ID characteristic readable by an RFID reader once said tamper evident feature is disturbed by separation of said mated pair of cap and container components for access to their respective consumable inventory items;
associating an RFID reading system with said enclosure; and
determining with said RFID reading system at a selected time tamper evident RFID tags with unaltered ID characteristics received within said enclosure when closed, so as to identify corresponding respective consumable inventory items associated therewith.

2. Methodology as in claim 1, wherein said tamper evident feature comprises an external loop associated with a respective tamper evident RFID tag and entrained through its associated mated pair of cap and container components to be ruptured whenever said mated pair of cap and container components are separated for access to their respective consumable inventory items.

3. Methodology as in claim 2, wherein said altered ID characteristic thereof comprises at least one of that said ID characteristic includes a flagged tamper bit as readable by an RFID reader whenever said RFID tag external loop is ruptured, that said ID characteristic as readable by an RFID reader is eliminated whenever said RFID tag external loop is ruptured, and that said ID characteristic has relatively reduced signal strength as readable by an RFID reader whenever said RFID tag external loop is at least partially ruptured.

4. Methodology as in claim 2, wherein said paired cap and container components include respective openings which are aligned when said cap and container components are mated and their associated external loop is passed through said respective openings.

5. Methodology as in claim 4, wherein said openings comprise a pair of respective holes through said cap and a pair of respective holes through opposing outside walls of said container.

6. Methodology as in claim 4, wherein:
said openings comprise a pair of respective holes through said cap and a pair of respective slots through opposing outside walls of said container, and said methodology includes passing an external loop through said respective holes of said cap and introducing said loop into said slots of said container outside walls whenever said cap is fitted to said container; and
said methodology further includes respective protruding element alignment nodes and motion limiting stops on the outside of said container and on an inside rim of said cap, to prevent direct-pull removal of said cap from said container; and
respective ratcheting members on the outside of said container and on said inside rim of said cap, for respective engagement of said ratcheting members whenever said cap is fitted to said container, to limit rotation of said cap thereafter to a single direction thereof relative to said container for removal of said cap from said container.

7. Methodology as in claim 1, further including supporting and holding an associated respective tamper evident RFID tag on each of said respective plurality of cap components.

8. Methodology as in claim 7, wherein said supporting and holding includes providing paired elements protruding from each respective cap for cooperating to hold its associated respective tamper evident RFID tag in place.

9. Methodology as in claim 2, wherein each of said RFID tags has a wire receiver slot thereon, and each of the external loops of each of said tamper evident RFID tags each comprise a wire that includes one end thereof directly attached to its RFID tag and one loose end thereof, and said methodology further includes inserting such loose end and locking it into the receiver slot on said RFID tag so that said loose end is thereafter not removed from said slot.

10. Methodology as in claim 1, further including determining at a plurality of times inventory of said enclosure using said RFID reading system.

11. Methodology as in claim 10, wherein:
said plurality of times includes at least one determination later in time than another determination to establish inventory changes in said enclosure comprise inventory either of removed from or added to said enclosure during the interim between such two determinations; and
said electronically actuated lock system is further adapted for maintaining an audit trail for actuation of said electronically actuated lock system and associating said audit trail with removed inventory to track chain of custody for such removed inventory.

12. Methodology as in claim 1, further including providing a removable case receivable in said enclosure and having an associated RFID tag for tracking of whether said removable case is received within said enclosure, said removable case further adapted for receiving therein said consumable inventory items and their respective frangible RFID tags.

13. Methodology as in claim 12, wherein said RFID reading system is further adapted for determining whether said removable case with its associated non-frangible RFID tag is received within said enclosure when closed.

14. Methodology as in claim 1, further including providing said electronically actuated lock system with a credential reader, a microprocessor based control circuit, and an electronic lock to allow access to said enclosure whenever acceptable credentials are presented to said credential reader, and wherein said microprocessor based control circuit maintains a log of activities of said electronic lock for providing access to said enclosure.

15. Methodology as in claim 1, further including:
providing said lockable enclosure includes an RFID antenna within said enclosure; and
providing said lockable enclosure with electromagnetic shielding so to block any external electromagnetic fields, so that any RFID readings are limited to RFID tags and their associated contents which are within said enclosure when said door is closed; and
taking said RFID readings every time said door is closed.

16. Methodology as in claim 1, further including associating respective visual markings with said respective consumable inventory items to be read by a human user for identifying particular inventory items stocked in said enclosure.

17. Methodology for an electronic access control system for inventory data and access control for electronically controlled lock systems, comprising:
providing a communications network;
providing a plurality of electronic locks, each of said locks having respective network communications devices for respectively connecting said each electronic lock with said communications network;
respectively associating said plurality of locks with a plurality of securable enclosures;
providing each of said securable enclosures with a plurality of respective tamper evident RFID tags, each respectively associated with a corresponding plurality of matable paired cap and container components for receiving respective consumable inventory items, to be received in said enclosure, said tamper evident RFID tags having a tamper evident feature associated with a mated pair of said cap and container components for providing an altered ID characteristic readable by an RFID reader once said tamper evident feature is disturbed by separation of said mated pair of cap and container components for access to their respective consumable inventory items;
providing each of said securable enclosures a plurality of respective RFID reading systems, associated with each said respective enclosure, and adapted for determining at a selected time tamper evident RFID tags with either of altered or unaltered ID characteristics received within said enclosure when closed, so as to identify corresponding respective consumable inventory items associated therewith;
using said RFID reading systems, selectively establishing data at said respective enclosures for identifying corresponding respective consumable inventory items associated therewith;
providing a central server connected with said plurality of electronic locks over said network; and
selectively providing at least one of data updates and data management for each of said electronic locks, conducted by said central server over said network.

18. Methodology as in claim 17, wherein:
said network communications devices comprise 802.11 WiFi wireless communications modules; and
said communications network is capable of communicating with 802.11 WiFi wireless communications modules.

19. Methodology as in claim 17, wherein said electronic locks each respectively further include data memory to record associated electronic lock activities and data, an electronic latch, a visual display, and a user interface.

20. Methodology as in claim 19, wherein each associated electronic lock includes a controller with input/output features operative to provide access to an associated enclosure through actuation of an associated latch upon presentation of a valid access credential by a user via said input/output features of said controller.

21. Methodology as in claim 17, wherein communications between said network and said respective network communications devices include one of hardwired and wireless communications links, or both.

22. Methodology as in claim 17, further including a removable case receivable in each of said enclosures and having an associated non-frangible RFID tag for tracking of whether said removable case is received within said enclosure, said removable case further adapted for receiving therein said consumable inventory items and their respective frangible RFID tags.

23. Methodology as in claim 17, said plurality of electronic locks each comprise a main housing associated with an enclosure, an electronic assembly, a battery pack, a communications port, a programming keypad, a display, and a strike assembly and associated latch bolt.

24. Methodology as in claim 17, wherein
said tamper evident feature comprises an external loop associated with a respective tamper evident RFID tag and entrained through its associated mated pair of cap and container components to be ruptured whenever said mated pair of cap and container components are separated for access to their respective consumable inventory items; and
said altered ID characteristic thereof comprises one of a flagged tamper bit as readable by an RFID reader whenever said RFID tag external loop is ruptured, and that said ID characteristic as readable by an RFID reader is eliminated whenever said RFID tag external loop is ruptured.

25. Methodology as in claim 24, wherein:
said paired cap and container components include respective openings which are alignable when said cap and container components are mated so that their associated external loop pass through said respective openings; and
said openings comprise a pair of respective holes through said cap and a pair of respective slots through opposing outside walls of said container, so that an external loop passed through said respective holes of said cap may be introduced into said slots of said container outside walls whenever said cap is fitted to said container; and
said methodology further including respective protruding element alignment nodes and motion limiting stops on the outside of said container and on an inside rim of said cap, to prevent direct-pull removal of said cap from said container; and respective ratcheting members on the outside of said container and on said inside rim of said cap, for respective engagement of said ratcheting members whenever said cap is fitted to said container, to limit rotation of said cap thereafter to a single direction thereof relative to said container for removal of said cap from said container.

26. Methodology as in claim 17, wherein each of said respective plurality of cap components includes paired elements protruding from each respective cap for cooperating to hold its associated respective tamper evident RFID tag in place.

27. Methodology as in claim 24, wherein each of said RFID tags has a wire receiver slot thereon, and each of the external loops of each of said tamper evident RFID tags each comprise a wire that includes one end thereof directly attached to its RFID tag and one loose end thereof which can be inserted and locked into the receiver slot on said RFID tag and thereafter not removed from said slot.

* * * * *